(12) United States Patent
Okada et al.

(10) Patent No.: US 8,736,396 B2
(45) Date of Patent: May 27, 2014

(54) RADIO COMMUNICATING DEVICE, ROTATIONAL STRUCTURE, AND ELECTRONIC DEVICE

(75) Inventors: Yasuhiro Okada, Tokyo (JP); Norihito Mihota, Saitama (JP)

(73) Assignee: Sony Corporation, Tokyo (JP)

( * ) Notice: Subject to any disclaimer, the term of this patent is extended or adjusted under 35 U.S.C. 154(b) by 859 days.

(21) Appl. No.: 12/842,611

(22) Filed: Jul. 23, 2010

(65) Prior Publication Data

US 2011/0026443 A1 Feb. 3, 2011

(30) Foreign Application Priority Data

Jul. 30, 2009 (JP) ................................. 2009-177563

(51) Int. Cl.
*H01P 1/161* (2006.01)
*H01Q 15/24* (2006.01)

(52) U.S. Cl.
CPC .............. *H01P 1/161* (2013.01); *H01Q 15/244* (2013.01)
USPC .......................... 333/21 A; 343/756; 333/135

(58) Field of Classification Search
CPC .............................. H01P 1/161; H01Q 15/244
USPC ....... 333/21 A, 256, 257, 261, 132, 134, 135; 343/756
See application file for complete search history.

(56) References Cited

U.S. PATENT DOCUMENTS

| | | | |
|---|---|---|---|
| 2,530,818 A | 11/1950 | Gardner | |
| 2,713,151 A | 7/1955 | Farr | |
| 3,668,567 A * | 6/1972 | Rosen | 333/21 A |
| 3,906,407 A * | 9/1975 | Levaillant et al. | 333/21 A |
| 4,654,613 A * | 3/1987 | Fischer | 333/256 |
| 4,757,281 A | 7/1988 | Anne et al. | |
| 4,884,045 A | 11/1989 | Alverson et al. | |
| 5,034,750 A * | 7/1991 | Cardiasmenos | 342/188 |
| 5,075,649 A | 12/1991 | Pellegrieschi | |
| 2008/0117005 A1* | 5/2008 | Eom et al. | 333/21 A |

FOREIGN PATENT DOCUMENTS

| | | |
|---|---|---|
| JP | 57-171801 | 10/1982 |
| JP | 03-253102 | 11/1991 |
| JP | 07-326901 | 12/1995 |
| JP | 07-336113 | 12/1995 |
| JP | 2007-201576 | 8/2007 |

OTHER PUBLICATIONS

Japanese Office Action for related Japanese Patent Appl No. 2009-177563 dated May 28, 2013.

* cited by examiner

*Primary Examiner* — Benny Lee
*Assistant Examiner* — Rakesh Patel
(74) *Attorney, Agent, or Firm* — Dentons US LLP

(57) ABSTRACT

Disclosed herein is a radio communicating device including: a first communicating block; a second communicating block rotatable about an axis of rotation relative to the first communicating block; and a radio signal transmission line capable of information transmission by radio between the first communicating block and the second communicating block; wherein between the first communicating block and the second communicating block, a signal to be transmitted is converted into a radio signal of a circularly polarized wave, and the radio signal of the circularly polarized wave is transmitted via the radio signal transmission line.

15 Claims, 17 Drawing Sheets

FIG. 2

| EXAMPLE OF CONSTITUTION | FIXED UNIT | | | | MOVABLE UNIT | | | EVALUATION | COMMENTS (ADVANTAGES AND DISADVANTAGES) |
|---|---|---|---|---|---|---|---|---|---|
| | SHORT OR OPEN | PROBE POLARIZED WAVE | POLARIZED WAVE CONVERTING UNIT (POLARIZER) | SHORT OR OPEN | PROBE POLARIZED WAVE | POLARIZED WAVE CONVERTING UNIT (POLARIZER) | | | |
| 1 | SHORT | CIRCULAR | ABSENT | SHORT | CIRCULAR | ABSENT | | A | SIMPLE STRUCTURE |
| 2 | OPEN | CIRCULAR | ABSENT | OPEN | CIRCULAR | ABSENT | | C | RADIATION ON OPEN SIDE IS A PROBLEM |
| 3 | SHORT (OPEN) | CIRCULAR | ABSENT | OPEN (SHORT) | CIRCULAR | ABSENT | | C | RADIATION ON OPEN SIDE IS A PROBLEM |
| 4 | SHORT | LINEAR (CIRCULAR) | PRESENT (ABSENT) | SHORT | CIRCULAR (LINEAR) | ABSENT (PRESENT) | | B | ADVANTAGEOUS IN TERMS OF AXIAL RATIO CHARACTERISTIC AS COMPARED WITH 1 |
| 5 | OPEN | LINEAR (CIRCULAR) | PRESENT (ABSENT) | OPEN | CIRCULAR (LINEAR) | ABSENT (PRESENT) | | D | RADIATION ON OPEN SIDE IS A PROBLEM TWO KINDS OF PROBE DESIGN ARE NECESSARY |
| 6 | SHORT (OPEN) | LINEAR (CIRCULAR) | PRESENT (ABSENT) | OPEN (SHORT) | CIRCULAR (LINEAR) | ABSENT (PRESENT) | | D | RADIATION ON OPEN SIDE IS A PROBLEM |
| 7 | SHORT | LINEAR | PRESENT | SHORT | LINEAR | ABSENT | | E | NOT USABLE WITH SHORT AND REFLECTION |
| 8 | OPEN | LINEAR | PRESENT | OPEN | LINEAR | ABSENT | | C | RADIATION ON OPEN SIDE IS A PROBLEM LEVEL DOWN 3 dB |
| 9 | SHORT (OPEN) | LINEAR | PRESENT | OPEN (SHORT) | LINEAR | ABSENT | | C | RADIATION ON OPEN SIDE IS A PROBLEM LEVEL DOWN 3 dB |
| 10 | SHORT | LINEAR | ABSENT | SHORT | LINEAR | ABSENT | | E | NOT USABLE WITH SHORT AND REFLECTION NOT ROTATABLE |
| 11 | OPEN | LINEAR | ABSENT | OPEN | LINEAR | ABSENT | | E | NOT ROTATABLE |
| 12 | SHORT (OPEN) | LINEAR | ABSENT | OPEN (SHORT) | LINEAR | ABSENT | | E | NOT ROTATABLE |
| 13 | SHORT | LINEAR | PRESENT | SHORT | LINEAR | PRESENT | | B | ADVANTAGEOUS IN TERMS OF AXIAL RATIO CHARACTERISTIC AS COMPARED WITH 1 LONG WAVEGUIDE |
| 14 | OPEN | LINEAR | PRESENT | OPEN | LINEAR | PRESENT | | D | RADIATION ON OPEN SIDE IS A PROBLEM LONG WAVEGUIDE |
| 15 | SHORT (OPEN) | LINEAR | PRESENT | OPEN (SHORT) | LINEAR | PRESENT | | D | RADIATION ON OPEN SIDE IS A PROBLEM LONG WAVEGUIDE |

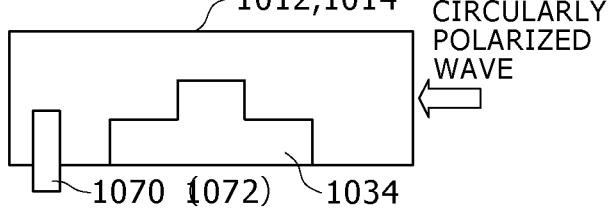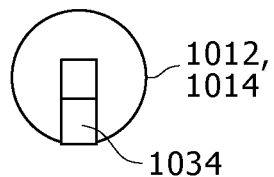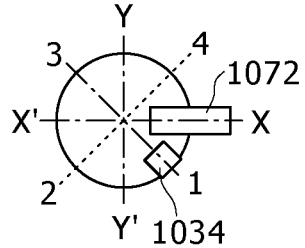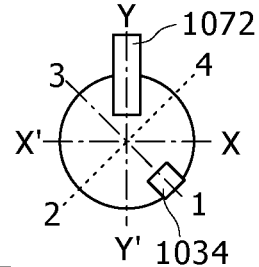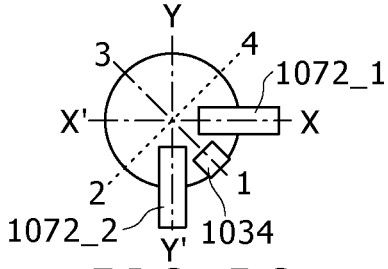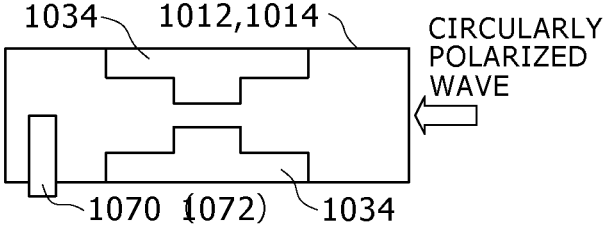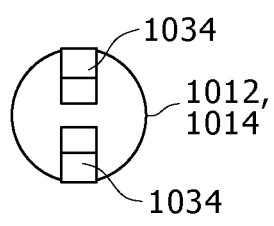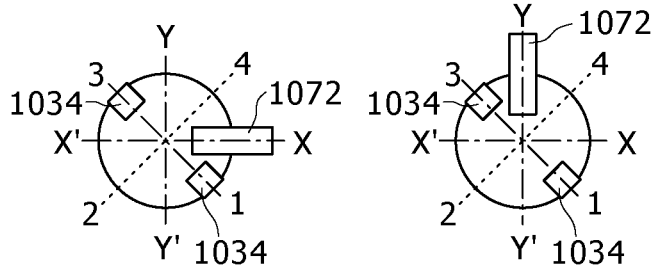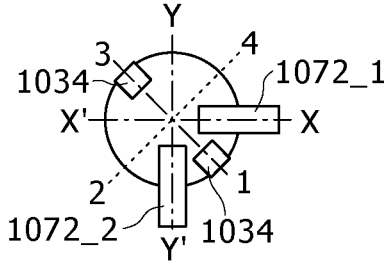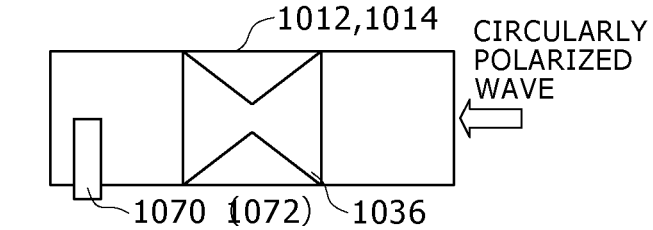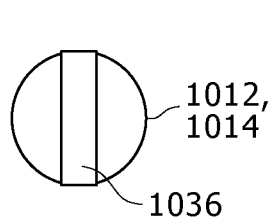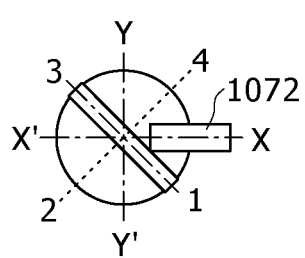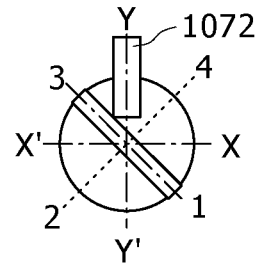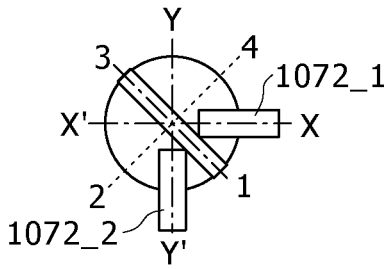

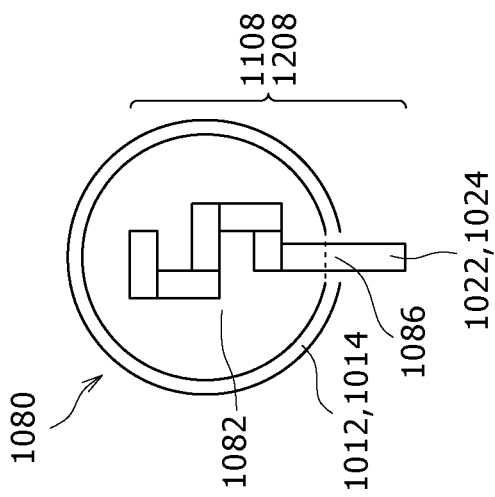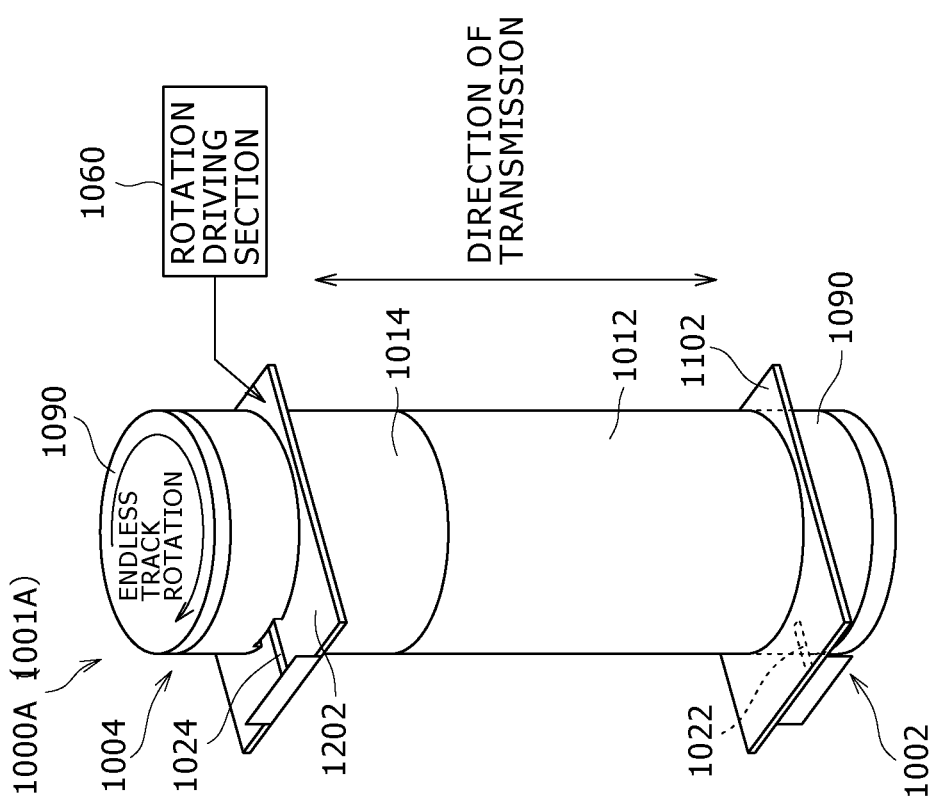

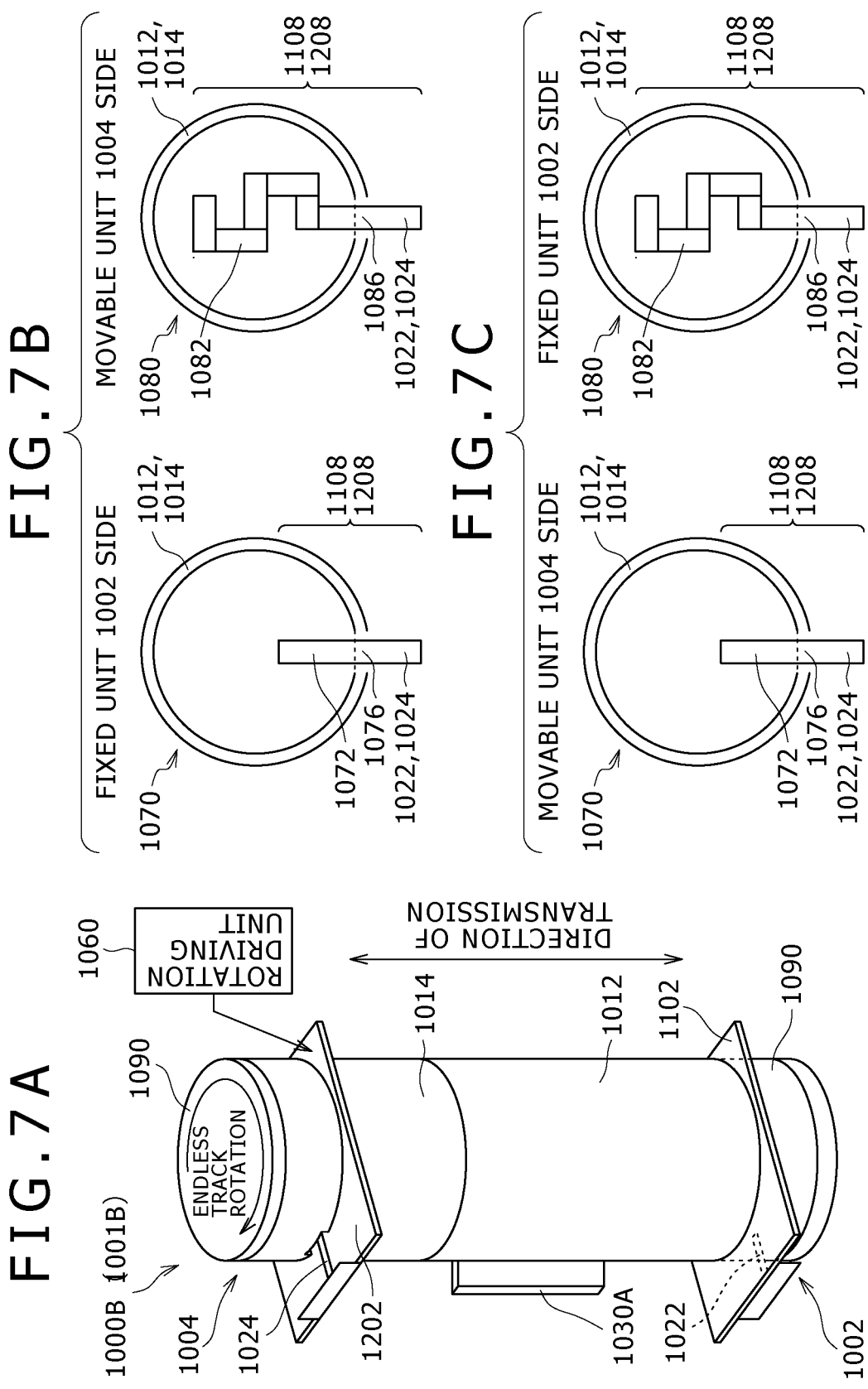

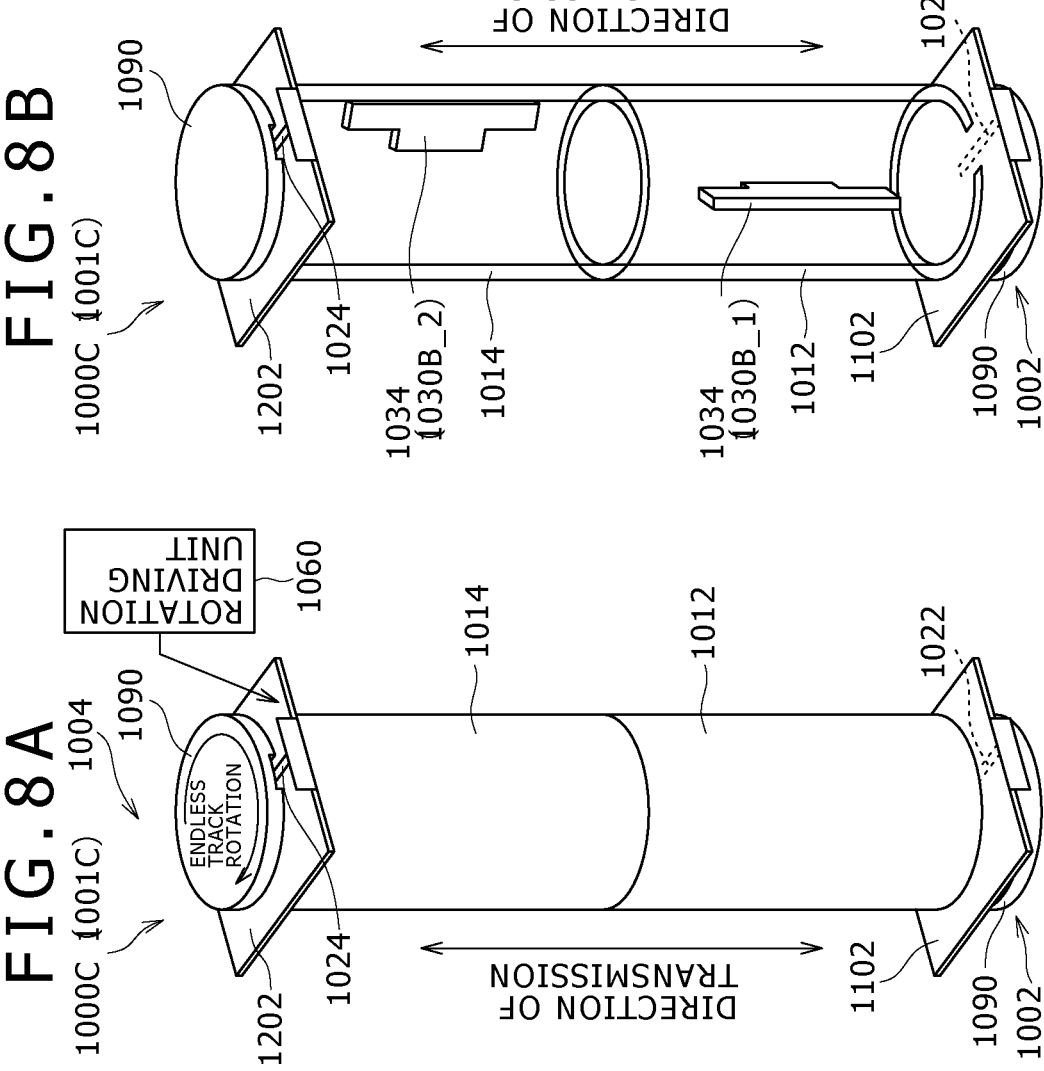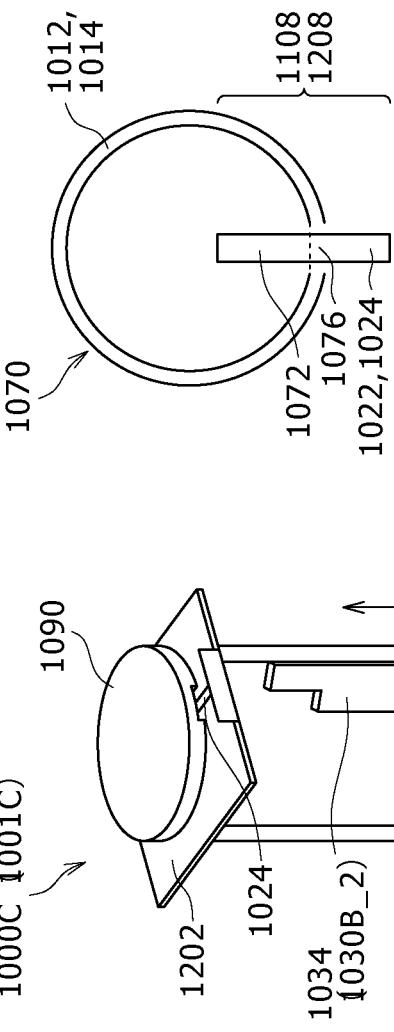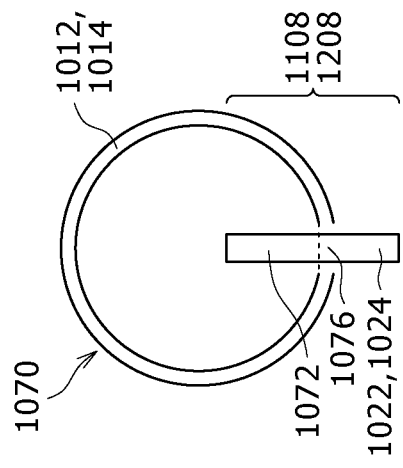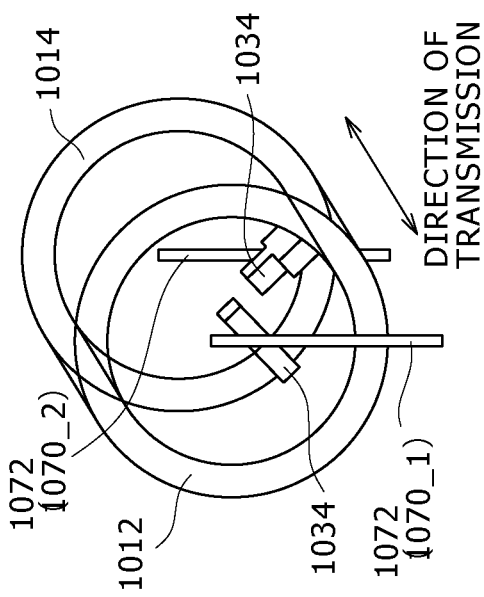

FIG. 9
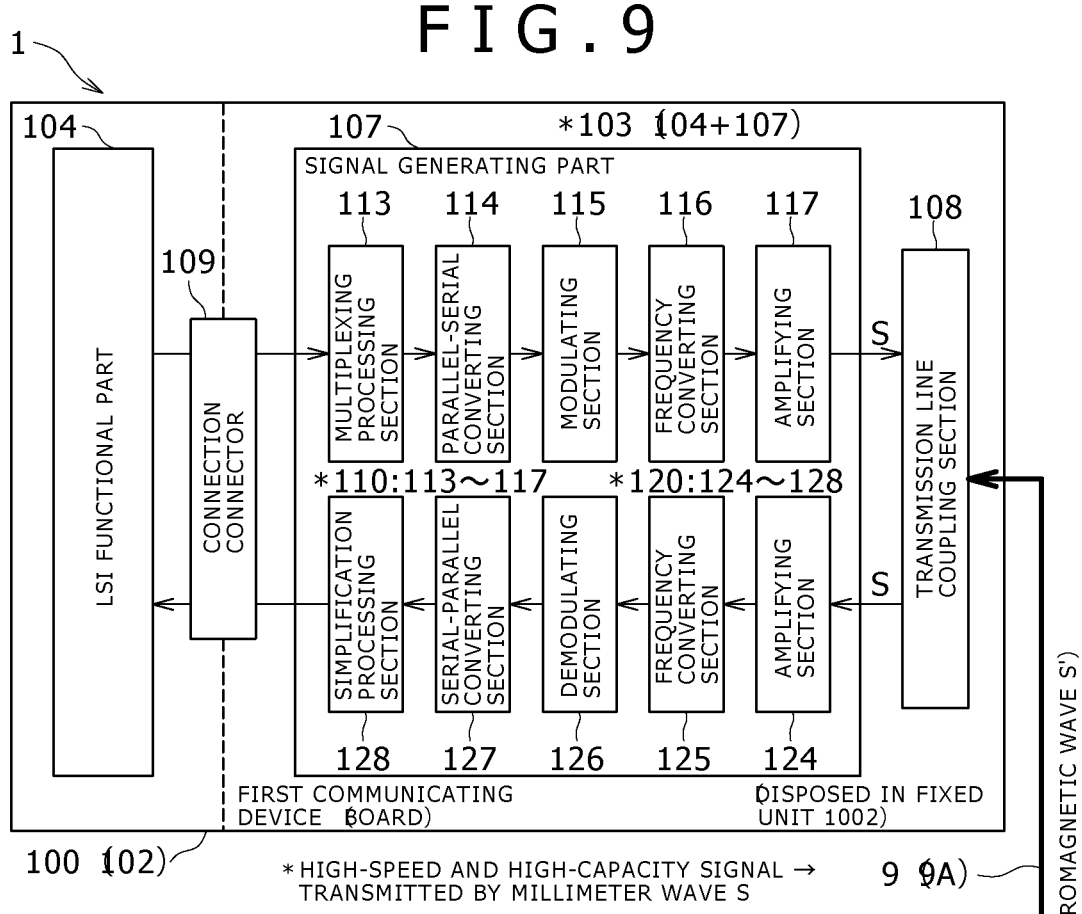
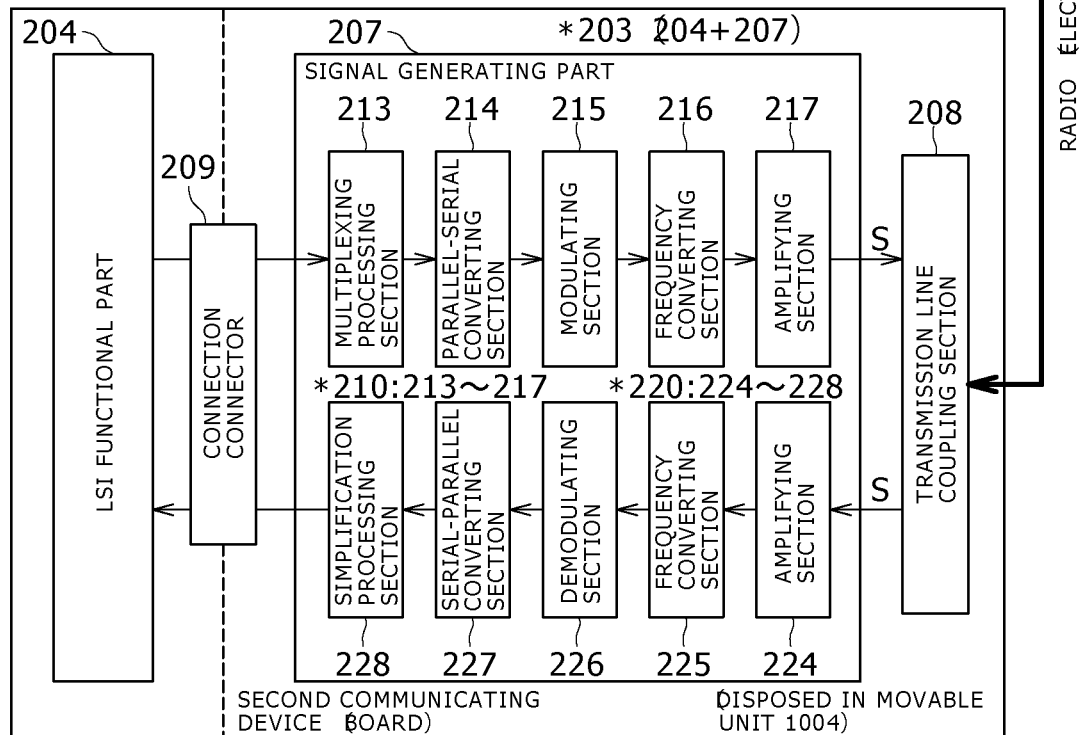

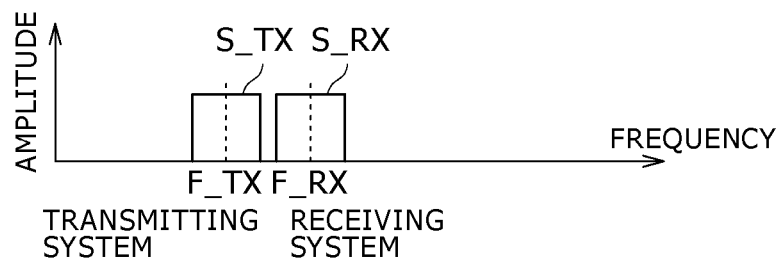
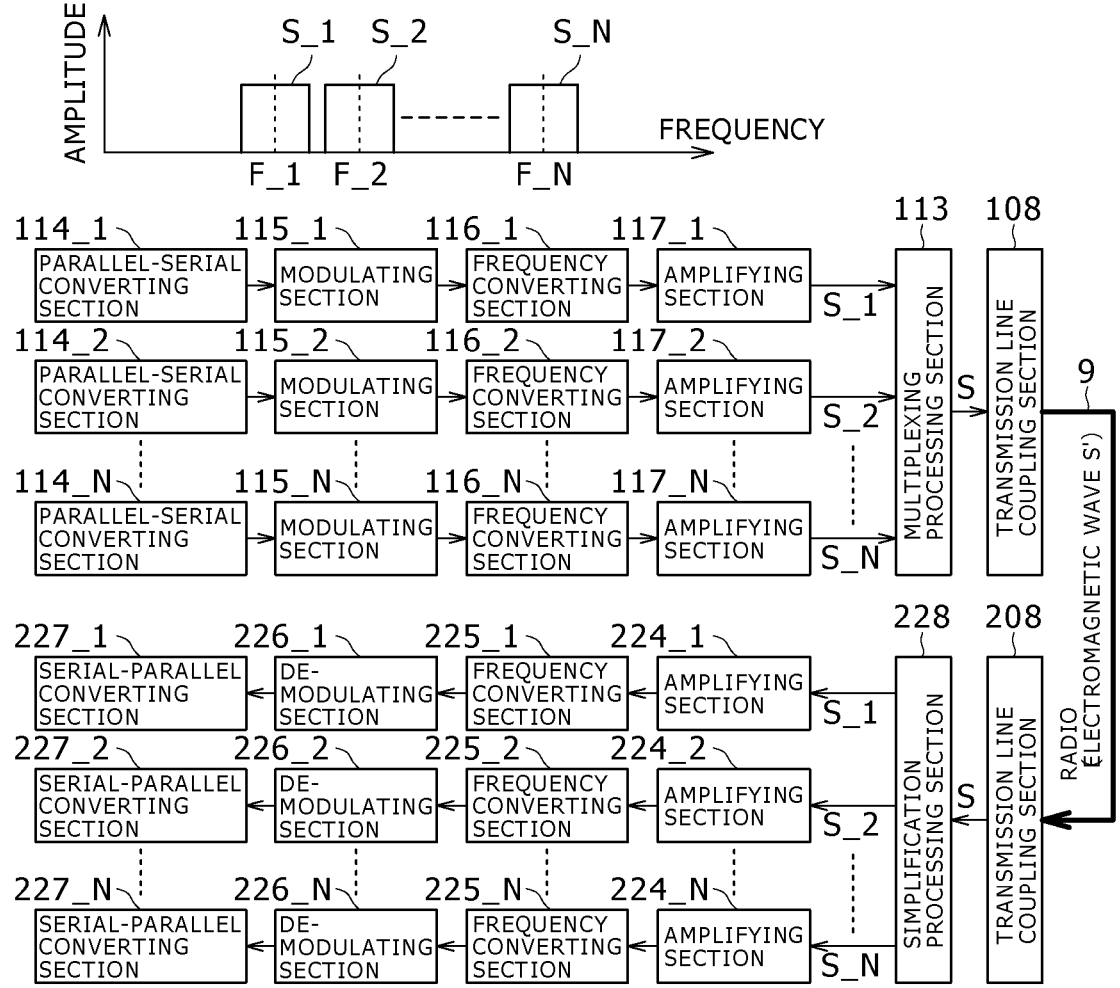
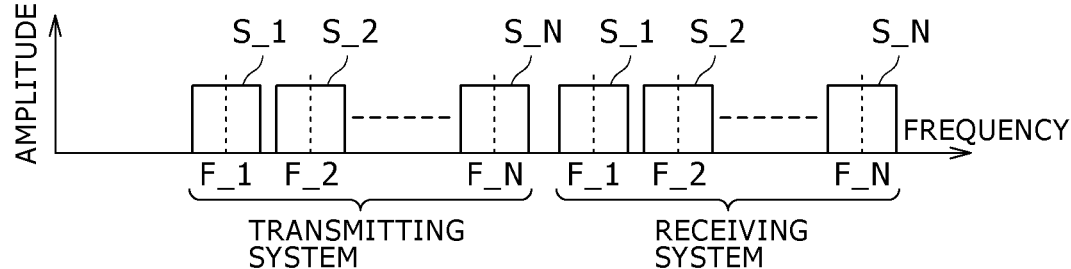

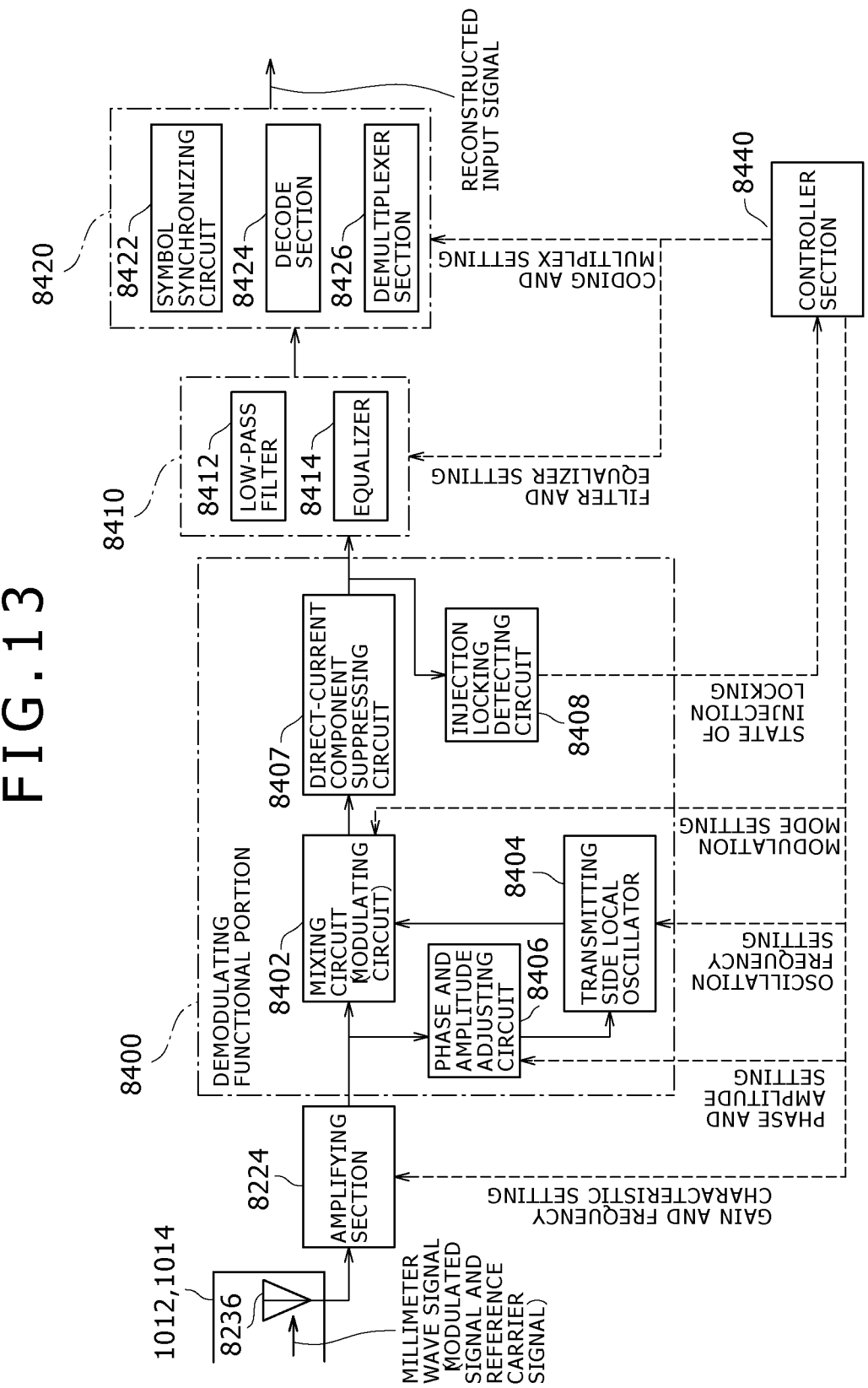

RADIO COMMUNICATING DEVICE, ROTATIONAL STRUCTURE, AND ELECTRONIC DEVICE

BACKGROUND OF THE INVENTION

1. Field of the Invention

The present invention relates to a radio communicating device, a rotational structure, and an electronic device, and particularly to a mechanism for performing signal transmission between a first communicating block and a second communicating block by radio while employing a structure in which the first communicating block and the second communicating block rotate relative to each other.

2. Description of the Related Art

Japanese Patent Laid-Open No. 2007-201576 (hereinafter referred to as Patent Document 1), for example, discloses a mechanism for performing signal transmission between a first communicating block and a second communicating block by radio while employing a structure in which the first communicating block and the second communicating block rotate relative to each other.

SUMMARY OF THE INVENTION

Patent Document 1 proposes forming an endless camera device that performs endless rotation and high-capacity transmission using radio data transmission such that a radio section is provided to each of a fixed unit and a movable unit, the radio sections are coupled to each other by a waveguide in which a radio wave propagates, and the waveguide path of the waveguide is made to coincide with the center of an axis of rotation of the movable unit.

In for example paragraphs 34 and 35 of Patent Document 1, there is a description relating to the wavelength and frequency of a radio wave propagating through a waveguide. The description includes, for example, "Frequencies of about 1 GHz to 60 GHz, for example, are usable as frequencies of a millimeter wave band used in this case. In the present embodiment, description will be made of a case where a millimeter wave of 2.4 GHz, for example, is used." Incidentally, to be accurate, a range of 30 GHz to 300 GHz is the millimeter wave band, and describing "frequencies of about 1 GHz to 60 GHz" as "frequencies of a millimeter wave band" is not considered to be accurate.

On the other hand, Patent Document 1 does not include description relating to polarized waves propagating through a waveguide. Judging from a diagram of structure of a radio section shown in FIG. 2, there is no choice but to understand that a linearly polarized wave is used. For example, paragraphs 30 to 33 include a description to an effect that strip lines 208 and 228 are formed on dielectric boards 203 and 223 to form antennas for the millimeter wave band. The strip lines 208 and 228 are connected to semiconductor circuit element sections 202 and 222 via wiring 206 and 226.

While there is a description to an effect that "a high-frequency signal can be taken out from the strip lines 208 and 228 forming the antennas to a waveguide 212," FIG. 2B shows only a state of the linear strip line 208 being inserted perpendicularly to a circular waveguide 126. In such a structure, linearly polarized waves are transmitted and received from the strip lines 208 and 228 to the waveguide 212 (waveguide 126).

However, there is an inconvenience resulting from only applying the strip lines 208 and 228 to both the fixed unit and the movable unit and propagating a linearly polarized wave through the waveguide (waveguide 212) in a case of adopting a structure making rotation (typically an endless rotation). For example, when the strip line 208 on the movable unit side performs transmission by a linearly polarized wave, the linearly polarized wave makes an endless rotation. Such a linearly polarized wave cannot be received without inconveniences by the strip line 228 receiving the linearly polarized wave on the fixed unit side. It may be said that transmission and reception can be performed only in a limited area having a position where the directions of both the strip lines 208 and 228 coincide with each other as a center.

The present invention has been made in view of the above situation. It is desirable to provide a mechanism for performing signal transmission between a first communicating block and a second communicating block by radio more reliably than Patent Document 1 while employing a structure in which the first communicating block and the second communicating block rotate relative to each other.

One mode of a radio communicating device, a rotational structure, and an electronic device according to the present invention includes: a second communicating block provided so as to be rotatable about an axis of rotation relative to a first communicating block; and a radio signal transmission line capable of information transmission by radio between the first communicating block and the second communicating block. Then, between the first communicating block and the second communicating block, a signal to be transmitted is converted into a radio signal of a circularly polarized wave, and the radio signal of the circularly polarized wave is transmitted via the radio signal transmission line.

Basically, the following three modes can be adopted in performing transmission by the circularly polarized wave through the radio signal transmission line. Incidentally, to facilitate understanding of description, description will be made of a case where the first communicating block is mounted in a fixed unit, the second communicating block is mounted in a movable unit, and the movable unit mounted with the second communicating block is formed so as to be rotatable about the axis of rotation relative to the fixed unit mounted with the first communicating block.

1) An antenna for a circularly polarized wave (circularly polarized wave probe) is used in both communicating blocks of the fixed unit and the movable unit. In this case, no particular provision is necessary for the radio signal transmission line. For example, in a case of transmission from the fixed unit to the movable unit, the transmission is performed by a circularly polarized wave from the circularly polarized wave probe of the communicating block on the fixed unit side to the radio signal transmission line. The circularly polarized wave probe of the communicating block on the movable unit side can receive the circularly polarized wave propagated through the radio signal transmission line without any problem even when the movable unit is making rotation (including endless rotation). A case of transmission in an opposite direction from the movable unit to the fixed unit may be considered similarly.

2) An antenna for a linearly polarized wave (linearly polarized wave probe) is used in the communicating block of one of the fixed unit and the movable unit, and an antenna for a circularly polarized wave (circularly polarized wave probe) is used in the communicating block of the other of the fixed unit and the movable unit. In this case, the radio signal transmission line is a waveguide structure, and a polarized wave converting unit for performing conversion between the circularly polarized wave and the linearly polarized wave is provided.

Description will be made of for example a case where the linearly polarized wave probe is provided to the communicating block on the fixed unit side, and the circularly polarized wave probe is provided to the communicating block on the movable unit side. In a case of transmission from the fixed unit to the movable unit, the transmission is performed by a linearly polarized wave from the linearly polarized wave probe of the communicating block on the fixed unit side to the radio signal transmission line. The linearly polarized wave is converted into a circularly polarized wave by the polarized wave converting unit provided to the radio signal transmission line (waveguide). The converted circularly polarized wave propagates through the radio signal transmission line, and reaches the circularly polarized wave probe of the communicating block on the movable unit side. Thus, the circularly polarized wave propagated through the radio signal transmission line can be received without any problem even when the movable unit is making rotation (including endless rotation).

In a case of transmission from the movable unit to the fixed unit, the transmission is performed by a circularly polarized wave from the circularly polarized wave probe of the communicating block on the movable unit side to the radio signal transmission line. The circularly polarized wave is converted into a linearly polarized wave by the polarized wave converting unit provided to the radio signal transmission line (waveguide). The converted linearly polarized wave propagates through the radio signal transmission line, and reaches the linearly polarized wave probe of the communicating block on the fixed unit side. Thus, even when the movable unit is making rotation (including endless rotation), the circularly polarized wave propagated through the radio signal transmission line can be converted into the linearly polarized wave by the polarized wave converting unit without any problem, and the linearly polarized wave can be received on the fixed unit side without any problem.

A case where the circularly polarized wave probe is provided to the communicating block on the fixed unit side and the linearly polarized wave probe is provided to the communicating block on the movable unit side can be considered similarly.

3) An antenna for a linearly polarized wave (linearly polarized wave probe) is used in both the communicating blocks of the fixed unit and the movable unit. In this case, the radio signal transmission line is a waveguide structure, and a polarized wave converting unit for performing conversion between a circularly polarized wave and a linearly polarized wave is provided in an even number of stages. That is, a first polarized wave converting unit for converting a linearly polarized wave into a circularly polarized wave and a second polarized wave converting unit for converting (returning) the circularly polarized wave converted by the first polarized wave converting unit into a linearly polarized wave are provided. Because it suffices to have this relation, there may be a plurality of pairs of the first and second polarized wave converting units.

In a case of transmission from the fixed unit to the movable unit, the transmission is performed by a linearly polarized wave from the linearly polarized wave probe of the communicating block on the fixed unit side to the radio signal transmission line. The linearly polarized wave is converted into a circularly polarized wave by the first polarized wave converting unit provided to the radio signal transmission line (waveguide). The converted circularly polarized wave is further converted (returned) to a linearly polarized wave by the second polarized wave converting unit provided to the radio signal transmission line (waveguide). The linearly polarized wave converted by the second polarized wave converting unit propagates through the radio signal transmission line, and reaches the linearly polarized wave probe of the communicating block on the movable unit side.

Thus, even when the movable unit is making rotation (including endless rotation), the linearly polarized wave propagated from one communicating block through the radio signal transmission line can be converted into a circularly polarized wave by the first polarized wave converting unit without any problem, the circularly polarized wave can be further converted into a linearly polarized wave by the second polarized wave converting unit without any problem, and the linearly polarized wave can be received by the linearly polarized wave probe of the other communicating block without any problem.

According to one mode of the present invention, by performing radio transmission between a first communicating block and a second communicating block rotatable about an axis of rotation relative to the first communicating block by circularly polarized wave, a radio signal emitted from one communicating block can be received by the other communicating block without any problem even when a structure in which the second communicating block makes rotation relative to the first communicating block (which rotation includes endless rotation) is adopted.

BRIEF DESCRIPTION OF THE DRAWINGS

FIG. 2 is a diagram of assistance in explaining combinations of constituent elements of the radio communicating device according to the present embodiment;

FIGS. 5A to 5O are diagrams of assistance in explaining polarized wave converting units in a second example and a third example;

FIGS. 6A and 6B are diagrams of assistance in explaining a radio communicating device according to a first embodiment;

FIGS. 7A to 7C are diagrams of assistance in explaining a radio communicating device according to a second embodiment;

FIGS. 8A to 8D are diagrams of assistance in explaining a radio communicating device according to a third embodiment;

FIG. 9 is a diagram of assistance in explaining a functional configuration of a signal interface of a radio transmission system;

FIGS. 10A to 10C are diagrams of assistance in explaining signal multiplexing in the radio transmission system;

FIG. 13 is a diagram of assistance in explaining examples of configuration of a receiver side to which the injection locking system is applied;

DETAILED DESCRIPTION OF THE PREFERRED EMBODIMENTS

Preferred embodiments of the present invention will hereinafter be described in detail with reference to the drawings. Functional elements will be identified by capital English references such as A, B, C, . . . and the like when the functional elements are distinguished by embodiment, and will be described with the references omitted when the functional elements are described without being particularly distinguished from each other. The same is true for the drawings.

Incidentally, description will be made in the following order.

1. Structure: Basic Constitution
2. Transmitting and Receiving Antenna (Linearly Polarized Wave Probe and Circularly Polarized Wave Probe)
3. Polarized Wave Converter (Circularly polarized wave generator of Grooved Circular Waveguide, Metallic Projecting Object, and Dielectric)
4. Structure: First Embodiment (Circularly Polarized Wave Probe+Circularly Polarized Wave Probe)
5. Structure: Second Embodiment (Linearly Polarized Wave Probe+Circularly Polarized Wave Probe)
6. Structure: Third Embodiment (Linearly Polarized Wave Probe+Linearly Polarized Wave Probe)
7. Communication Processing System: Basic
8. Communication Processing System: Modulation and Demodulation (Basic Constitution and Injection Locking System)
9. Communication Processing System: First Example of Application
10. Communication Processing System: Second Example of Application
11. Electronic Device to which Rotational Structure is Applied (Monitoring Camera and Three-Dimensional Image Reproducing Device)

<Structure: Basic Constitution>

FIGS. 1A to 1D and 2 are diagrams of assistance in explaining basics of a radio communicating device 1000 (radio communicating device) applied to a rotational structure of an electronic device according to a present embodiment. FIGS. 1A to 1D are general views showing basics of the radio communicating device 1000 according to the present embodiment. FIG. 2 is a diagram of assistance in explaining combinations of constituent elements of the radio communicating device 1000 according to the present embodiment.

[General View]

Figure 1A:
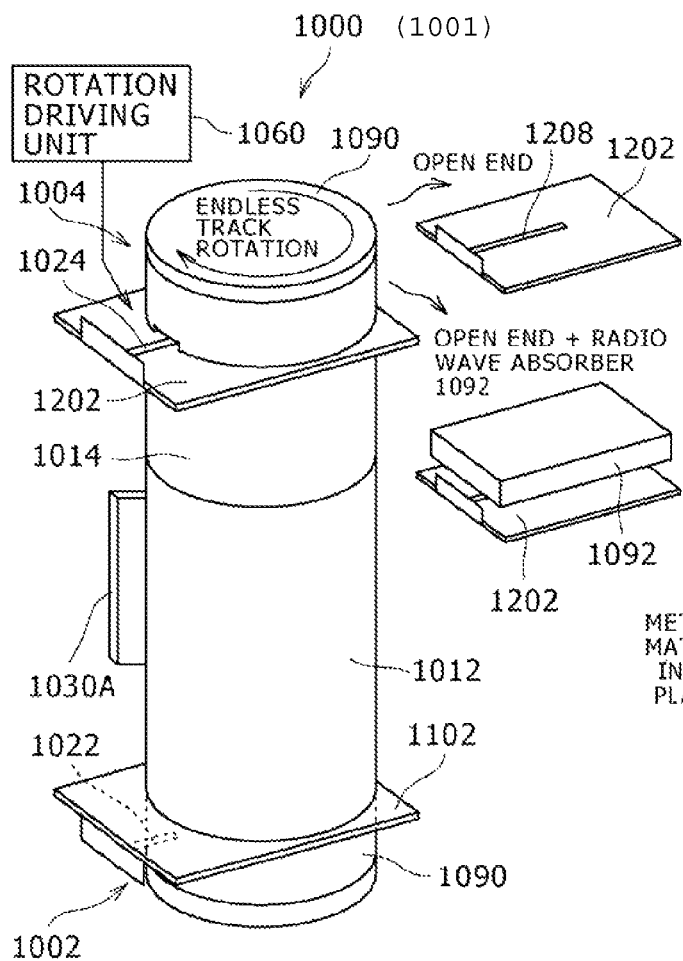
FIGS. 1A to 1D are general views showing basics of a radio communicating device according to a present embodiment.
Figure 1B:
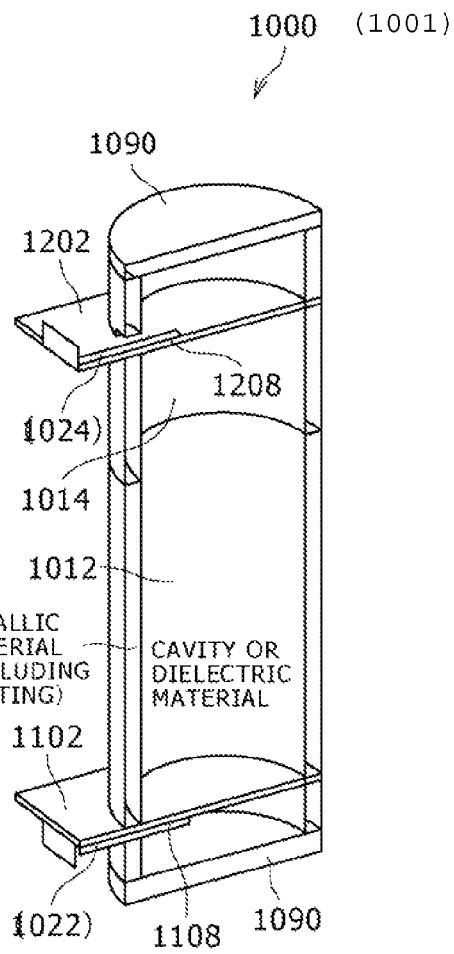
Figure 1C:
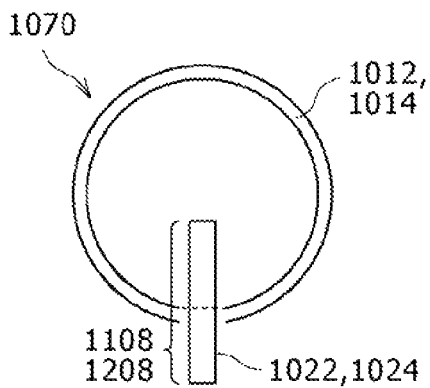

As shown in FIGS. 1A and 1B, a rotational structure 1001 to which the radio communicating device 1000 according to the present embodiment is applied includes a fixed unit 1002 functioning as a supporting unit, a movable unit 1004 functioning as a rotating unit, and tubular waveguides 1012 and 1014 interposed between the fixed unit 1002 and the movable unit 1004 and forming a transmission line (waveguide) through which a radio wave propagates. In the example shown in the figure, the waveguide 1012 on the side of the fixed unit 1002 has a longer tube length than the waveguide 1014 on the side of the movable unit 1004.

Incidentally, it suffices for the fixed unit 1002 and the movable unit 1004 to be of a structure such that the movable unit 1004 is rotatable relative to the fixed unit 1002, which does not mean that the fixed unit 1002 is fixed at an absolute position. The fixed unit 1002 and the movable unit 1004 may be of a structure such that the fixed unit 1002 also rotates and further the movable unit 1004 rotates with respect to the rotating fixed unit 1002. Incidentally, the whole of both communicating blocks does not need to be of a relatively rotatable structure. In short, it suffices to be relatively rotatable in the vicinity of transmitting and receiving transmission line coupling parts of both communicating blocks. Various methods are known as to how connection between a rotating part and a non-rotating part is established. These various mechanisms are applicable to the present embodiment. The same is true for each example to be described later.

The waveguides 1012 and 1014 are coupled to each other, and are used integrally as one waveguide. A rotation driving unit 1060 for driving the rotation of the movable unit 1004 is formed so as to be connectable to the movable unit 1004. It suffices for the rotational structure 1001 to be connectable to the rotation driving unit 1060. The rotational structure 1001 may be distributed including the rotation driving unit 1060, or may be distributed without including the rotation driving unit 1060.

The waveguides 1012 and 1014 are fixed to the fixed unit 1002. The cross-sectional shape of the waveguides 1012 and 1014 is optimally a circle (perfect circle), but is not limited to this. It suffices for the cross-sectional shape of the waveguides 1012 and 1014 to be close to a circle, and the cross-sectional shape of the waveguides 1012 and 1014 may be an ellipse or a polygon (having a relatively large number of angles, such for example as an octagon or a dodecagon). However, polygons having a small number of angles (for example a triangle and a quadrangle) greatly differ from a circular shape and are thus not desirable.

The inside of the waveguides 1012 and 1014 functions as a radio signal transmission line. The inside of the waveguides 1012 and 1014 may be hollow (that is, an air is present inside). Specifically, the waveguides 1012 and 1014 may be a hollow waveguide forming a radio signal transmission line (for example a millimeter wave signal transmission line), a shielding material (for example a metallic material) for suppressing external radiation of a radio signal (radio wave) being provided so as to surround the transmission line, and the transmission line inside the shielding material being hollow.

However, the inside of the waveguides 1012 and 1014 is desirably filled with a dielectric material. The filling of a dielectric material can suppress multiple reflection within the waveguide, and reduce the cross-sectional size (tube diameter) of the waveguide. For example, when the waveguides 1012 and 1014 are a circular waveguide, and that the dielectric constant of the filled-in dielectric is $\in$, the diameter of the waveguide can be reduced to about $1/\sqrt{\in}$ times that of a hollow waveguide. In addition, a reflection component due to a mismatch of a transmitting (receiving) port may cause multiple reflection within the waveguide, and adversely affect the transmitting (receiving) port. When an air is present inside the waveguide, a passing loss hardly occurs, and multiple reflection does not attenuate power level and has a great adverse effect. On the other hand, when a lossy dielectric is filled in, the power level of a reflected wave is attenuated, and thus the adverse effect is suppressed.

Even in the case of the waveguides 1012 and 1014 being filled with a dielectric material, a member on the periphery of the waveguides 1012 and 1014 is desirably a metallic material. In short, a signal transmission line for transmitting the signal of an electromagnetic wave may be an air (so-called free space), but desirably has a structure that transmits the electromagnetic wave while confining the electromagnetic wave in the transmission line. Incidentally, when the waveguides 1012 and 1014 in which a dielectric is inserted are made by filling in a dielectric material, the inside of a tubular member of a metallic material may be filled with the dielectric, or a surface treatment (referred to as metal plating) may be performed which coats the periphery of the dielectric material with a thin film of a metallic material so as to cover the periphery of the dielectric material. The structure in which metal plating is performed on the periphery of a dielectric material can not only be miniaturized but also have a lighter weight than in the case of the inside of a casing of a metallic material being filled with a dielectric. On the other hand, the structure in which the inside of a tubular member of a metallic material is filled with a dielectric material has a higher strength than in the case of metal plating.

The fixed unit 1002 is attached (fixed) to for example a stand, a wall, or a ceiling. The movable unit 1004 is a member rotating on an axis of rotation. The movable unit 1004 is rotatably coupled to the fixed unit 1002 by a coupling shaft not shown in the figure which coupling shaft is disposed within the waveguides 1012 and 1014. For example, though not shown in the figure, the casing is coupled to the coupling shaft via a bearing, and is formed so as to be capable of endless rotation (endless track rotation) under driving of the rotation driving unit 1060. Preferably, the center of the waveguides 1012 and 1014 is made to coincide with the center of the axis of rotation of the movable unit 1004. Incidentally, in the example of constitution shown in the figure, the waveguide 1014, a board 1202, a microstrip line 1024, and a terminating member 1090 are members forming the movable unit 1004, and a whole including these members and one communicating block not shown in the figure is rotated relative to the fixed unit 1002 including another communicating block.

The fixed unit 1002 and the movable unit 1004 have boards 1102 and 1202 mounted with circuit parts. The boards 1102 and 1202 are mounted with a communicating device (a communicating block and a radio communicating device) including a transmitting unit and a receiving unit for transmitting a signal to be transmitted to the other by radio (for example a microwave band or a millimeter wave band). A circuit configuration of the communicating device will be described later.

The boards 1102 and 1202 are provided with transmission line coupling sections 1108 and 1208 including microstrip lines 1022 and 1024 as an example of lines electrically connected to a transmitting unit and a receiving unit not shown in the figure. For example, the transmission line coupling sections 1108 and 1208 for supplying or receiving an electromagnetic wave to or from the waveguides 1012 and 1014 are provided to ends on the side of the waveguides 1012 and 1014.

The end parts of the waveguides 1012 and 1014 of the fixed unit 1002 and the movable unit 1004 may be terminated by a terminating member 1090 (short block). When the terminating member 1090 is used, a wave reflected by the terminating member 1090 can also be used for transmission and reception, and thus improve sensitivity. However, the occurrence of an undesired standing wave within the waveguides 1012 and 1014 due to multiple reflection within the tube can be a problem.

The end parts of the waveguides 1012 and 1014 may remain opened, or an absorbing member (radio wave absorber 1092) for absorbing a radio signal radiated from the transmission line coupling sections 1108 and 1208 and the waveguides 1012 and 1014 may be disposed in the vicinity of the end parts of the waveguides 1012 and 1014 while the end parts of the waveguides 1012 and 1014 are opened. When the radio wave absorber 1092 is used at an open end, reflected waves cannot be used for transmission or reception, but radio waves leaking from the end part can be absorbed. Therefore, external leakage can be prevented, and the level of multiple reflection within the waveguides 1012 and 1014 can be lowered.

The transmission line coupling sections 1108 and 1208 have an antenna structure. The antenna structure refers to a structure in a section coupled to the signal transmission line formed within the waveguides 1012 and 1014. It suffices for the antenna structure to couple an electric signal in the microwave band or the millimeter wave band to the signal transmission line, and the antenna structure does not mean only an antenna itself. For example, the antenna structure includes an antenna terminal, a microstrip line, and an antenna. Details of the transmission line coupling sections 1108 and 1208 will be described later.

In the radio communicating device 1000 according to the present embodiment, radio transmission is performed using a circularly polarized wave within the waveguides 1012 and 1014. Preferably, the millimeter wave band is used as a transmission frequency band (carrier frequency band).

For example, when the waveguides 1012 and 1014 are a circular waveguide, the millimeter wave band is given by a cutoff frequency $Fc=c*1.814/(2*\pi*a)$ [Hz] in a fundamental mode (TE11 mode), where "c" is a speed of light, which is $2.99792458*10^8$ [m/s], and "a" is the radius [m] of the waveguide. For example, when a=1.75 mm, the millimeter wave band is usable at Fc=49.458 [GHz] and higher.

The movable unit 1004 can thereby perform endless rotation relative to the fixed unit 1002. That is, because a circularly polarized wave is used within the waveguides 1012 and 1014, communication is possible even when the endless rotation on the central axis of the waveguide on the rotating side is performed. There is another advantage of being able to miniaturize the structure by using the millimeter wave band.

In using a circularly polarized wave within the waveguides 1012 and 1014, it is possible to adopt a method of using a circularly polarized wave probe for the transmission line coupling sections 1108 and 1208 and a method of providing a functional section for performing conversion between a linearly polarized wave and a circularly polarized wave (a polarized wave converting unit and a circularly polarized wave generator) within the waveguides 1012 and 1014 while using a linearly polarized wave probe for the transmission line coupling sections 1108 and 1208. There may also be a combination of these methods.

For example, the transmission line coupling sections 1108 and 1208 can adopt three modes, that is, a mode in which both the transmission line coupling sections 1108 and 1208 supply or receive an electromagnetic wave as a linearly polarized wave to or from the waveguides 1012 and 1014, a mode in which both the transmission line coupling sections 1108 and 1208 supply or receive an electromagnetic wave as a circularly polarized wave to or from the waveguides 1012 and 1014, and a mode in which one of the transmission line coupling sections 1108 and 1208 supplies or receives an electromagnetic wave as a linearly polarized wave to or from the waveguide 1012 or 1014 and the other supplies or receives an electromagnetic wave as a circularly polarized wave to or from the waveguide 1012 or 1014.

In the case of a linearly polarized wave, a linearly polarized wave generator (linearly polarized wave probe 1070: FIG.

Figure 1D:
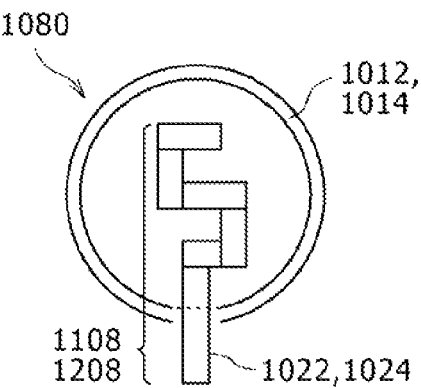

1C) is used as a linearly polarized wave antenna for the transmission line coupling sections 1108 and 1208. In the case of a circularly polarized wave, a circularly polarized wave generator (circularly polarized wave probe 1080: FIG. 1D) is used as a circularly polarized wave antenna for the transmission line coupling sections 1108 and 1208. When a linearly polarized wave is applied, a polarized wave converting unit 1030 (polarized wave converting device: so-called polarizer) for performing conversion between linearly polarized waves and circularly polarized waves is provided to the waveguides 1012 and 1014. FIG. 1A shows a polarized wave converting unit 1030A in a first example to be described later to be used as the polarized wave converting unit 1030 on the side of the waveguide 1012. Though not shown in the figure, the disposition of the polarized wave converting unit 1030 is susceptible of various modifications such as changing a dividing position of the waveguides 1012 and 1014 and disposing the polarized wave converting unit 1030 on the side of the waveguide 1014, providing the polarized wave converting unit 1030 to both waveguides 1012 and 1014, and the like.

[Example of Combinations]

FIG. 2 is a table summarizing combinations of the above elements. Combinations applicable as the radio communicating device 1000 according to the present embodiment and combinations not applicable as the radio communicating device 1000 according to the present embodiment are understood from this table. In the item of "end part" in the figure, "short" represents a case of using the terminating member 1090, and "open" represents a case of opening the end part. Incidentally, as described above, in the case of an "open" end part, the radio wave absorber 1092 is desirably disposed in the vicinity of the end part. "Short (open)" represents a case of being short or open, and "open (short)" represents a case of being open or short. Combinations are made such that when one is short, the other is open and such that when one is open, the other is short.

In the item of "probe" in the figure, "circular" represents a case of using the circularly polarized wave probe 1080, and "linear" represents a case of using the linearly polarized wave probe 1070. "Linear (circular)" represents a case of using the linearly polarized wave probe 1070 or the circularly polarized wave probe 1080, and "circular (linear)" represents a case of using the circularly polarized wave probe 1080 or the linearly polarized wave probe 1070. Combinations are made such that when one uses the linearly polarized wave probe 1070, the other uses the circularly polarized wave probe 1080 and such that when one uses the circularly polarized wave probe 1080, the other uses the linearly polarized wave probe 1070.

In the item of "evaluation," ranking is provided in order of "A" to "E." "A" is an optimum combination, and undesirable problems become more obvious in order of B→C→D→E.

For example, a first example of constitution using the circularly polarized wave probe 1080 for both the fixed unit 1002 and the movable unit 1004 and having the terminating member 1090 disposed at the end parts of both the fixed unit 1002 and the movable unit 1004 does not need the polarized wave converting unit 1030 on the waveguide 1012 or 1014, and has a simple structure. The first example of constitution is therefore considered to be a most desirable mode, and is thus given "A." In this case, while there is no escape for an electromagnetic wave reflected by the terminating members 1090, the electromagnetic wave propagates as a circularly polarized wave. There is thus a low probability of an undesired standing wave appearing even when multiple reflection occurs within the waveguides 1012 and 1014. However, there is a drawback in that the circularly polarized wave probe 1080 used by both the fixed unit 1002 and the movable unit 1004 is more difficult to design than the linearly polarized wave probe 1070.

A fourth example of constitution in which one uses the linearly polarized wave probe 1070 and the other uses the circularly polarized wave probe 1080 and the terminating member 1090 is disposed at the end parts of both the fixed unit 1002 and the movable unit 1004 needs the polarized wave converting unit 1030 on one of the waveguides 1012 and 1014, and has a more complex structure than the first example of constitution. The fourth example of constitution is therefore given "B." In this case, even when the axial ratio of a circularly polarized wave is degraded, the other is a linearly polarized wave. Therefore the fourth example of constitution is advantageous as compared with the first example of constitution in terms of an axial ratio characteristic. There is another advantage of being able to use the linearly polarized wave probe 1070 that is easier to design than the circularly polarized wave probe 1080 for one of the fixed unit 1002 and the movable unit 1004. In addition, while there is no escape for an electromagnetic wave reflected by the terminating members 1090, the polarized wave converting unit 1030 is interposed. There is thus a low probability of an undesired standing wave appearing even when multiple reflection occurs within the waveguides 1012 and 1014.

A tenth to a twelfth example of constitution in which both are "linear" and the polarized wave converting unit 1030 is not present within the waveguide 1012 or 1014 are combinations not suitable as the radio communicating device 1000 according to the present embodiment, and are thus given "E." This is because the tenth to twelfth examples of constitution are cases where an electromagnetic wave is made incident on the side of the movable unit 1004 from the side of the fixed unit 1002 while the electromagnetic wave remains in a state of a linearly polarized wave or an electromagnetic wave is emitted as a linearly polarized wave from the side of the movable unit 1004 and then made incident on the side of the fixed unit 1002, falling into a situation in which endless rotation is impossible unless a circularly polarized wave is used.

A seventh example of constitution in which both are "linear," the polarized wave converting unit 1030 is present within the waveguide 1012 but the polarized wave converting unit 1030 is not present within the waveguide 1014, and the terminating member 1090 is provided to the end parts of both the fixed unit 1002 and the movable unit 1004 cannot be said to be a desirable combination. The seventh example of constitution is thus given "E." This is because there is no escape for an electromagnetic wave reflected by the terminating members 1090, and an undesired standing wave caused by multiple reflection within the waveguides 1012 and 1014 can appear noticeably.

On the other hand, a thirteenth example of constitution in which the terminating member 1090 is disposed at the end parts of both the fixed unit 1002 and the movable unit 1004 among the thirteenth to a fifteenth example of constitution in which both are "linear" but the polarized wave converting unit 1030 is present within both the waveguides 1012 and 1014 has a more complex structure than the first example of constitution and is thus given "B" as with the fourth example of constitution. In this case, even when the axial ratio of a circularly polarized wave is degraded, the other is a linearly polarized wave. Thus the thirteenth example of constitution is advantageous as compared with the first example of constitution in terms of an axial ratio characteristic. However, the thirteenth example of constitution has a disadvantage of an increased total length of the waveguides. On the other hand, the thirteenth example of constitution has an advantage in that both the fixed unit 1002 and the movable unit 1004 can use the linearly polarized wave probe 1070 that is easier to design than the circularly polarized wave probe 1080. In addition, while there is no escape for an electromagnetic wave reflected by the terminating members 1090, the polarized wave converting unit 1030 is interposed. There is thus a low probability of an undesired standing wave appearing even when multiple reflection occurs within the waveguides 1012 and 1014. Incidentally, cases where one or both of the end parts are an open end are inferior to the thirteenth example of constitution in which the terminating member 1090 is disposed at the end parts of both the fixed unit 1002 and the movable unit 1004 and have a disadvantage of an increased total length of the waveguides as compared with the second and third examples of constitution, and are thus given "D."

<Transmitting and Receiving Antenna>

Figure 3A:
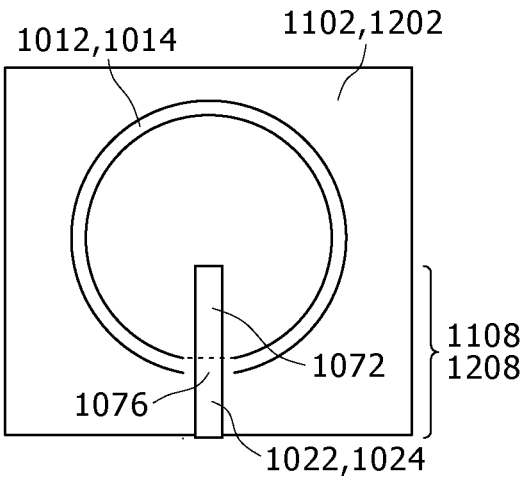
FIGS. 3A to 3F are diagrams of assistance in explaining transmitting and receiving antennas used by the radio communicating device according to the present embodiment.

FIGS. 3A to 3F are diagrams of assistance in explaining transmitting and receiving antennas used by the radio communicating device 1000 according to the present embodiment. FIG. 3A shows an example of constitution of the linearly polarized wave probe 1070. FIGS. 3B to 3F show an example of constitution of the circularly polarized wave probe 1080.

The linearly polarized wave probe 1070 has, as a transmitting and receiving antenna, a linear bar-shaped member 1072 inserted so as to be perpendicular to the waveguide 1012 or 1014 in a base end side part of the tubular (preferably cylindrical) waveguide 1012 or 1014. As is clear from the structure of the linearly polarized wave probe 1070, the linearly polarized wave probe 1070 is very simple as compared with the circularly polarized wave probe 1080 to be described later. Though not shown in the figure, as with the circularly polarized wave probe 1080 to be described later, the end part of the waveguide 1012 or 1014 is provided with a terminating member 1090, is an open end, or is an open end with a radio wave absorber 1092 disposed in the vicinity of the end part of the waveguide 1012 or 1014.

In forming a state of the linear bar-shaped member 1072 inserted so as to be perpendicular to the waveguide 1012 or 1014, for example, the state of the linear bar-shaped member 1072 inserted so as to be perpendicular to the waveguide 1012 or 1014 is formed by linearly depositing and forming a conductor pattern in the form of a foil film for forming the bar-shaped member 1072 of copper or another conductor on one principal plane part of the flat-shaped board 1102 or 1202 formed of a dielectric material (insulating material) by means such as so-called etching or the like. That is, because the bar-shaped member 1072 formed of the conductor pattern is formed on one plane of the board 1102 or 1202, the linearly polarized wave probe 1070 can be reduced in thickness, and has a simplified constitution.

The linearly polarized wave probe 1070 (linearly polarized wave generator) of such a structure can be used as a linearly polarized wave transmitting antenna. Specifically, the linearly polarized wave probe 1070 is supplied with a linearly polarized wave state transmitting signal from a sending and receiving terminal 1076, and thereby radiates a linearly polarized wave in a direction perpendicular to the principal plane part of the board 1102 or 1202, that is, in a direction of the front end side of the waveguide 1012 or 1014 via the bar-shaped member 1072. In addition, the linearly polarized wave probe 1070 can be used also as a linearly polarized wave receiving antenna. Specifically, when the linearly polarized wave probe 1070 is used as a linearly polarized wave receiving antenna, the linearly polarized wave probe 1070 receives a linearly polarized wave incident on the principal plane of the board 1102 or 1202 in the perpendicular direction from the front end side of the waveguide 1012 or 1014 by the bar-shaped member 1072, and outputs the linearly polarized wave as a linearly polarized wave state received signal from the sending and receiving terminal 1076.

On the other hand, the circularly polarized wave probe 1080 has, as a transmitting and receiving antenna, a crank-shaped member 1082 formed by a combination of a plurality of linear members inserted so as to be perpendicular to the waveguide 1012 or 1014 in the base end side part of the tubular (preferably cylindrical) waveguide 1012 or 1014. Suppose for example that the crank-shaped member 1082 is formed by a combination of a first to a sixth linear member 1082_1 to 1082_6. The circularly polarized wave probe 1080 of such a structure is disclosed in Japanese Patent Laid-Open No. Hei 05-283902, for example.

In forming a state of the crank-shaped member 1082 inserted so as to be perpendicular to the waveguide 1012 or 1014, for example, the state of the crank-shaped member 1082 inserted so as to be perpendicular to the waveguide 1012 or 1014 is realized by forming conductor patterns in the form of a crank forming the crank-shaped member 1082 on one principal plane part of the flat-shaped board 1102 or 1202 formed of a dielectric material (insulating material).

The dimensions of each of the linear members 1082_1 to 1082_6 (conductor pattern of each of the linear members 1082_1 to 1082_6) forming the crank shape are set as follows according to wavelength $\lambda$. Suppose that the first linear member 1082_1 has a length of about $\frac{3}{8}\lambda$ with a sending and receiving terminal 1086 (a receiving terminal or a transmitting terminal) for sending and receiving an electromagnetic signal of the wavelength $\lambda$ on the base end side of the linear member 1082_1. The sending and receiving terminal is extended and connected to the microstrip line 1022 or 1024 formed on the board 1102 or 1202.

Suppose that the second linear member 1082_2 is made continuous with the first linear member 1082_1 from the top end part of the first linear member 1082_1, is extended in a one-side direction perpendicular to the first linear member 1082_1, and has a length of about $\frac{1}{8}\lambda$. Suppose that the third linear member 1082_3 is made continuous with the second linear member 1082_2 from the top end part of the second linear member 1082_2, is extended in the direction of the top end side of the first linear member 1082_1 in parallel with the first linear member 1082_1, and has a length of about $\frac{1}{4}\lambda$. Suppose that the fourth linear member 1082_4 is made continuous with the third linear member 1082_3 from the top end part of the third linear member 1082_3, is extended in an other-side direction perpendicular to the third linear member 1082_3, and has a length of about $\frac{1}{4}\lambda$. Suppose that the fifth linear member 1082_5 is made continuous with the fourth linear member 1082_4 from the top end part of the fourth linear member 1082_4, is extended in the direction of the top end side of the first linear member 1082_1 in parallel with the first linear member 1082_1, and has a length of about $\frac{1}{4}\lambda$. Suppose that the sixth linear member 1082_6 is made continuous with the fifth linear member 1082_5 from the top end part of the fifth linear member 1082_5, is extended in the one-side direction perpendicular to the fifth linear member 1082_5, and has a length of about $\frac{1}{8}\lambda$.

That is, the crank-shaped member 1082 is formed with the second linear member 1082_2 and the sixth linear member 1082_6 having a position and shape rotationally symmetric to each other with respect to the fourth linear member 1082_4 and with the third linear member 1082_3 and the fifth linear member 1082_5 having a position and shape rotationally symmetric to each other with respect to the fourth linear member 1082_4.

Thus, the circularly polarized wave probe 1080 is formed by depositing and forming conductor patterns in the form of a foil film of copper or another conductor so as to form substantially a crank shape by sequentially providing the first to sixth linear members 1082_1 to 1082_6 on the board 1102 or 1202 by means such as so-called etching or the like.

The width of the conductor patterns (first to sixth linear members 1082_1 to 1082_6) forming the crank-shaped member 1082 is set at a predetermined width according to the wavelength λ in consideration of a signal transmission loss. In this example, the one-side direction is a right side direction facing the board 1102 or 1202, and the other-side direction is a left side direction facing the board 1102 or 1202.

Figure 3B:
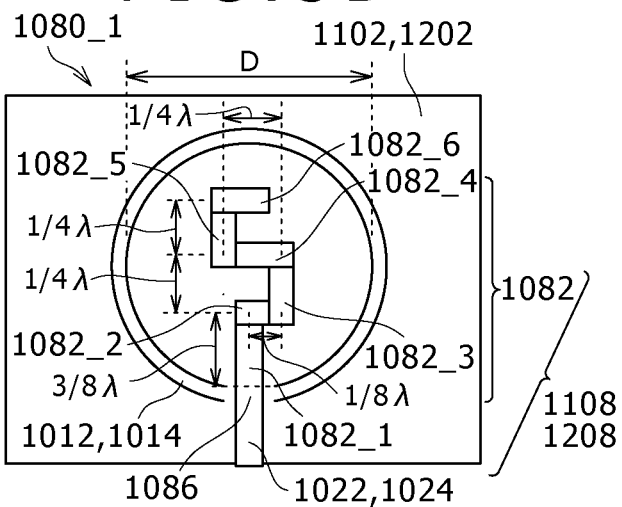
Figure 3F:
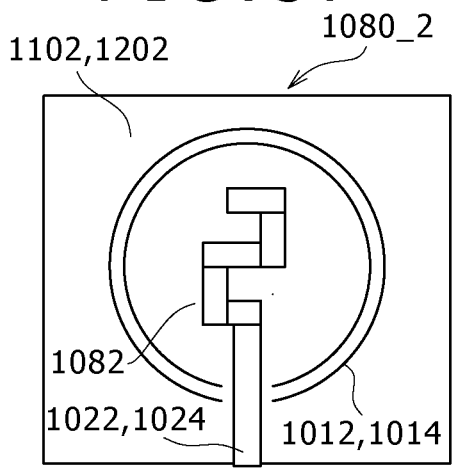

The circularly polarized wave probe 1080 having the crank-shaped member 1082 of such a structure is used in a state of being disposed within the waveguide 1012 or 1014. That is, the board 1102 or 1202 is disposed such that a part having the conductor patterns formed therein is positioned within the board 1102 or 1202. The board 1102 or 1202 is disposed within the waveguide 1012 or 1014 with the principal plane part of the board 1102 or 1202 perpendicular to the center of the waveguide 1012 or 1014 in a state in which the conductor patterns (first to sixth linear members 1082_1 to 1082_6) forming the crank-shaped member 1082 are positioned within the tubular (preferably cylindrical) waveguide 1012 or 1014 whose front end side is opened and whose rear end side is closed. A part of the board 1102 or 1202 is drawn out to the outside of the waveguide 1012 or 1014. The microstrip line 1022 or 1024 is formed on the part of the board 1102 or 1202 which part is drawn out to the outside of the waveguide 1012 or 1014. The inside diameter of the waveguide 1012 or 1014 which inside diameter is indicated by an arrow D in FIG. 3B is at least about such a diameter as to be able to cover the crank-shaped member 1082 (conductor patterns: first to sixth linear members 1082_1 to 1082_6) with the fourth linear member 1082_4 as a center.

Figure 3C:
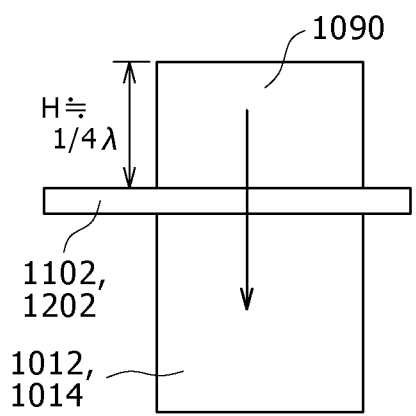
Figure 3D:
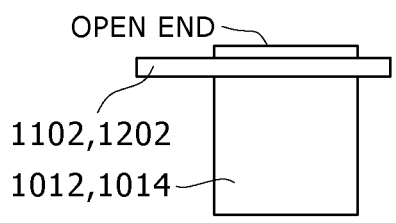
Figure 3E:
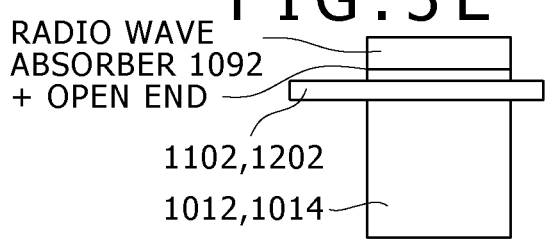

One principal plane part of the board 1102 or 1202 on which principal plane part the first to sixth linear members 1082_1 to 1082_6 are deposited and formed is faced to the front end side of the waveguide 1012 or 1014. The terminating member 1090, for example, is disposed on the rear end side of the waveguide 1012 or 1014 with the board 1102 or 1202 interposed between the front end side and the rear end side of the waveguide 1012 or 1014. The board 1102 or 1202 is supported at a position such that a distance from the board 1102 or 1202 to the rear end part of the waveguide 1012 or 1014, which distance is indicated by an arrow H in FIG. 3C, is about ¼λ. That is, the depth of the terminating member 1090 is set at about ¼λ. Of course, as shown in FIG. 3D, the rear end part side of the waveguide 1012 or 1014 may be an open end, or as shown in FIG. 3E, the rear end part side of the waveguide 1012 or 1014 may be an open end with the radio wave absorber 1092 disposed in the vicinity of the open end.

The circularly polarized wave probe 1080 (circularly polarized wave generator) of such a structure can be used as a circularly polarized wave transmitting antenna. Specifically, the circularly polarized wave probe 1080 is supplied with a linearly polarized wave state transmitting signal from a sending and receiving terminal 1086, and thereby radiates a circularly polarized wave in a direction perpendicular to the principal plane part of the board 1102 or 1202, that is, in a direction of the front end side of the waveguide 1012 or 1014 via the crank-shaped member 1082. In addition, the circularly polarized wave probe 1080 can be used also as a circularly polarized wave receiving antenna. Specifically, when the circularly polarized wave probe 1080 is used as a circularly polarized wave receiving antenna, the circularly polarized wave probe 1080 receives a circularly polarized wave incident on the principal plane of the board 1102 or 1202 in the perpendicular direction from the front end side of the waveguide 1012 or 1014 by the crank-shaped member 1082, and outputs the circularly polarized wave as a linearly polarized wave state received signal from the sending and receiving terminal 1086.

Incidentally, the circularly polarized wave has a phase shift of ¼λ (90°) between the amplitude of an electric field in an X-axis direction and the amplitude of the electric field in a Y-axis direction when the travelling direction of the circularly polarized wave is a Z-axis. The circularly polarized wave includes a right rotating polarized wave and a left rotating polarized wave depending on whether the phase of the amplitude of the electric field in the X-axis direction with respect to the amplitude of the electric field in the Y-axis direction is advanced or delayed. The crank-shaped member 1082 of a circularly polarized wave probe 1080_1 shown in FIG. 3B has a characteristic for transmitting and receiving the right rotating polarized wave. When the crank-shaped member 1082 is formed into such a shape as to be a mirror image of the circularly polarized wave probe 1080_1 of FIG. 3B as in a circularly polarized wave probe 1080_2 of FIG. 3F, the crank-shaped member 1082 has a characteristic for transmitting and receiving the left rotating polarized wave. That is, to transmit and receive the left rotating polarized wave, the crank-shaped member 1082 is desirably formed with the one-side direction set as the left side direction facing the board 1102 or 1202 and with the other-side direction set as the right side direction facing the board 1102 or 1202.

Hence, when the circularly polarized wave probe 1080 of such a structure for either of the right rotating polarized wave and the left rotating polarized wave is supplied with an electromagnetic signal of the wavelength λ from the sending and receiving terminal 1086 as the base end side of the first linear member 1082_1, the crank-shaped member 1082 (first to sixth linear members 1082_1 to 1082_6) radiates a circularly polarized wave in a direction perpendicular to the board 1102 or 1202. When a circularly polarized wave is made incident on the circularly polarized wave probe 1080 in the direction perpendicular to the board 1102 or 1202, the crank-shaped member 1082 (first to sixth linear members 1082_1 to 1082_6) receives the circularly polarized wave, and a linearly polarized wave state received signal is output from the sending and receiving terminal 1086. Because the crank-shaped member 1082 (first to sixth linear members 1082_1 to 1082_6) formed of conductor patterns is formed on one plane, the circularly polarized wave probe 1080 can be reduced in thickness, and has a simplified constitution. Though characteristic diagrams are not shown, the circularly polarized wave probe 1080 has excellent reception characteristics, that is, a low transmission loss and an excellent axial ratio (cross polarization discrimination) characteristic. Each conductor pattern disposed on the board 1102 or 1202 receives a circularly polarized wave with the excellent reception characteristics, and thereby the received signal can be sent to a circuit in a following stage via the sending and receiving terminal 1086.

Incidentally, the right rotating polarized wave and the left rotating polarized wave are used in a pair on the transmitting side and the receiving side. That is, when the circularly polarized wave probe 1080_1 for transmitting the right rotating polarized wave is used on the transmitting side, the circularly polarized wave probe 1080_1 for receiving the right rotating polarized wave is used on the receiving side. When the circularly polarized wave probe 1080_2 for transmitting the left rotating polarized wave is used on the transmitting side, the circularly polarized wave probe 1080_2 for receiving the left rotating polarized wave is used on the receiving side.

In addition, one (for example the fixed unit 1002) may be provided with the circularly polarized wave probe 1080_1 for transmitting the right rotating polarized wave and the circularly polarized wave probe 1080_2 for transmitting the left rotating polarized wave, and the other (for example the movable unit 1004) may be provided with the circularly polarized wave probe 1080_1 for transmitting the right rotating polarized wave and the circularly polarized wave probe 1080_2 for transmitting the left rotating polarized wave. In this case, sharing of two polarized waves, or transmitting (or receiving) the right rotating polarized wave and transmitting (or receiving) the left rotating polarized wave, is possible. By using cross polarization (the right rotating circularly polarized wave and the left rotating circularly polarized wave), double information can be transmitted while a same carrier frequency is used without frequency division multiplexing or other multiplexing methods being applied.

<Polarized Wave Converting Unit>

Figure 4A:
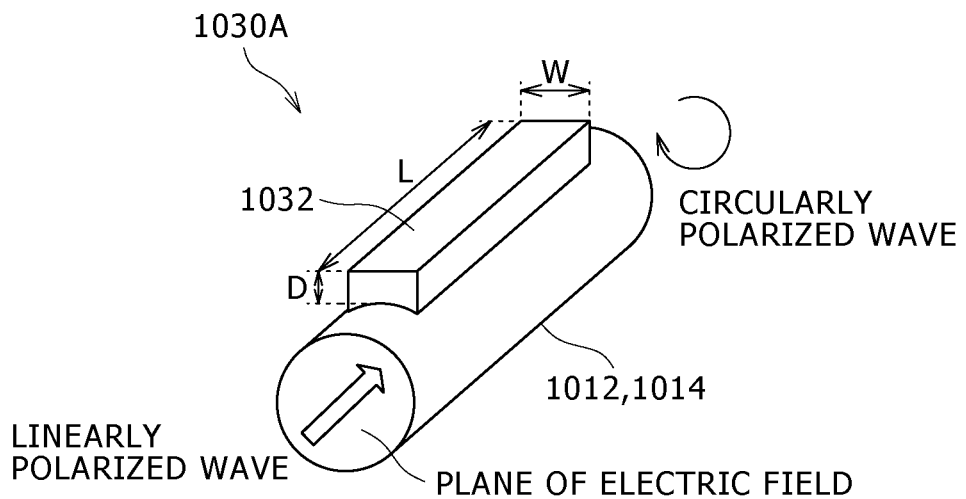
FIGS. 4A to 4C are diagrams of assistance in explaining a polarized wave converting unit in a first example.
Figure 4B:
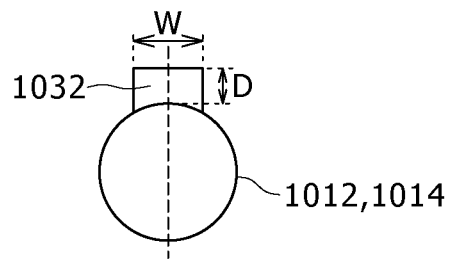
Figure 4C:
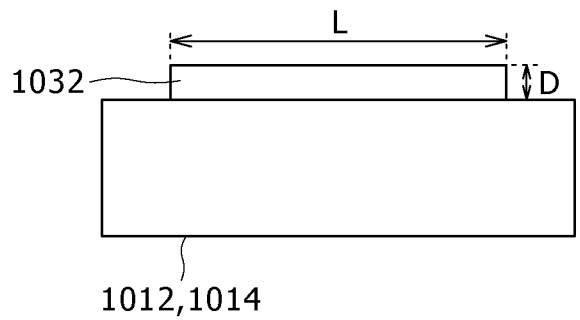

FIGS. 4A to 4C and FIGS. 5A to 5O are diagrams of assistance in explaining the polarized wave converting unit 1030 used by the radio communicating device 1000 according to the present embodiment. FIG. 4A is a perspective view, FIG. 4B is a bottom view, and FIG. 4C is a side view of the polarized wave converting unit 1030A.

The polarized wave converting unit 1030A in a first example shown in FIGS. 4A to 4C is a circularly polarized wave generator as an example of a mono-grooved circular waveguide formed on the waveguide 1012 or 1014, and uses a mechanism described in Naofumi Yoneda, et al., "Mono-Grooved Circular Waveguide Polarizers," 2002 IEEE MTT-S Digest, WE2C-4, pp. 821 to 824 (hereinafter referred to as Reference Document 1), for example.

The polarized wave converting unit 1030A in the first example is formed by providing a side groove 1032 (Coupling Groove) in the form of a rectangular parallelepiped on the outer surface of the tubular (preferably cylindrical) waveguide 1012 or 1014. Description in the following will be made of a case where a radio wave in the fundamental mode (TE11 mode) of the circular waveguide which radio wave forms a linearly polarized wave inclined by 45° with respect to a plane passing through the center of the side groove 1032 (broken line in FIG. 4B) is input from the input end of the waveguide 1012 or 1014.

Due to an effect of the side groove 1032, the incident radio wave produces a phase difference between a horizontal polarized wave component and a vertical polarized wave component with respect to the plane passing through the center of the side groove 1032 (broken line). At this time, when the dimensions (width W, depth D, and length L) of the side groove 1032 are properly designed relative to the cross-sectional dimensions of the waveguide 1012 or 1014 (for example a diameter φ in the case of a circular waveguide) as described in Reference Document 1, the radio wave in the fundamental mode which radio wave is output from the output end of the waveguide 1012 or 1014 on an opposite side from the input end of the waveguide 1012 or 1014 is a circularly polarized wave in a certain (desired) frequency band. This means that even when the fundamental mode having a horizontal polarized wave with respect to the plane passing through the center of the side groove 1032 (broken line) passes or the fundamental mode having a vertical polarized wave with respect to the plane passing through the center of the side groove 1032 (broken line) passes, reflection hardly occurs and a relative difference in passing phase between the horizontal polarized wave and the vertical polarized wave is "substantially 90 degrees."

A polarized wave converting unit 1030B in a second example shown in FIGS. 5A to 5E and FIGS. 5F to 5J are formed by providing a stepped plate-shaped metallic projecting object 1034 (metallic piece) on an inner surface within the tubular (preferably cylindrical) waveguide 1012 or 1014. The metallic projecting object 1034 is a plate having a width less than half of the inside diameter of the waveguide 1012 or 1014. The metallic projecting object 1034 has a stepped cross-sectional shape in the longitudinal direction of the waveguide 1012 or 1014, the longitudinal direction being the axial direction of the waveguide 1012 or 1014, and is disposed on the inner wall of the waveguide 1012 or 1014.

One metallic projecting object 1034 may be disposed on one side of the waveguide 1012 or 1014 as shown in FIGS. 5A to 5E, or two metallic projecting objects 1034 may be disposed diagonally on the waveguide 1012 or 1014 as shown in FIGS. 5F to 5J.

When the polarized wave converting unit 1030B in the second example is applied, a linearly polarized wave probe 1070 having a linear bar-shaped member 1072 inserted so as to be perpendicular to the waveguide 1012 or 1014 is combined and used in the base end side part of the waveguide 1012 or 1014. The polarized wave converting unit 1030B in the second example and the linearly polarized wave probe 1070 function in combination as a circularly polarized wave transmitting and receiving antenna.

For example, a circularly polarized wave is made incident on the circularly polarized wave transmitting and receiving antenna formed by the combination of the polarized wave converting unit 1030B in the second example and the linearly polarized wave probe 1070 from the opened top end side of the waveguide 1012 or 1014, as shown by an arrow in FIG. 5A and FIG. 5F. An electric field amplitude component of the circularly polarized wave in a direction perpendicular to the principal plane of the metallic projecting object 1034 passes through the waveguide 1012 or 1014 and reaches the bar-shaped member 1072 without being affected by the metallic projecting object 1034. On the other hand, an electric field amplitude component of the circularly polarized wave in a direction along the principal plane of the metallic projecting object 1034 is slowed in travelling speed by passing the metallic projecting object 1034, and reaches the bar-shaped member 1072. The electric field amplitude component of the circularly polarized wave which component passes the metallic projecting object 1034 is designed to have a delay corresponding to ¼λ when reaching the bar-shaped member 1072.

Thus, the electric field amplitude component of the circularly polarized wave in the direction perpendicular to the principal plane of the metallic projecting object 1034 and the electric field amplitude component of the circularly polarized wave in the direction along the principal plane of the metallic projecting object 1034 reach the bar-shaped member 1072 simultaneously with each other, and are output as a received signal via the bar-shaped member 1072. When the circularly polarized wave transmitting and receiving antenna formed by the combination of the polarized wave converting unit 1030B in the second example and the linearly polarized wave probe 1070 transmits a radio wave from the bar-shaped member 1072, the circularly polarized wave transmitting and receiving antenna can be used as a circularly polarized wave generator for transmitting a circularly polarized wave to the top end part of the waveguide 1012 or 1014 due to the effect of the metallic projecting object 1034.

In this case, the metallic projecting object 1034 and the bar-shaped member 1072 are set in an arrangement relation as follows. Incidentally, description will be made in a case where the direction of a radio wave is from the back of a paper plane to the front of the paper plane. First, as shown in FIGS. 5C to 5E and FIGS. 5H to 5J, positions obtained by shifting clockwise by 45 degrees, 135 degrees, 225 degrees, and 315 degrees about the central axis of the waveguide 1012 or 1014 (a horizontal direction is an axis X-X' and a vertical direction is an axis Y-Y') with respect to the bar-shaped member 1072 of the linearly polarized wave probe 1070 are set as 1, 2, 3, and 4, respectively.

The metallic projecting object 1034 is disposed at either "1 and 3, only 1, or only 3" (described as an arrangement mode A). These positions are in such a relation as to transmit and receive a same polarized wave to and from the linearly polarized wave probe 1070 (bar-shaped member 1072). Alternatively, the metallic projecting object 1034 is disposed at either "2 and 4, only 2, or only 4" (described as an arrangement mode B). These positions are in such a relation as to transmit and receive a same polarized wave to and from the linearly polarized wave probe 1070 (bar-shaped member 1072).

The arrangement mode A and the arrangement mode B are in a relation of cross polarization. Depending on relation to a position where the linearly polarized wave probe 1070 (bar-shaped member 1072) is disposed, a right rotating polarized wave is transmitted or received, or a left rotating polarized wave is transmitted or received. For example, when the metallic projecting object 1034 is disposed at either "1 and 3, only 1, or only 3," a right rotating polarized wave is transmitted or received when the linearly polarized wave probe 1070 (bar-shaped member 1072) is on the axis X-X', and a left rotating polarized wave is transmitted or received when the linearly polarized wave probe 1070 (bar-shaped member 1072) is on the axis Y-Y'. That is, as shown in FIG. 5C and FIG. 5H, when the bar-shaped member 1072 is disposed on the axis X-X' (may be disposed on either side of X and X'), a right rotating polarized wave can be transmitted (or received). As shown in FIG. 5D and FIG. 5I, when the bar-shaped member 1072 is disposed on the axis Y-Y' (may be disposed on either side of Y and Y'), a left rotating polarized wave can be transmitted (or received).

Incidentally, the right rotating polarized wave and the left rotating polarized wave are used in a pair on the transmitting side and the receiving side. That is, when one (for example the fixed unit 1002) uses the mode of FIG. 5C or FIG. 5H, the other (for example the movable unit 1004) uses the circularly polarized wave probe 1080_1 for receiving (transmitting) a right rotating polarized wave. When one (for example the fixed unit 1002) uses the mode of FIG. 5D or FIG. 5I, the other (for example the movable unit 1004) uses the circularly polarized wave probe 1080_2 for receiving (transmitting) a left rotating polarized wave.

In addition, as shown in FIG. 5E and FIG. 5J, when one of bar-shaped members 1072_1 and 1072_2 (bar-shaped member 1072_1) is disposed on the axis X-X' (may be disposed on either side of X and X'), and the other (bar-shaped member 1072_2) is disposed on the axis Y-Y' (may be disposed on either side of Y and Y'), sharing of two polarized waves, or transmitting (or receiving) a right rotating polarized wave by the bar-shaped member 1072_1 and transmitting (or receiving) a left rotating polarized wave by the bar-shaped member 1072_2, is possible. By using cross polarization (the right rotating circularly polarized wave and the left rotating circularly polarized wave), double information can be transmitted while a same carrier frequency is used without frequency division multiplexing or other multiplexing methods being applied.

A polarized wave converting unit 1030C in a third example shown in FIGS. 5K to 5O is formed by providing a wedge-shaped and plate-shaped inducing object plate 1036 on an inner surface within the tubular (preferably cylindrical) waveguide 1012 or 1014. The inducing object plate 1036 is a flat plate having a width equal to the inside diameter of the waveguide 1012 or 1014. The longitudinal direction of the inducing object plate 1036 is the axial direction of the waveguide 1012 or 1014. The inducing object plate 1036 is disposed on the axis of the waveguide 1012 or 1014.

When the polarized wave converting unit 1030C in the third example is applied, a linearly polarized wave probe 1070 having a linear bar-shaped member 1072 inserted so as to be perpendicular to the waveguide 1012 or 1014 is combined and used in the base end side part of the waveguide 1012 or 1014. The polarized wave converting unit 1030C in the third example and the linearly polarized wave probe 1070 function in combination as a circularly polarized wave transmitting and receiving antenna.

For example, a circularly polarized wave is made incident on the circularly polarized wave transmitting and receiving antenna formed by the combination of the polarized wave converting unit 1030C in the third example and the linearly polarized wave probe 1070 from the opened top end side of the waveguide 1012 or 1014, as shown by an arrow in FIG. 5K. An electric field amplitude component of the circularly polarized wave in a direction perpendicular to the principal plane of the inducing object plate 1036 passes through the waveguide 1012 or 1014 and reaches the bar-shaped member 1072 without being affected by the inducing object plate 1036. On the other hand, an electric field amplitude component of the circularly polarized wave in a direction along the principal plane of the inducing object plate 1036 is slowed in travelling speed by passing through the inducing object plate 1036, and reaches the bar-shaped member 1072. The electric field amplitude component of the circularly polarized wave which component passes through the inducing object plate 1036 is designed to have a delay corresponding to ¼λ when reaching the bar-shaped member 1072.

Thus, the electric field amplitude component of the circularly polarized wave in the direction perpendicular to the principal plane of the inducing object plate 1036 and the electric field amplitude component of the circularly polarized wave in the direction along the principal plane of the inducing object plate 1036 reach the bar-shaped member 1072 simultaneously with each other, and are output as a received signal via the bar-shaped member 1072. When the circularly polarized wave transmitting and receiving antenna formed by the combination of the polarized wave converting unit 1030C in the third example and the linearly polarized wave probe 1070 transmits a radio wave from the bar-shaped member 1072, the circularly polarized wave transmitting and receiving antenna can be used as a circularly polarized wave generator for transmitting a circularly polarized wave to the top end part of the waveguide 1012 or 1014 due to the effect of the inducing object plate 1036.

In this case, the inducing object plate 1036 and the bar-shaped member 1072 are set in an arrangement relation as follows. Incidentally, description will be made in a case where the direction of a radio wave is from the back of a paper plane to the front of the paper plane. First, as shown in FIGS. 5M to 5O, positions obtained by shifting clockwise by 45 degrees, 135 degrees, 225 degrees, and 315 degrees about the central axis of the waveguide 1012 or 1014 (a horizontal direction is an axis X-X' and a vertical direction is an axis Y-Y') with respect to the bar-shaped member 1072 of the linearly polarized wave probe 1070 are set as 1, 2, 3, and 4, respectively.

The inducing object plate 1036 is disposed in one of "a direction of 1 and 3" (described as an arrangement mode A) and a "direction of 2 and 4" (described as an arrangement mode B). The arrangement mode A and the arrangement mode B are in a relation of cross polarization. Depending on relation to a position where the linearly polarized wave probe 1070 (bar-shaped member 1072) is disposed, a right rotating polarized wave is transmitted or received, or a left rotating polarized wave is transmitted or received. For example, when the inducing object plate 1036 is disposed at either "1 and 3, only 1, or only 3," a right rotating polarized wave is transmitted or received when the linearly polarized wave probe 1070 (bar-shaped member 1072) is on the axis X-X', and a left rotating polarized wave is transmitted or received when the linearly polarized wave probe 1070 (bar-shaped member 1072) is on the axis Y-Y'. That is, as shown in FIG. 5M, when the bar-shaped member 1072 is disposed on the axis X-X' (may be disposed on either side of X and X'), a right rotating polarized wave can be transmitted (or received). As shown in FIG. 5N, when the bar-shaped member 1072 is disposed on the axis Y-Y' (may be disposed on either side of Y and Y'), a left rotating polarized wave can be transmitted (or received).

Incidentally, the right rotating polarized wave and the left rotating polarized wave are used in a pair on the transmitting side and the receiving side. That is, when one (for example the fixed unit 1002) uses the mode of FIG. 5M, the other (for example the movable unit 1004) uses the circularly polarized wave probe 1080_1 for receiving (transmitting) a right rotating polarized wave. When one (for example the fixed unit 1002) uses the mode of FIG. 5N, the other (for example the movable unit 1004) uses the circularly polarized wave probe 1080_2 for receiving (transmitting) a left rotating polarized wave.

In addition, as shown in FIG. 5O, when one of bar-shaped members 1072_1 and 1072_2 (bar-shaped member 1072_1) is disposed on the axis X-X' (may be disposed on either side of X and X'), and the other (bar-shaped member 1072_2) is disposed on the axis Y-Y' (may be disposed on either side of Y and Y'), sharing of two polarized waves, or transmitting (or receiving) a right rotating polarized wave by the bar-shaped member 1072_1 and transmitting (or receiving) a left rotating polarized wave by the bar-shaped member 1072_2, is possible. By using cross polarization (the right rotating circularly polarized wave and the left rotating circularly polarized wave), double information can be transmitted.

<Structure: First Embodiment>

FIGS. 6A and 6B are diagrams of assistance in explaining a radio communicating device 1000A and a rotational structure 1001A according to a first embodiment. The first example of constitution of the combination modes shown in FIG. 2 is applied to the radio communicating device 1000A (rotational structure 1001A) according to the first embodiment.

A waveguide 1012 on the side of a fixed unit 1002 has a longer tube length than a waveguide 1014 on the side of a movable unit 1004. The waveguide 1014, a board 1202, a microstrip line 1024, and a terminating member 1090 are members forming the movable unit 1004, and a whole including these members and one communicating block not shown in the figure is rotated relative to the fixed unit 1002 including another communicating block.

First, the radio communicating device 1000A (rotational structure 1001A) uses a circularly polarized wave probe 1080 for transmission line coupling sections 1108 and 1208 of both the fixed unit 1002 and the movable unit 1004. The polarized wave converting unit 1030 is not applied to the waveguides 1012 and 1014. The waveguides 1012 and 1014 do not need the polarized wave converting unit 1030, and thus have a simple structure. In order to transmit a radio wave radiated from the circularly polarized wave probe 1080 in a travelling direction efficiently, a terminating member 1090 having a height H of about λ/4 (λ: wavelength) is mounted on the end parts of the fixed unit 1002 side and the movable unit 1004 side of the waveguides 1012 and 1014.

For example, when an embodiment is made in a 60-GHz band as an example of the millimeter wave band, and when the waveguides 1012 and 1014 are a circular waveguide, the radius a of the waveguides 1012 and 1014 is for example 1.75 mm. When a=1.75 mm, Fc in a fundamental mode (TE11 mode)=49.458 [GHz]. The waveguides 1012 and 1014 are usable in the 60-GHz band.

A signal output from the microstrip line 1022 or 1024 on the transmitting side is converted into a circularly polarized wave via the circularly polarized wave probe 1080, and then transmitted to the inside of the waveguides 1012 and 1014. The circularly polarized wave probe 1080 on the receiving side receives the circularly polarized wave signal by a crank-shaped member 1082, and sends the linearly polarized wave state received signal from a sending and receiving terminal 1086 to the microstrip line 1022 or 1024 on the receiving side. Thereby, the received signal can be transferred to a high-frequency circuit not shown in the figure.

<Structure: Second Embodiment>

FIGS. 7A to 7C are diagrams of assistance in explaining a radio communicating device 1000B and a rotational structure 1001B according to a second embodiment. The fourth example of constitution of the combination modes shown in FIG. 2 is applied to the radio communicating device 1000B (rotational structure 1001B) according to the second embodiment. One uses a linearly polarized wave probe 1070 and another uses a circularly polarized wave probe 1080, and a terminating member 1090 is disposed on the end parts of both, and further a polarized wave converting unit 1030 is applied to a waveguide 1012 or 1014.

In a first example shown in FIG. 7B, the radio communicating device 1000B (rotational structure 1001B) uses the linearly polarized wave probe 1070 for a transmission line coupling section 1108 on a fixed unit 1002 side, and uses the circularly polarized wave probe 1080 for a transmission line coupling section 1208 on a movable unit 1004 side. In a second example shown in FIG. 7C, the radio communicating device 1000B (rotational structure 1001B) uses the linearly polarized wave probe 1070 for the transmission line coupling section 1208 on the movable unit 1004 side, and uses the circularly polarized wave probe 1080 for the transmission line coupling section 1108 on the fixed unit 1002 side.

The waveguide 1012 on the side of the fixed unit 1002 has a longer tube length than the waveguide 1014 on the side of the movable unit 1004. The waveguide 1014, a board 1202, a microstrip line 1024, and a terminating member 1090 are members forming the movable unit 1004, and a whole including these members and one communicating block not shown in the figure is rotated relative to the fixed unit 1002 including another communicating block.

As shown in FIG. 7A, the radio communicating device 1000B (rotational structure 1001B) uses one polarized wave converting unit 1030A in the first example as an example of a mono-grooved circular waveguide on only one of the waveguides 1012 and 1014 (on the side of the waveguide 1012 in the example of the figure) as the polarized wave converting unit 1030. As described above, because the polarized wave converting unit 1030 (polarized wave converting unit 1030A in this case) is used on one of the waveguides 1012 and 1014, the radio communicating device 1000B (rotational structure 1001B) has a more complex structure than the radio communicating device 1000A (rotational structure 1001A) according to the first embodiment. On the other hand, the radio communicating device 1000B (rotational structure 1001B) has an advantage in that the other (the fixed unit 1002 in the first example or the movable unit 1004 in the second example) can use the linearly polarized wave probe 1070 of a simple structure.

As in the radio communicating device 1000A according to the first embodiment, in order to transmit a radio wave radiated from the linearly polarized wave probe 1070 and the circularly polarized wave probe 1080 in a travelling direction efficiently, a terminating member 1090 having a height H of about $\lambda/4$ ($\lambda$: wavelength) is mounted on the end parts of the fixed unit 1002 side and the movable unit 1004 side of the waveguides 1012 and 1014.

Also in this case, for example, when an embodiment is made in a 60-GHz band as an example of the millimeter wave band, and when the waveguides 1012 and 1014 are a circular waveguide, the radius a of the waveguides 1012 and 1014 is for example 1.75 mm. When a=1.75 mm, Fc=49.458 [GHz]. The waveguides 1012 and 1014 are usable in the 60-GHz band.

Description will first be made of the first example shown in FIG. 7B in which the linearly polarized wave probe 1070 is used on the fixed unit 1002 side and the circularly polarized wave probe 1080 is used on the movable unit 1004 side. When the fixed unit 1002 is on the transmitting side and the movable unit 1004 is on the receiving side, a signal output from a microstrip line 1022 of the fixed unit 1002 on the transmitting side is transmitted as a linearly polarized wave to the inside of the waveguides 1012 and 1014 via the linearly polarized wave probe 1070. A radio wave in the millimeter wave band (60-GHz band) as the linearly polarized wave within the waveguides 1012 and 1014 is converted into a circularly polarized wave by the polarized wave converting unit 1030A, and then transmitted to the movable unit 1004 side. The circularly polarized wave probe 1080 of the movable unit 1004 as the receiving side receives the radio wave in the millimeter wave band (60-GHz band) which radio wave is converted into the circularly polarized wave by a crank-shaped member 1082, and sends a linearly polarized wave state received signal from a sending and receiving terminal 1086 to the microstrip line 1024. Thereby, the received signal can be transferred to a high-frequency circuit not shown in the figure.

When the movable unit 1004 is on the transmitting side and the fixed unit 1002 is on the receiving side, a signal output from the microstrip line 1024 of the movable unit 1004 on the transmitting side is transmitted as a circularly polarized wave to the inside of the waveguides 1012 and 1014 via the circularly polarized wave probe 1080. A radio wave in the millimeter wave band (60-GHz band) as the circularly polarized wave within the waveguides 1012 and 1014 is converted into a linearly polarized wave by the polarized wave converting unit 1030A, and then transmitted to the fixed unit 1002 side. The linearly polarized wave probe 1070 of the fixed unit 1002 as the receiving side receives the radio wave in the millimeter wave band (60-GHz band) which radio wave is converted into the linearly polarized wave, and can transfer the received signal to a high-frequency circuit not shown in the figure via the microstrip line 1022.

Description will next be made of the second example shown in FIG. 7C in which the linearly polarized wave probe 1070 is used on the movable unit 1004 side and the circularly polarized wave probe 1080 is used on the fixed unit 1002 side. When the movable unit 1004 is on the transmitting side and the fixed unit 1002 is on the receiving side, a signal output from the microstrip line 1024 of the movable unit 1004 on the transmitting side is transmitted as a linearly polarized wave to the inside of the waveguides 1012 and 1014 via the linearly polarized wave probe 1070. A radio wave in the millimeter wave band (60-GHz band) as the linearly polarized wave within the waveguides 1012 and 1014 is converted into a circularly polarized wave by the polarized wave converting unit 1030A, and then transmitted to the fixed unit 1002 side. The circularly polarized wave probe 1080 of the fixed unit 1002 as the receiving side receives the radio wave in the millimeter wave band (60-GHz band) which radio wave is converted into the circularly polarized wave by the crank-shaped member 1082, and sends a linearly polarized wave state received signal from the sending and receiving terminal 1086 to the microstrip line 1022. Thereby, the received signal can be transferred to a high-frequency circuit not shown in the figure.

When the fixed unit 1002 is on the transmitting side and the movable unit 1004 is on the receiving side, a signal output from the microstrip line 1022 of the fixed unit 1002 on the transmitting side is transmitted as a circularly polarized wave to the inside of the waveguides 1012 and 1014 via the circularly polarized wave probe 1080. A radio wave in the millimeter wave band (60-GHz band) as the circularly polarized wave within the waveguides 1012 and 1014 is converted into a linearly polarized wave by the polarized wave converting unit 1030A, and then transmitted to the movable unit 1004 side. The linearly polarized wave probe 1070 of the movable unit 1004 as the receiving side receives the radio wave in the millimeter wave band (60-GHz band) which radio wave is converted into the linearly polarized wave, and can transfer the received signal to a high-frequency circuit not shown in the figure via the microstrip line 1024.

<Structure: Third Embodiment>

FIGS. 8A to 8D are diagrams of assistance in explaining a radio communicating device 1000C and a rotational structure 1001C according to a third embodiment. The thirteenth to fifteenth examples of constitution of the combination modes shown in FIG. 2 are applied to the radio communicating device 1000C (rotational structure 1001C) according to the third embodiment, where both of a fixed unit 1002 and a movable unit 1004 use a linearly polarized wave probe 1070 and a polarized wave converting unit 1030 is applied to both of waveguides 1012 and 1014.

The waveguide 1012 on the fixed unit 1002 side and the waveguide 1014 on the movable unit 1004 side are set at substantially a same tube length. The waveguide 1014, a board 1202, a microstrip line 1024, and a terminating member 1090 are members forming the movable unit 1004, and a whole including these members and one communicating block not shown in the figure is rotated relative to the fixed unit 1002 including another communicating block.

FIGS. 8A to 8D show the thirteenth example of constitution. In order to transmit a radio wave radiated from the linearly polarized wave probe 1070 in a travelling direction efficiently, a terminating member 1090 having a height H of about $\lambda/4$ ($\lambda$: wavelength) is mounted on the end parts of the fixed unit 1002 side and the movable unit 1004 side of the waveguides 1012 and 1014.

In this case, the radio communicating device 1000C (rotational structure 1001C) is different from the second embodiment in that the polarized wave converting unit 1030 is applied to each of the waveguides 1012 and 1014. As shown in a perspective view of FIG. 8B, the polarized wave converting unit 1030B in the second example using the metallic projecting object 1034 is used as each of the polarized wave converting units 1030 for the respective waveguides 1012 and 1014. As described above, because the polarized wave converting unit 1030 (polarized wave converting unit 1030B in this case) is used for each of the waveguides 1012 and 1014, the structure is more complex than that of the radio communicating device 1000A according to the first embodiment, and because the polarized wave converting unit 1030 is used for each of the waveguides 1012 and 1014 (that is, two polarized wave converting units 1030 are used), the structure is more complex than that of the radio communicating device 1000B (rotational structure 1001B) according to the second embodiment. On the other hand, there is an advantage in that the linearly polarized wave probe 1070 of a simple structure can be used in both of the fixed unit 1002 and the movable unit 1004.

The radio communicating device 1000C (rotational structure 1001C) according to the third embodiment has a structure formed by installing two upper and lower sets with the linearly polarized wave probe 1070 and the polarized wave converting unit 1030 (polarized wave converting unit 1030B in this example) as one set.

For example, when an embodiment is made in the 60-GHz band as an example of the millimeter wave band, and when the waveguides 1012 and 1014 are a circular waveguide, the radius a of the waveguides 1012 and 1014 is for example 1.75 mm. When a=1.75 mm, Fc in a fundamental mode (TE11 mode)=49.458 [GHz]. The waveguides 1012 and 1014 are usable in the 60-GHz band.

Description will first be made of a case where the fixed unit 1002 is on the transmitting side and the movable unit 1004 is on the receiving side. In this case, a signal output from a microstrip line 1022 of the fixed unit 1002 on the transmitting side is transmitted as a linearly polarized wave to the inside of the waveguide 1012 via a linearly polarized wave probe 1070_1. A radio wave in the millimeter wave band (60-GHz band) as the linearly polarized wave within the waveguide 1012 is converted into a circularly polarized wave by a polarized wave converting unit 1030B_1, and then transmitted to the waveguide 1014 side. A polarized wave converting unit 1030B_2 disposed on the waveguide 1014 side converts the radio wave in the millimeter wave band (60-GHz band) which radio wave is converted into the circularly polarized wave by the polarized wave converting unit 1030B_1 disposed on the waveguide 1012 side into a linearly polarized wave (returns the circularly polarized wave to the linearly polarized wave), and transmits the linearly polarized wave to the movable unit 1004 side. A linearly polarized wave probe 1070_2 of a transmission line coupling section 1208 of the movable unit 1004 on the receiving side receives the radio wave in the millimeter wave band (60-GHz band) which radio wave is converted into the linearly polarized wave, and can transfer the received signal to a high-frequency circuit not shown in the figure via the microstrip line 1024 on the receiving side.

Description will next be made of a case where the movable unit 1004 is on the transmitting side and the fixed unit 1002 is on the receiving side. In this case, a signal output from the microstrip line 1024 of the movable unit 1004 on the transmitting side is transmitted as a linearly polarized wave to the inside of the waveguide 1014 via the linearly polarized wave probe 1070_2. A radio wave in the millimeter wave band (60-GHz band) as the linearly polarized wave within the waveguide 1014 is converted into a circularly polarized wave by the polarized wave converting unit 1030B_2, and then transmitted to the waveguide 1012 side. The polarized wave converting unit 1030B_1 disposed on the waveguide 1012 side converts the radio wave in the millimeter wave band (60-GHz band) which radio wave is converted into the circularly polarized wave by the polarized wave converting unit 1030B_2 disposed on the waveguide 1014 side into a linearly polarized wave (returns the circularly polarized wave to the linearly polarized wave), and transmits the linearly polarized wave to the fixed unit 1002 side. The linearly polarized wave probe 1070_1 of a transmission line coupling section 1108 of the fixed unit 1002 on the receiving side receives the radio wave in the millimeter wave band (60-GHz band) which radio wave is converted into the linearly polarized wave, and can transfer the received signal to a high-frequency circuit not shown in the figure via the microstrip line 1022 on the receiving side.

<Communication Processing System: Basic>

FIG. 9 and FIGS. 10A to 10C are diagrams of assistance in explaining a radio transmission system 1 in an example of application to the rotational structure 1001 to which the radio communicating device 1000 according to the first to third embodiments described above is applied. FIG. 9 is a diagram of assistance in explaining a signal interface of the radio transmission system 1 (that is, the radio communicating device 1000) from an aspect of a functional configuration. FIGS. 10A to 10C are diagrams of assistance in explaining signal multiplexing in the radio transmission system 1. Incidentally, description will be made of a case where the millimeter wave band is used as a carrier frequency.

[Functional Configuration]

As shown in FIG. 9, the radio transmission system 1 is configured such that a first communicating block 100 as an example of a first radio device and a second communicating block 200 as an example of a second radio device are coupled to each other via a millimeter wave signal transmission line 9 and such that signal transmission is performed in the millimeter wave band. The millimeter wave signal transmission line 9 is an example of a radio signal transmission line. A signal to be transmitted is frequency-converted into a millimeter wave band suitable for wide band transmission, and then transmitted.

In relation to the radio communicating device 1000 according to the first to third embodiments to the rotational structure 1001 described above, it suffices to consider that the first communicating block 100 is disposed in the fixed unit 1002 and the second communicating block 200 is disposed in the movable unit 1004, for example. Of course, the reverse is possible. In addition, it suffices to consider that the millimeter wave signal transmission line 9 is formed within the waveguides 1012 and 1014.

A first communicating block (first millimeter wave transmitting device) and a second communicating block (second millimeter wave transmitting device) form the radio transmission system. Between the first communicating block and the second communicating block disposed at a relatively short distance from each other, a signal to be transmitted is converted into a millimeter wave signal, and then the millimeter wave signal is transmitted via the millimeter wave signal transmission line. "Radio transmission" in the present embodiment refers to transmission of a signal to be transmitted by a millimeter wave rather than electric wiring.

The "relatively short distance" refers to a short distance as compared with a distance between communicating devices used in broadcasting or ordinary radio communication. It suffices for the transmission range to be about a range substantially identifiable as a closed space. For example, communication between boards within the casing of an electronic device, communication between chips on a same board, or communication between a plurality of electronic devices in an integral state such as a state of one electronic device being mounted in another electronic device or the like corresponds to communication at the relatively short distance.

A transmitting unit and a receiving unit are combined and disposed in a pair in each of the communicating devices, which are provided with the millimeter wave signal transmission line interposed between the communicating devices. Signal transmission between one communicating device and the other communicating device may be unidirectional (one direction) transmission or bidirectional transmission. For example, when the first communicating block is a transmitting side and the second communicating block is a receiving side, the transmitting unit is disposed in the first communicating block, and the receiving unit is disposed in the second communicating block. When the second communicating block is a transmitting side and the first communicating block is a receiving side, the transmitting unit is disposed in the second communicating block, and the receiving unit is disposed in the first communicating block.

Suppose that the transmitting unit includes for example a signal generating part on the transmitting side for subjecting a signal to be transmitted to signal processing and generating a millimeter wave signal (signal converting part for converting an electric signal to be transmitted into a millimeter wave signal) and a signal coupling section on the transmitting side for coupling the millimeter wave signal generated by the signal generating part on the transmitting side to the transmission line for transmitting the millimeter wave signal (millimeter wave signal transmission line). The signal generating part on the transmitting side is preferably integral with a functional part for generating the signal to be transmitted.

For example, the signal generating part on the transmitting side has a modulating circuit, and the modulating circuit modulates the signal to be transmitted. The signal generating part on the transmitting side generates the millimeter wave signal by frequency-converting the signal after being modulated by the modulating circuit. In principle, the signal to be transmitted may be directly converted into the millimeter wave signal. The signal coupling section on the transmitting side supplies the millimeter wave signal generated by the signal generating part on the transmitting side to the millimeter wave signal transmission line.

On the other hand, suppose that the receiving unit includes for example a signal coupling section on the receiving side for receiving the millimeter wave signal transmitted via the millimeter wave signal transmission line and a signal generating part on the receiving side for subjecting the millimeter wave signal (input signal) received by the signal coupling section on the receiving side to signal processing and generating an ordinary electric signal (signal to be transmitted) (signal converting part for converting the millimeter wave signal into the electric signal to be transmitted). The signal generating part on the receiving side is preferably integral with a functional part for receiving the signal to be transmitted. For example, the signal generating part on the receiving side has a demodulating circuit. An output signal is generated by frequency-converting the millimeter wave signal. The demodulating circuit thereafter demodulates the output signal, whereby the signal to be transmitted is generated. In principle, direct conversion from the millimeter wave signal to the signal to be transmitted may be performed.

That is, in providing a signal interface, the signal to be transmitted is transmitted in a contactless manner or a cableless manner by the millimeter wave signal (not transmitted by electric wiring). Preferably, at least signal transmission (an image pickup signal required to be transmitted at high speed and a high-speed master clock signal in particular) is performed by the millimeter wave signal. In short, signal transmission hitherto performed by electric wiring is performed by the millimeter wave signal in the present embodiment. By performing signal transmission in the millimeter wave band, it is possible to achieve high-speed signal transmission on the order of Gbps, easily limit a range covered by the millimeter wave signal, and obtain effects due to this nature.

In this case, it suffices for each signal coupling section to allow the first communicating block and the second communicating block to transmit the millimeter wave signal via the millimeter wave signal transmission line. For example, each signal coupling section may have an antenna structure (antenna coupling section), or may provide coupling without having an antenna structure.

The "millimeter wave signal transmission line for transmitting the millimeter wave signal" may be an air (so-called free space), but preferably has a structure that transmits the millimeter wave signal while confining the millimeter wave signal in the transmission line. By actively utilizing the nature, the routing of the millimeter wave signal transmission line can be determined arbitrarily as by electric wiring, for example.

The millimeter wave signal transmission line of such a structure is preferably for example a millimeter wave signal transmission line formed by a dielectric material capable of millimeter wave signal transmission (which transmission line will be referred to as a dielectric transmission line or a millimeter wave intra-dielectric transmission line) or a hollow waveguide forming a transmission line and provided with a shielding material for suppressing external radiation of the millimeter wave signal such that the shielding material encloses the transmission line, the inside of the shielding material being hollow. The millimeter wave signal transmission line can be routed by imparting flexibility to the dielectric material and the shielding material.

Incidentally, in the case of an air (so-called free space), each signal coupling section employs an antenna structure, and performs signal transmission in a space for a short distance by the antenna structure. On the other hand, when the millimeter wave signal transmission line is formed by a dielectric material, each signal coupling section may employ an antenna structure, but this is not essential.

A mechanism of the radio transmission system 1 (radio communicating device 1000) according to the present embodiment will be described concretely in the following.

The first communicating block 100 has a semiconductor chip 103 capable of millimeter wave band communication. The second communicating block 200 also has a semiconductor chip 203 capable of millimeter wave band communication.

In the present embodiment, signals to be communicated in the millimeter wave band are only signals from which a high-speed characteristic or a high-capacity characteristic is required, and other signals for which a low speed or a low capacity suffices and signals that can be regarded as a direct current such as power and the like are not set as objects to be converted into a millimeter wave signal. For the signals (including power) not set as objects to be converted into a millimeter wave signal, a signal connection between boards is established by a mechanism similar to a mechanism in related art. When application to the rotational structure 1001 making endless rotation is considered, it is desirable to use a slip ring mechanism formed by a fixed conductor and a rotary conductor (or a rotary brush). Incidentally, original electric signals to be transmitted before being converted into a millimeter wave will be referred to collectively as a baseband signal.

[First Communicating Block]

The first communicating block 100 includes the semiconductor chip 103 capable of millimeter wave band communication and a transmission line coupling section 108 (corresponding to the transmission line coupling section 1108 described above) on a board 102 (corresponding to the board 1102 described above). The semiconductor chip 103 is a system LSI (Large Scale Integrated Circuit) formed by integrating an LSI functional part 104 and a signal generating part 107 (millimeter wave signal generating part). Though not shown in the figure, a configuration may be made in which the LSI functional part 104 and the signal generating part 107 are not integrated. When the LSI functional part 104 and the signal generating part 107 are separate from each other, there is a fear of a problem caused by signal transmission between the LSI functional part 104 and the signal generating part 107 by electric wiring. The LSI functional part 104 and the signal generating part 107 are thus desirably formed integrally with each other.

The signal generating part 107 and the transmission line coupling section 108 are configured to have data bidirectionality. The signal generating part 107 is thus provided with a signal generating part on a transmitting side and a signal generating part on a receiving side. While the transmission line coupling section 108 may have separate parts on the transmitting side and the receiving side, suppose in this case that the transmission line coupling section 108 is shared for both transmission and reception.

Incidentally, "bidirectional communication" shown in this case is single-core bidirectional transmission where the millimeter wave signal transmission line 9 as a millimeter wave transmission channel is one system (one core). In order to realize this, a half-duplex system to which time division multiplexing (TDD: Time Division Duplex) is applied, frequency division multiplexing (FDD: Frequency Division Duplex: FIGS. 10A to 10C), or the like is applied.

In the case of time division multiplexing, separation of transmission and reception is performed on a time division basis, and thus "simultaneity of bidirectional communication (single-core simultaneous bidirectional transmission)" in which signal transmission from the first communicating block 100 to the second communicating block 200 and signal transmission from the second communicating block 200 to the first communicating block 100 are performed simultaneously is not performed. Single-core simultaneous bidirectional transmission is achieved by frequency division multiplexing. However, because frequency division multiplexing uses different frequencies for transmission and reception as shown in FIG. 10A, the transmission bandwidth of the millimeter wave signal transmission line 9 needs to be widened.

Instead of mounting the semiconductor chip 103 directly on the board 102, a semiconductor package formed by mounting the semiconductor chip 103 on an interposer board and molding the semiconductor chip 103 by resin (for example epoxy resin) may be mounted on the board 102. That is, the interposer board forms a board for chip mounting, and the semiconductor chip 103 is disposed on the interposer board. It suffices to use a sheet member formed by combining for example a thermally toughened resin having a relative dielectric constant in a certain range (about 2 to 10) and a copper foil as the interposer board.

The semiconductor chip 103 is connected to the transmission line coupling section 108. For example an antenna structure including an antenna coupling section, an antenna terminal, a microstrip line, an antenna and the like is applied to the transmission line coupling section 108. Incidentally, the transmission line coupling section 108 can also be incorporated into the semiconductor chip 103 by applying a technique of forming an antenna directly on a chip.

The LSI functional part 104 performs main application control of the first communicating block 100. The LSI functional part 104 for example includes a circuit for processing various signals desired to be transmitted to the other device and a circuit for processing various signals received from the other device.

The signal generating part 107 (electric signal converting part) converts a signal from the LSI functional part 104 into a millimeter wave signal, and performs signal transmission control via the millimeter wave signal transmission line 9.

Specifically, the signal generating part 107 has a transmitting side signal generating portion 110 and a receiving side signal generating portion 120. The transmitting side signal generating portion 110 and the transmission line coupling section 108 form a transmitting unit. The receiving side signal generating portion 120 and the transmission line coupling section 108 form a receiving unit.

The transmitting side signal generating portion 110 has a multiplexing processing section 113, a parallel-serial converting section 114, a modulating section 115, a frequency converting section 116, and an amplifying section 117 to subject an input signal to signal processing and generate a millimeter wave signal. Incidentally, the modulating section 115 and the frequency converting section 116 may be integrated into a so-called direct conversion system.

The receiving side signal generating portion 120 has an amplifying section 124, a frequency converting section 125, a demodulating section 126, a serial-parallel converting section 127, and a simplification processing section 128 to subject a millimeter wave electric signal received by the transmission line coupling section 108 to signal processing and generate an output signal. The frequency converting section 125 and the demodulating section 126 may be integrated into a so-called direct conversion system.

The parallel-serial converting section 114 and the serial-parallel converting section 127 are provided in a case of parallel interface specifications using a plurality of signals for parallel transmission when the present embodiment is not applied. The parallel-serial converting section 114 and the serial-parallel converting section 127 are unnecessary in a case of serial interface specifications.

When there are a plurality of (N) kinds of signals to be communicated in the millimeter wave band among signals from the LSI functional part 104, the multiplexing processing section 113 integrates the plurality of kinds of signals into a signal of one system by performing multiplexing processing such as time division multiplexing, frequency division multiplexing, code division multiplexing or the like. In this case, a plurality of kinds of signals desired to have a high-speed characteristic and a high-capacity characteristic are set as objects to be transmitted by a millimeter wave, and integrated into a signal of one system.

In the case of time division multiplexing or code division multiplexing, it suffices for the multiplexing processing section 113 to be provided in a stage preceding the parallel-serial converting section 114 and supply the integrated signal of one system to the parallel-serial converting section 114. In the case of time division multiplexing, it suffices to provide a selector switch for finely dividing time for the plurality of kinds of signals_@ (@ is 1 to N) and supplying the signal to the parallel-serial converting section 114.

In the case of frequency division multiplexing, on the other hand, it is necessary to generate millimeter wave signals by performing modulation by separate carrier frequencies and conversion into frequencies in ranges of respective different frequency bands F_@, and transmit the millimeter wave signals using the separate carrier frequencies in a same direction or opposite directions. Thus, when the millimeter wave signals are transmitted in a same direction as shown in FIG. 10B, for example, it is desirable to provide the parallel-serial converting section 114, the modulating section 115, the frequency converting section 116, and the amplifying section 117 for each of the plurality of kinds of signals_@, and provide an addition processing section as the multiplexing processing section 113 in a stage following each amplifying section 117. Then, it suffices to supply the millimeter wave electric signals in frequency bands F_1+ . . . + F_N after frequency multiplexing processing to the transmission line coupling section 108. It suffices to use a so-called coupler as the addition processing section when the millimeter wave signals using the respective separate carrier frequencies are transmitted in a same direction as shown in FIG. 10B.

As is understood from FIG. 10B, the transmission bandwidth needs to be widened in frequency division multiplexing that integrates signals of a plurality of systems into one system. As shown in FIG. 10C, the transmission bandwidth needs to be further widened in a case of using both the integration of signals of a plurality of systems into one system by frequency division multiplexing and a full-duplex system using different frequencies for transmission and reception.

The parallel-serial converting section 114 converts a parallel signal into a serial data signal, and supplies the serial data signal to the modulating section 115. The modulating section 115 modulates the signal to be transmitted, and supplies the modulated signal to the frequency converting section 116. It suffices for the modulating section 115 to modulate at least one of amplitude, frequency, and phase by the signal to be transmitted, and a system using an arbitrary combination thereof can be adopted. For example, an analog modulating system includes amplitude modulation (AM) and vector modulation. Vector modulation includes frequency modulation (FM) and phase modulation (PM). A digital modulating system includes for example amplitude shift keying (ASK), frequency shift keying (FSK), phase shift keying (PSK), and amplitude phase shift keying (APSK) that modulates amplitude and phase. Quadrature amplitude modulation (QAM) typifies amplitude phase shift keying.

The frequency converting section 116 generates a millimeter wave electric signal by frequency-converting the signal to be transmitted after being modulated by the modulating section 115, and then supplies the millimeter wave electric signal to the amplifying section 117. The millimeter wave electric signal refers to an electric signal of a certain frequency in a range of approximately 30 GHz to 300 GHz. The word "approximately" is used on the basis of a fact that it suffices for the frequency to be about such a frequency as to provide an effect of millimeter wave communication, with a lower limit not limited to 30 GHz, and an upper limit not limited to 300 GHz.

The frequency converting section 116 can employ various circuit configurations. However, for example, it suffices for the frequency converting section 116 to employ a configuration including a frequency mixing circuit (mixer circuit) and a local oscillator. The local oscillator generates a carrier wave (a carrier signal or a reference carrier wave) used for modulation. The frequency mixing circuit generates a modulated signal in the millimeter wave band by multiplying (modulating) the carrier wave in the millimeter wave band which carrier wave is generated by the local oscillator by the signal from the parallel-serial converting section 114. The frequency mixing circuit then supplies the modulated signal to the amplifying section 117.

The radio communicating device 1000 (rotational structure 1001) according to the foregoing first to third embodiments is connected to the amplifying section 117 on the transmitting side. The amplifying section 117 amplifies the millimeter wave electric signal after the frequency conversion, and then supplies the amplified millimeter wave electric signal to the transmission line coupling section 108. The amplifying section 117 is connected to the bidirectional transmission line coupling section 108 via an antenna terminal not shown in the figure.

The transmission line coupling section 108 transmits the millimeter wave signal generated by the transmitting side signal generating portion 110 to the millimeter wave signal transmission line 9, and receives a millimeter wave signal from the millimeter wave signal transmission line 9 and outputs the millimeter wave signal to the receiving side signal generating portion 120.

The transmission line coupling section 108 is formed by an antenna coupling section. The antenna coupling section forms an example or a part of the transmission line coupling section 108 (signal coupling section). The antenna coupling section in a narrow sense refers to a part for coupling an electronic circuit within a semiconductor chip to an antenna disposed within the chip or outside the chip, and in a broad sense refers to a part for signal coupling of the semiconductor chip to the millimeter wave signal transmission line 9. For example, the antenna coupling section has at least an antenna structure. When transmission and reception is performed by time division multiplexing, the transmission line coupling section 108 is provided with an antenna switching section (antenna duplexer).

The antenna structure refers to a structure in a section coupled to the millimeter wave signal transmission line 9. It suffices for the antenna structure to couple an electric signal in the millimeter wave band to the millimeter wave signal transmission line 9, and the antenna structure does not mean only an antenna itself. For example, the antenna structure includes an antenna terminal, a microstrip line, and an antenna. When the antenna switching section is formed within the same chip, the antenna terminal and the microstrip line excluding the antenna switching section form the transmission line coupling section 108.

An antenna on the transmitting side radiates an electromagnetic wave based on a millimeter wave signal to the millimeter wave signal transmission line 9. An antenna on the receiving side receives an electromagnetic wave based on a millimeter wave signal from the millimeter wave signal transmission line 9. The microstrip line establishes a connection between the antenna terminal and the antenna. The microstrip line transmits a millimeter wave signal on the transmitting side from the antenna terminal to the antenna, and transmits a millimeter wave signal on the receiving side from the antenna to the antenna terminal. Incidentally, in applying the radio communicating device 1000 according to the foregoing first to third embodiments, the linearly polarized wave probe 1070 or the circularly polarized wave probe 1080 is used as the antenna.

The antenna switching section is used when the antenna is shared for transmission and reception. For example, when a millimeter wave signal is transmitted to the side of the second communicating block 200 as the other device, the antenna switching section connects the antenna to the transmitting side signal generating portion 110. When a millimeter wave signal from the side of the second communicating block 200 as the other device is received, the antenna switching section connects the antenna to the receiving side signal generating portion 120. The antenna switching section is disposed on the board 102 separately from the semiconductor chip 103, but is not limited to this. The antenna switching section may be disposed within the semiconductor chip 103. The antenna switching section can be omitted when an antenna for transmission and an antenna for reception are provided separately from each other.

Suppose that the millimeter wave signal transmission line 9 as a millimeter wave propagating path may be a free space transmission line and is preferably formed by a waveguide, a transmission line, a dielectric line, a waveguide structure within a dielectric, or the like, and that the millimeter wave signal transmission line 9 has a characteristic of transmitting an electromagnetic wave in the millimeter wave band efficiently. For example, the millimeter wave signal transmission line 9 is preferably a dielectric transmission line 9A formed including a dielectric material having a relative dielectric constant in a certain range and a dielectric loss tangent in a certain range.

It suffices for the "certain ranges" of the relative dielectric constant and the dielectric loss tangent of the dielectric material to be a range such that effects of the present embodiment can be obtained, and it suffices for the certain ranges to be ranges of predetermined values as long as the effects of the present embodiment can be obtained. That is, it suffices for the dielectric material to be able to transmit millimeter waves having characteristics such that the effects of the present embodiment can be obtained. The relative dielectric constant and the dielectric loss tangent of the dielectric material cannot be determined by the dielectric material itself, and cannot necessarily be determined definitely because the relative dielectric constant and the dielectric loss tangent of the dielectric material also have relation to the length of the transmission line and the frequency of millimeter waves. However, as an example, the relative dielectric constant and the dielectric loss tangent of the dielectric material are as follows.

For high-speed transmission of millimeter wave signals within the dielectric transmission line 9A, it is desirable that the relative dielectric constant of the dielectric material be about 2 to 10 (preferably 3 to 6) and that the dielectric loss tangent of the dielectric material be about 0.00001 to 0.01 (preferably 0.00001 to 0.001). For example, dielectric materials formed of an acrylic resin base, a urethane resin base, an epoxy resin base, a silicone base, a polyimide base, and a cyanoacrylate resin base can be used as dielectric materials satisfying such conditions. Such ranges of the relative dielectric constant and the dielectric loss tangent of the dielectric material are the same in the present embodiment unless otherwise specified. Incidentally, the millimeter wave signal transmission line 9 formed so as to confine a millimeter wave signal in the transmission line may not only be the dielectric transmission line 9A but also be a hollow waveguide, the periphery of the transmission line being enclosed by a shielding material and the inside of the transmission line being hollow.

The transmission line coupling section 108 is connected with the receiving side signal generating portion 120. The receiving side signal generating portion 120 has an amplifying section 124, a frequency converting section 125, a demodulating section 126, a serial-parallel converting section 127, and a simplification processing section 128 to subject a millimeter wave electric signal received by the transmission line coupling section 108 to signal processing and generate an output signal. The frequency converting section 125 and the demodulating section 126 may be integrated into a so-called direct conversion system.

The amplifying section 124 on the receiving side is connected with the radio communicating device 1000 (rotational structure 1001) according to the foregoing first to third embodiments. In the present configuration, the amplifying section 124 is also included in the semiconductor chip 103 as an example of a semiconductor integrated circuit. The amplifying section 124 is connected to the transmission line coupling section 108. The amplifying section 124 amplifies a millimeter wave electric signal after being received by the antenna, and then supplies the amplified millimeter wave electric signal to the frequency converting section 125. The frequency converting section 125 frequency-converts the millimeter wave electric signal after the amplification, and then supplies the signal after the frequency conversion to the demodulating section 126. The demodulating section 126 demodulates the signal after the frequency conversion, thereby obtains a baseband signal, and then supplies the baseband signal to the serial-parallel converting section 127.

The serial-parallel converting section 127 converts the serial received data into parallel output data, and then supplies the parallel output data to the simplification processing section 128.

The simplification processing section 128 corresponds to the multiplexing processing section 113. The simplification processing section 128 separates the signal integrated in one system into a plurality of kinds of signals_@ (@ is 1 to N). For example, the simplification processing section 128 separates the plurality of data signals integrated in the signal of one system into each separate data signal, and then supplies each separate data signal to the LSI functional part 104.

Incidentally, when the signals are integrated into one system by frequency division multiplexing, millimeter wave electric signals in frequency bands $F\_1+ \ldots + F\_N$ after frequency multiplexing processing need to be received, separated into each millimeter wave electric signal, transmitted in a same direction, and processed in the separate frequency bands $F\_@$. Thus, as shown in FIG. 10B, it is desirable to provide amplifying sections 224, frequency converting sections 225, demodulating sections 226, and serial-parallel converting sections 227 separately for a plurality of kinds of signals_b, and provide a frequency separating section as the simplification processing section 128 in a stage preceding each amplifying section 224. Then, it suffices to supply the millimeter wave electric signal in each frequency band $F\_b$ after separation to the system of the corresponding frequency band $F\_b$. When a signal resulting from multiplexing of millimeter wave signals of each separate carrier frequency is separated into each separate millimeter wave signal as shown in FIG. 10B, it suffices to use a so-called distributor as the frequency separating section.

Incidentally, in the form of use of the frequency division multiplexing system shown in FIG. 10B, a plurality of sets of a transmitting unit and a receiving unit are used, and separate carrier frequencies are used in the respective sets and transmitted in a same direction. However, the form of use of the frequency division multiplexing system is not limited to this. For example, in FIG. 9, full-duplex bidirectional communication can be performed in which a set of the transmitting side signal generating portion 110 of the first communicating block 100 and the receiving side signal generating portion 220 of the second communicating block 200 uses a first carrier frequency, a set of the receiving side signal generating portion 120 of the first communicating block 100 and the transmitting side signal generating portion 210 of the second communicating block 200 uses a second carrier frequency, and the sets simultaneously perform signal transmission in opposite directions from each other. In this case, it suffices to use a so-called circulator capable of simultaneous signal transmission to both sides as the antenna switching section of the transmission line coupling sections 108 and 208 in FIG. 9.

In addition, a mode may be adopted in which more sets of a transmitting unit and a receiving unit are used, each set uses a different carrier frequency, and a same direction and opposite directions are combined with each other. In this case, it suffices to use multiplexing processing sections 113 and 213 and simplification processing sections 128 and 228 while using a circulator in the transmission line coupling sections 108 and 208 in FIG. 10B.

When the semiconductor chip 103 is thus formed, the number of signals to be subjected to millimeter wave conversion is reduced by subjecting an input signal to parallel-serial conversion and then transmitting the input signal to the semiconductor chip 203 side and subjecting a received signal received from the semiconductor chip 203 side to serial-parallel conversion.

When original signal transmission between the first communicating block 100 and the second communicating block 200 is in a serial form, the parallel-serial converting section 114 and the serial-parallel converting section 127 do not need to be provided.

[Second Communicating Block]

The second communicating block 200 has a substantially similar functional configuration to that of the first communicating block 100. Each functional part is identified by a reference having a numeral 2 as a third digit, and similar and like functional parts to those of the first communicating block 100 are identified by references having the same second and first digits as in the first communicating block 100. The transmitting side signal generating portion 210 and the transmission line coupling section 208 form a transmitting unit. The receiving side signal generating portion 220 and the transmission line coupling section 208 form a receiving unit.

An LSI functional part 204 performs main application control of the second communicating block 200. The LSI functional part 204 for example includes a circuit for processing various signals desired to be transmitted to the other device and a circuit for processing various signals received from the other device.

Incidentally, when the rotational structure 1001 is distributed as a module including the radio communicating device 1000 without being incorporated into an electronic device, it suffices for example to provide a connection connector 109 between the LSI functional part 104 and the signal generating part 107 for the first communicating block 100 disposed on the fixed unit 1002 side in FIG. 9, divide the board 102 into two boards at the part of the connection connector 109 (see a dotted line in the figure), and connect the board on the side of the LSI functional part 104 to the board on the side of the signal generating part 107 and the transmission line coupling section 108 by the connection connector 109.

Also on the movable unit 1004 side, the LSI functional part 204 may be separated from the side of a signal generating part 207 and the transmission line coupling section 208. Specifically, it suffices to provide a connection connector 209 between the LSI functional part 204 and the signal generating part 207 for the second communicating block 200 disposed on the movable unit 1004 side in FIG. 9, divide the board 202 into two boards at the part of the connection connector 209 (see a dotted line in the figure), and connect the board on the side of the LSI functional part 204 to the board on the side of the signal generating part 207 and the transmission line coupling section 208 by the connection connector 209.

[Connection and Operation]

A method of frequency-converting an input signal and performing signal transmission is commonly used in broadcasting and radio communication. In these applications, relatively complex transmitters and receivers and the like capable of dealing with problems of α) how far communication can be attained (problem of S/N with respect to thermal noise), β) how to cope with reflection and multiple paths, and γ) how to suppress disturbance and interference with other channels, for example, are used. On the other hand, the signal generating parts 107 and 207 used in the present embodiment are used in the millimeter wave band of a higher frequency band than usable frequencies of complex transmitters and receivers commonly used in broadcasting and radio communication. Because of short wavelength λ, frequency reuse is easily made, and signal generating parts suitable for performing communication between many adjacent devices are used.

Unlike a signal interface using electric wiring in related art, the present embodiment flexibly provides for a high-speed characteristic and high capacity by performing signal transmission in the millimeter wave band as described above. For example, only signals desired to have a high-speed characteristic and a high-capacity characteristic are set as objects for communication in the millimeter wave band, and the communicating blocks 100 and 200 have, in a part thereof, an interface (connection by a terminal or a connector) using electric wiring in related art for low-speed and low-capacity signals and for power supply.

The signal generating part 107 generates a millimeter wave signal by subjecting an input signal input from the LSI functional part 104 to signal processing. The signal generating part 107 is connected to the transmission line coupling section 108 by a transmission line such as a microstrip line, a strip line, a coplanar line, or a slot line, for example. The generated millimeter wave signal is supplied to the millimeter wave signal transmission line 9 via the transmission line coupling section 108.

The transmission line coupling section 108 has an antenna structure. The transmission line coupling section 108 has a function of converting the transmitted millimeter wave signal into an electromagnetic wave and sending out the electromagnetic wave. The transmission line coupling section 108 is coupled to the millimeter wave signal transmission line 9. The electromagnetic wave converted by the transmission line coupling section 108 is supplied to one end part of the millimeter wave signal transmission line 9. The transmission line coupling section 208 on the side of the second communicating block 200 is coupled to another end of the millimeter wave signal transmission line 9. By providing the millimeter wave signal transmission line 9 between the transmission line coupling section 108 on the side of the first communicating block 100 and the transmission line coupling section 208 on the side of the second communicating block 200, the electromagnetic wave in the millimeter wave band propagates through the millimeter wave signal transmission line 9.

The transmission line coupling section 208 on the side of the second communicating block 200 is coupled to the millimeter wave signal transmission line 9. The transmission line coupling section 208 receives the electromagnetic wave transmitted to the other end of the millimeter wave signal transmission line 9, converts the electromagnetic wave into a millimeter wave signal, and then supplies the millimeter wave signal to the signal generating part 207 (baseband signal generating part). The signal generating part 207 subjects the converted millimeter wave signal to signal processing, thereby generates an output signal (baseband signal), and then supplies the output signal (baseband signal) to the LSI functional part 204.

The above description has been made of a case of signal transmission from the first communicating block 100 to the second communicating block 200. However, it suffices to similarly consider a case of transmitting a signal from the LSI functional part 204 in the second communicating block 200 to the first communicating block 100. Millimeter wave signals can be transmitted bidirectionally.

A signal transmission system that performs signal transmission via electric wiring has the following problems.

i) While higher capacity and higher speed of transmission data are desired, there is a limit to the transmission speed and transmission capacity of electric wiring.

ii) In order to deal with the problem of increasing the speed of transmission data, transmission speed per signal line may be decreased by increasing the number of pieces of wiring and thus achieving signal parallelization. However, this measure leads to an increase of input and output terminals. As a result, complication of a printed board and cable wiring, an increase in physical size of a connector part and an electrical interface, and the like are required, and there occur problems such as complication of shape of these parts, degradation in reliability of the parts, and an increase in cost, for example.

iii) As the band of the baseband signal is widened with swelling of an amount of information of movie video, computer images and the like, the problem of electromagnetic compatibility (EMC) becomes more obvious. For example, when electric wiring is used, the wiring becomes an antenna, and interferes with signals corresponding to the tuning frequency of the antenna. In addition, reflection and resonance due to a mismatch of impedance of the wiring or the like are causes of spurious radiation. Resonance and reflection tend to be accompanied by radiation, and make the problem of EMI (electromagnetic interference) serious. The configuration of the electronic device is complicated to take measures against such problems.

iv) In addition to EMC and EMI, when there is reflection, a transmission error due to interference between symbols on the receiving side and a transmission error due to the jumping in of disturbance become problems.

On the other hand, the radio transmission system 1 according to the present embodiment performs signal transmission by a millimeter wave rather than electric wiring. A signal from the LSI functional part 104 to the LSI functional part 204 is converted into a millimeter wave signal, and the millimeter wave signal is transmitted between the transmission line coupling sections 108 and 208 via the millimeter wave signal transmission line 9.

Because of radio transmission, it is not necessary to care about the shape of wiring and the position of connectors, and thus there occurs no particular limitation on layout. Wiring and terminals for signals replaced by signal transmission by millimeter waves can be omitted, so that the problems of EMC and EMI are solved. Generally, there is no other functional part using frequencies in the millimeter wave band within the communicating blocks 100 and 200, and therefore measures against EMC and EMI are realized easily.

Because radio transmission is performed in a state of the first communicating block 100 and the second communicating block 200 being in proximity to each other, and signal transmission is performed between fixed positions and in known positional relation, the following advantages are obtained.

1) It is easy to properly design a propagation channel (waveguide structure) between the transmitting side and the receiving side.

2) Excellent transmission with higher reliability than free space transmission is made possible by designing the dielectric structure of the transmission line coupling sections sealing the transmitting side and the receiving side and the propagation channel (waveguide structure of the millimeter wave signal transmission line 9) in conjunction with each other.

3) The control of a controller for managing radio transmission (LSI functional part 104 in the present example) does not need to be performed dynamically or adaptively with high frequency unlike ordinary radio communication, so that control overhead can be reduced as compared with ordinary radio communication. As a result, miniaturization, lower power consumption, and higher speed can be achieved.

4) When a radio transmission environment is calibrated at a time of manufacturing or at a time of design, and individual variations and the like are grasped, communication of high quality is made possible by referring to and transmitting the data.

5) Even when reflection is present, the reflection is a fixed reflection, so that effects of the reflection can be easily eliminated by a small equalizer on the receiving side. A setting of the equalizer can be made by a preset or static control, and can thus be attained easily.

In addition, millimeter wave communication provides the following advantages.

a) Because millimeter wave communication provides a wide communication band, a high data rate can be achieved easily.

b) Frequencies used for transmission can be separated from frequencies of other baseband signal processing, and thus interference between the frequencies of a millimeter wave and a baseband signal do not occur easily.

c) Because the millimeter wave band has short wavelengths, the antenna and the waveguide structure determined according to wavelength can be made smaller. In addition, because of great distance attenuation and a little diffraction of the millimeter wave band, electromagnetic shielding is provided easily.

d) There are strict regulations for ordinary outdoor radio communication in regard to the stability of carrier waves to prevent interference and the like. In order to realize a carrier wave of such high stability, an external frequency reference part of high stability, a multiplying circuit, a PLL (phase-locked loop circuit) and the like are used, thus increasing circuit scale. However, with the millimeter wave (especially when used in conjunction with signal transmission between fixed positions or in known positional relation), it is possible to shield the millimeter wave easily, prevent a leakage of the millimeter wave to the outside, use a carrier wave of low stability for transmission, and thus prevent an increase in circuit scale. An injection locking system is suitably adopted to demodulate a signal transmitted by a carrier wave of relaxed stability by a small circuit on the receiving side.

Incidentally, in the present embodiment, a system performing communication in the millimeter wave band has been illustrated as an example of a radio transmission system in which the radio communicating device 1000 according to the first to third embodiments is applied to the rotational structure 1001. However, the scope of the application is not limited to systems performing communication in the millimeter wave band. Communication in a frequency band below the millimeter wave band or conversely in a frequency band above the millimeter wave band can be applied to the rotational structure 1001. For example, a microwave band may be applied.

<Communication Processing System: Modulation and Demodulation>

Figure 11A:
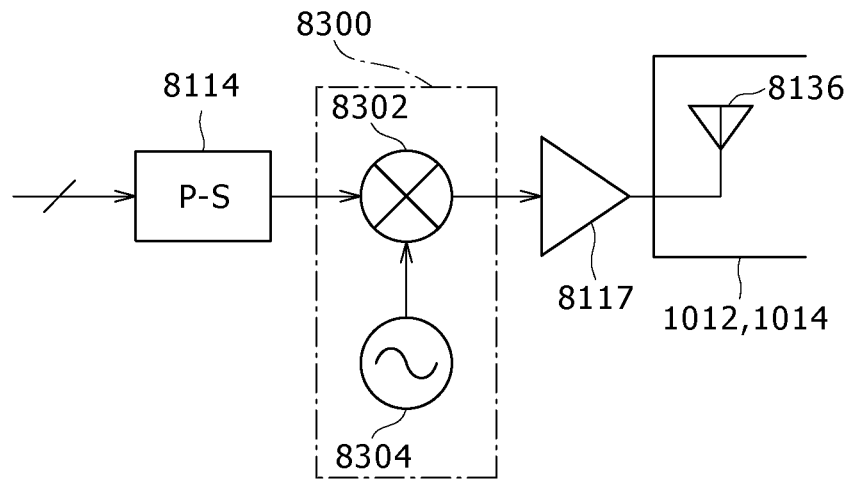
FIGS. 11A to 11C are diagrams of assistance in explaining an example of basic configuration of a modulating functional portion and a demodulating functional portion.
Figure 11B:
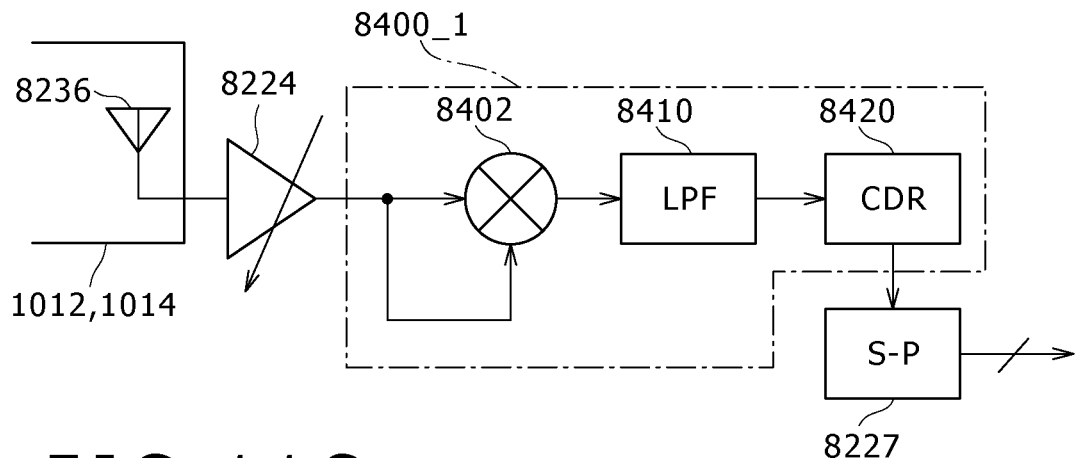
Figure 11C:
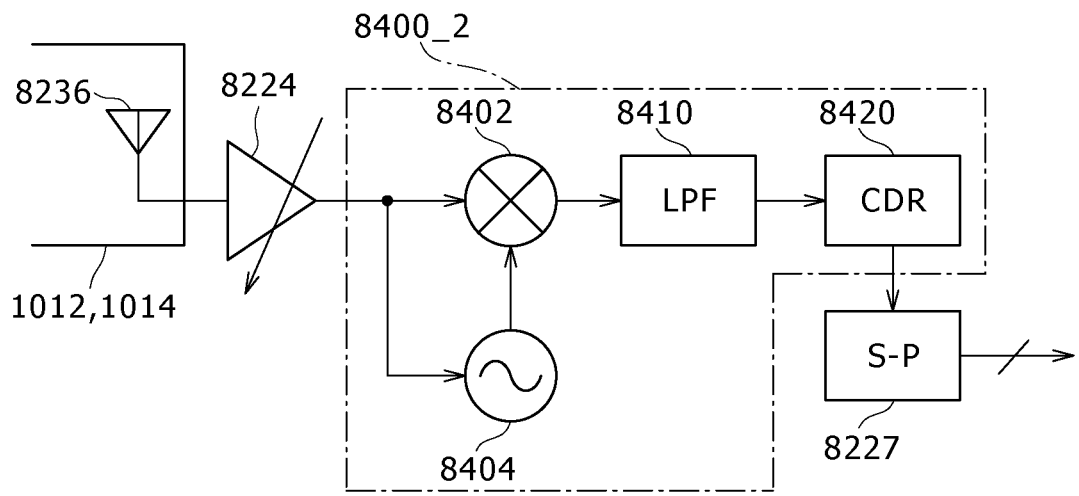

FIGS. 11A to 11C are diagrams of assistance in explaining an example of basic configuration of a modulating functional portion 8300 (the modulating sections 115 and 215 and the frequency converting sections 116 and 216) provided on the transmitting side and a demodulating functional portion 8400 (the frequency converting sections 125 and 225 and the demodulating sections 126 and 226) provided on the receiving side.

[Modulating Functional Portion: Basic Configuration]

FIG. 11A shows an example of basic configuration of the modulating functional portion 8300 provided on the transmitting side. A signal to be transmitted (for example a 12-bit image signal) is converted into a high-speed serial data series by a parallel-serial converting section 8114. The serial data series is supplied to the modulating functional portion 8300.

The modulating functional portion 8300 can employ various circuit configurations according to a modulation system. However, in the case of a system of modulating amplitude and phase, for example, it suffices for the modulating functional portion 8300 to employ a configuration including a frequency mixing circuit 8302 (mixer circuit) and a transmitting side local oscillator 8304.

The transmitting side local oscillator 8304 generates a carrier wave (a carrier signal or a reference carrier wave) used for modulation. The frequency mixing circuit 8302 generates a modulated signal in the millimeter wave band by multiplying (modulating) the carrier wave in the millimeter wave band which carrier wave is generated by the transmitting side local oscillator 8304 by the signal from the parallel-serial converting section 8114 (corresponding to the parallel-serial converting section 114). The frequency mixing circuit 8302 then supplies the modulated signal to an amplifying section 8117 (corresponding to the amplifying section 117). The modulated signal is amplified by the amplifying section 8117, and then radiated from an antenna 8136 (the linearly polarized wave probe 1070 or the circularly polarized wave probe 1080 in the previous example).

[Demodulating Functional Portion: First Basic Configuration]

FIG. 11B shows a first example of basic configuration of the demodulating functional portion 8400 provided on the receiving side. While the demodulating functional portion 8400 can employ various circuit configurations within a range corresponding to the modulating system on the transmitting side, description in the following will be made of a system in which amplitude and phase are modulated so as to correspond to the above description of the modulating functional portion 8300.

A demodulating functional portion 8400_1 in the first example has a two-input type frequency mixing circuit 8402 (mixer circuit), and uses a square-law detecting circuit providing a detection output proportional to the square of amplitude of a received millimeter wave signal (envelope). In the example shown in the figure, a filter processing section 8410 and a clock reproducing circuit 8420 (CDR: Clock Data Recovery) as well as a serial-parallel converting section 8127 (corresponding to the serial-parallel converting section 127) are provided in a stage succeeding the frequency mixing circuit 8402. For example, a low-pass filter (LPF) is provided in the filter processing section 8410.

A millimeter wave received signal received by an antenna 8236 (the linearly polarized wave probe 1070 or the circularly polarized wave probe 1080 in the previous example) is input to a variable gain type amplifying section 8224 (corresponding to the amplifying section 224) to be adjusted in amplitude, and thereafter supplied to the demodulating functional portion 8400_1. The received signal adjusted in amplitude is simultaneously input to the two input terminals of the frequency mixing circuit 8402, where a square signal is generated. The square signal is supplied to the filter processing section 8410. A high-frequency component of the square signal generated by the frequency mixing circuit 8402 is removed by the low-pass filter of the filter processing section 8410, whereby the waveform of an input signal (baseband signal) transmitted from the transmitting side is generated. The baseband signal is supplied to the clock reproducing circuit 8420.

The clock reproducing circuit 8420 reproduces a sampling clock on the basis of the baseband signal, and generates a received data series by sampling the baseband signal with the reproduced sampling clock. The generated received data series is supplied to a serial-parallel converting section 8227, where a parallel signal (for example a 12-bit image signal) is reproduced. While a clock reproducing system includes various systems, a symbol synchronization system, for example, is adopted.

[Demodulating Functional Portion: Second Basic Configuration]

FIG. 11C shows a second example of basic configuration of the demodulating functional portion 8400 provided on the receiving side. In the second example, an injection locking system is adopted.

When multiple channels are realized by a frequency division multiplexing system, the system using the square-law detecting circuit in the first example has the following difficulties. First, in realizing multiple channels using the square-law detecting circuit in the first example, a band-pass filter for frequency selection on the receiving side needs to be disposed in a stage preceding the square-law detecting circuit, but it is not easy to realize a steep band-pass filter in small size. In addition, the square-law detecting circuit in the first example is disadvantageous in terms of sensitivity.

The oscillating circuit also has the following difficulties. For example, in realizing multiple channels in outdoor communication, effect of a frequency variation component of a carrier wave is produced, and thus strict specifications are required also for stability of the carrier wave on the transmitting side. When an ordinary method as used in outdoor radio communication is to be used on the transmitting side and the receiving side in transmitting data by the millimeter wave, stability is required of the carrier wave, and a highly stable millimeter wave oscillator whose frequency stability is on the order of ppm (parts per million) is required. When a millimeter wave oscillator of high stability is to be implemented on a silicon integrated circuit (CMOS: Complementary Metal Oxide Semiconductor), because a silicon substrate used in ordinary CMOS has a low insulation quality, a high-Q tank circuit cannot be formed easily, and the millimeter wave oscillator of high stability is not implemented easily. For example, when an inductance is formed on a CMOS chip, the Q is about 30 to 40.

Thus, in general, to realize an oscillator of high stability as required in radio communication, there is no choice but to adopt a method of forming a high-Q tank circuit by a crystal oscillator outside the CMOS where an oscillating circuit is formed, effecting oscillation at a low frequency, multiplying the oscillation output, and thereby raising the oscillation output to the millimeter wave band. However, it is not desirable to provide such an external tank to all chips in order to realize a function of replacing signal transmission by wiring for LVDS (Low Voltage Differential Signaling) or the like with signal transmission by the millimeter wave.

When a modulating system such as OOK (On-Off Keying) or the like is used, it suffices to perform envelope detection on the receiving side. Thus, a need for the oscillator is eliminated, and the number of tank circuits can be reduced. However, there is a disadvantage in that signal distortion produces an effect as a signal transmission distance is lengthened. There are also problems such for example as a difficulty in realizing multiple channels or full-duplex bidirectionality to achieve a plurality of independent communications freely within a casing and a difficulty in raising a data transmission rate by orthogonalizing a modulated signal.

In addition, when tolerating frequency variations of the carrier wave is considered, in actual conditions, the modulating system is limited to a system of modulating amplitude (for example ASK such as OOK or the like) in which system effects of frequency variations can be ignored, and it is difficult to adopt systems of modulating phase and frequency.

As a measure against such problems, the demodulating functional portion 8400_2 in the second example employs an injection locking system. When the injection locking system is employed, it is desirable to prevent a modulated signal component from being present in the vicinity of carrier frequency and make injection locking on the receiving side easy by performing modulation after suppressing (cutting) a low-frequency component including DC (direct current) of a signal to be modulated. For example, in the case of an analog modulating system, it is desirable to perform high-pass filter processing (or band-pass filter processing) on the signal to be modulated. In the case of a digital modulating system, it is desirable to perform DC-free encoding of an 8-9 conversion code, an 8-10 conversion code or the like.

It is also desirable to send out a reference carrier signal, which corresponds to a carrier signal used for modulation and is used as a reference for injection locking on the receiving side, in conjunction with a signal modulated into the millimeter wave band from the transmitting side. While sending out only a modulated signal modulated into the millimeter wave band by the frequency mixing circuit 8302 can be considered, whether injection locking can be achieved on the receiving side is related to whether DC-free processing is performed, an injection level, a modulating system, a data rate, carrier frequency and the like, and there is a limit to the scope of application. Tarar, M. A.; Zhizhang Chen, "A Direct Down-Conversion Receiver for Coherent Extraction of Digital Baseband Signals Using the Injection Locked Oscillators," Radio and Wireless Symposium, 2008 IEEE, Volume, Issue, 22-24 January 2008, pp. 57 to 60 (hereinafter referred to as Reference Document 2), for example, discloses an example in which a modulated signal itself modulated by a PSK system is used for injection locking.

The reference carrier signal is typically a carrier signal itself used for modulation, but is not limited to this. The reference carrier signal may be a signal of another frequency (for example a harmonic signal) which signal is synchronized with a carrier signal used for modulation, for example. Depending on a modulating system and a modulating circuit, the carrier signal is included in the output itself of the modulating circuit (for example standard amplitude modulation, ASK and the like), or the carrier wave is suppressed (amplitude modulation of a carrier wave suppressing system, ASK, PSK and the like). When the carrier signal is included in the output itself of the modulating circuit, it is not necessary to additionally send the reference carrier signal to the receiving side. However, in the case of the system in which the carrier signal is not included in the output itself of the modulating circuit, it is desirable to perform an operation of "also sending the reference carrier signal."

A receiving side local oscillator 8404 is provided on the receiver side. A transmitted reference carrier signal component is injection-locked into the receiving side local oscillator 8404. A frequency mixing circuit 8402 demodulates a transmitted millimeter wave modulated signal using the output signal (oscillating output signal) of the receiving side local oscillator 8404, and thereby reconstructs a transmission object signal. For example, the received signal is input to the receiving side local oscillator 8404, and synchronized with the reference carrier signal. The reference carrier signal and the received signal are input to the frequency mixing circuit 8402 to generate a multiplication signal. A high-frequency component of the multiplication signal is removed by the filter processing section 8410, whereby the waveform of an input signal (baseband signal) transmitted from the transmitting side is obtained. The rest is the same as in the first example.

By thus using injection locking, the receiving side local oscillator 8404 on the receiving side may have a low Q, and required specifications for stability of the reference carrier signal on the transmitting side can be relaxed. Thus, a receiving function can be realized simply even with a higher carrier frequency. The receiving side local oscillator 8404 reproduces a signal synchronized with the reference carrier wave on the transmitting side, and supplies the signal to the frequency mixing circuit 8402. Then synchronous detection is performed. Thus, as shown in FIG. 11C, it is not necessary to provide a band-pass filter (frequency selecting filter) in a stage preceding the frequency mixing circuit 8402.

In addition, on the receiver side, the receiving side local oscillator 8404 can be formed by providing a tank circuit on a semiconductor chip without a tank circuit being used outside the semiconductor chip of a CMOS configuration. A transmitted millimeter wave modulated signal is demodulated using an output signal obtained by supplying a reference carrier signal component transmitted from the transmitting side to the receiving side local oscillator 8404 and thereby injection-locking the reference carrier signal component transmitted from the transmitting side into the receiving side local oscillator 8404, so that a transmitted input signal can be reconstructed.

Description in the following will be made of details of the transmitting side (transmitting side signal generating portion 110) and the receiving side (receiving side signal generating portion 220) when the injection locking system is employed in a case of transmitting a millimeter wave signal from the side of the first communicating block 100 to the side of the second communicating block 200.

[Injection Locking System: Examples of Configuration of Transmitting Side]

Figure 12A:
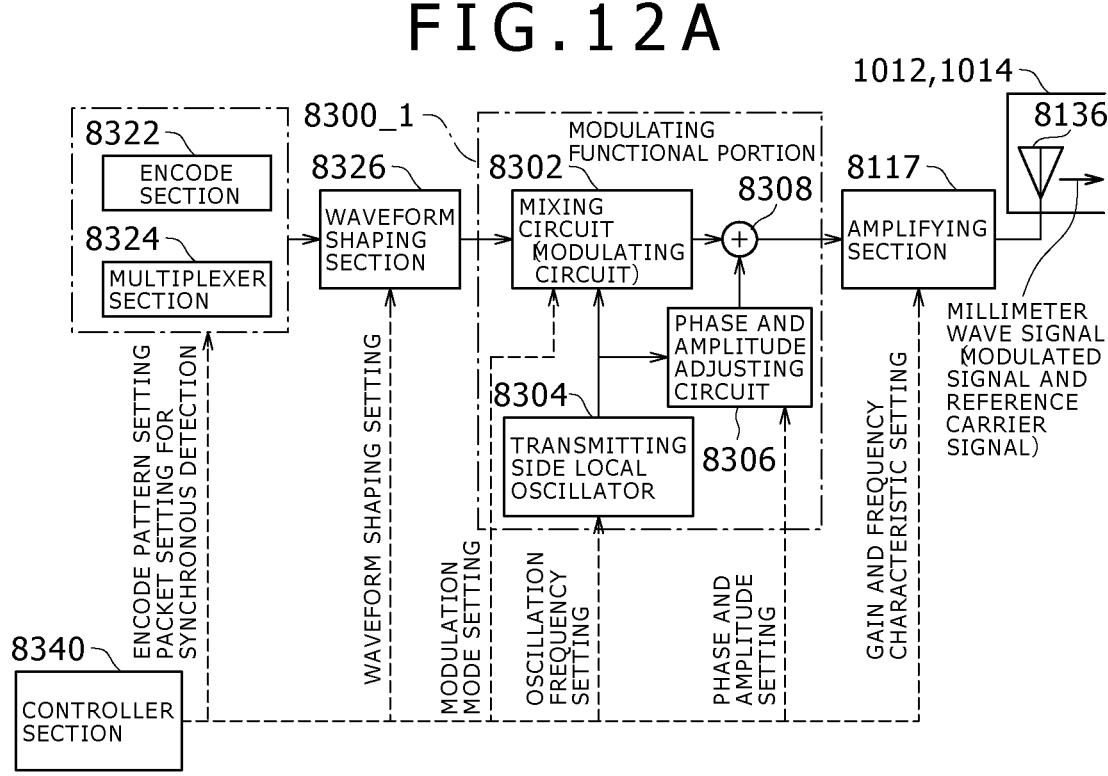
FIGS. 12A and 12B are diagrams of assistance in explaining examples of configuration of a transmitter side to which an injection locking system is applied.
Figure 12B:
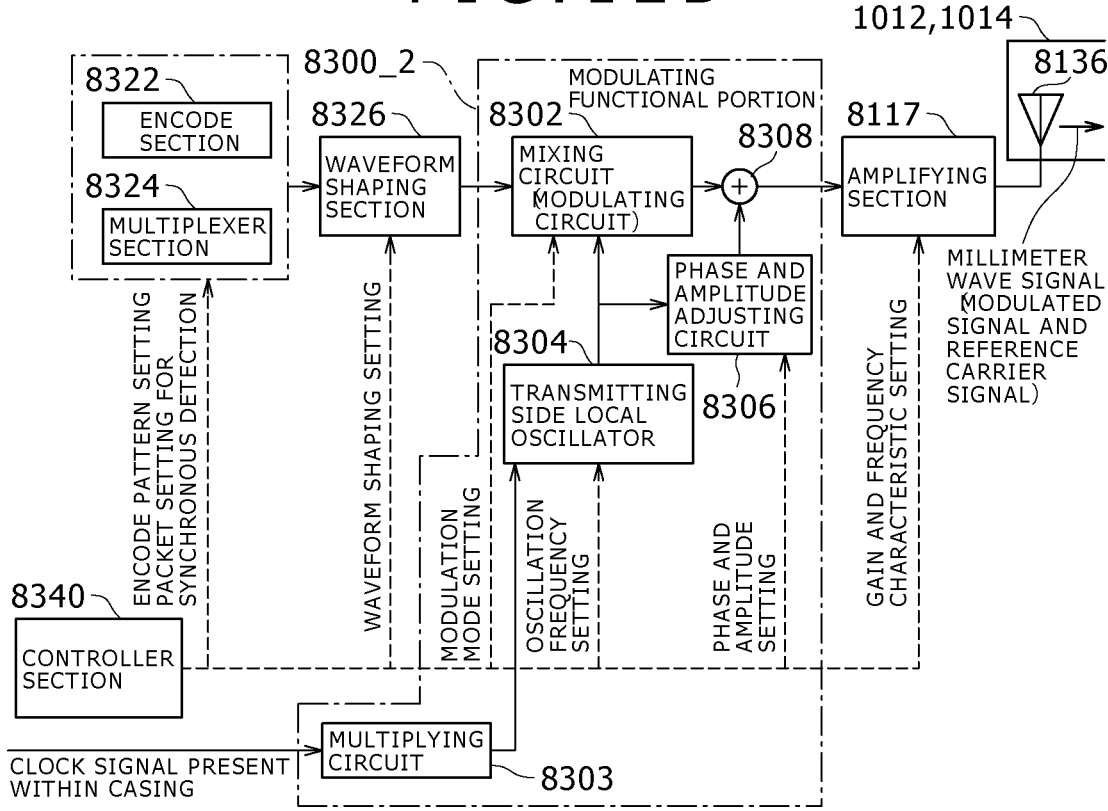

FIGS. 12A and 12B are diagrams of assistance in explaining examples of configuration of the transmitter side (transmitting side signal generating portion 110) to which the injection locking system is applied. Description in the following will be made of a case in which a digital modulating system is applied. Incidentally, a reference "_1" is attached to the modulating functional portion 8300 in a first example, and a reference "_2" is attached to the modulating functional portion 8300 in a second example. The references will be omitted when description is made without distinguishing the modulating functional portions 8300_1 and 8300_2 from each other.

The transmitting side signal generating portion 110 includes an encode section 8322, a multiplexer section 8324, and a waveform shaping section 8326 between the parallel-serial converting section 8114 not shown in the figure and the modulating functional portion 8300. It is not essential to have these functional parts, and it suffices to provide the functional parts when the functions of the functional parts are necessary.

The transmitting side signal generating portion 110 includes a controller section 8340 for controlling each functional part. While it is not essential to have the controller section 8340, the functions of the controller section 8340 are often present on a CMOS chip or on a board in various recent systems. The controller section 8340 has functions of setting encode and multiplex, setting waveform shaping, setting a modulation mode, setting an oscillation frequency, setting the phase and amplitude of a reference carrier signal, setting the gain and frequency characteristics of the amplifying section 8117, and setting antenna characteristics, for example. Each piece of setting information is supplied to a corresponding functional part.

The encode section 8322 subjects data converted into a serial form by the parallel-serial converting section 8114 not shown in the figure to a coding process such as error correction and the like on the basis of encode pattern setting information from the controller section 8340. At this time, the encode section 8322 applies DC-free encoding of an 8-9 conversion code, an 8-10 conversion code or the like to prevent a modulated signal component from being present in the vicinity of carrier frequency and make injection locking on the receiving side easy.

The multiplexer section 8324 packetizes data. When an injection locking detecting section on the receiver side is configured to detect injection locking by correlation of a known pattern, the multiplexer section 8324 periodically inserts a known signal waveform or a known data pattern (for example a pseudo-random signal: a PN signal) on the basis of setting information for packets for synchronous detection from the controller section 8340.

The waveform shaping section 8326 performs a waveform shaping process such as frequency characteristic correction, preemphasis, band limitation and the like on the basis of setting information for waveform shaping from the controller section 8340.

The modulating functional portion 8300 includes a phase and amplitude adjusting circuit 8306 and a signal synthesizing circuit 8308 in addition to the frequency mixing circuit 8302 (modulating circuit) and the transmitting side local oscillator 8304 (transmitting side oscillator). The transmitting side local oscillator 8304 in the first example shown in FIG. 12A generates a reference carrier signal used for modulation on a CMOS chip using a tank circuit on the CMOS chip.

Incidentally, the second example shown in FIG. 12B is an example of configuration when a clock signal usable as a reference is present in the first communicating block 100. The modulating functional portion 8300_2 includes a multiplying circuit 8303 in a stage preceding the transmitting side local oscillator 8304. The multiplying circuit 8303 multiplies the "clock signal usable as a reference" which clock signal is supplied from a clock signal generating part not shown in the figure, and then supplies the multiplied signal to the transmitting side local oscillator 8304. The transmitting side local oscillator 8304 in the second example is a synchronous oscillator circuit. The transmitting side local oscillator 8304 in the second example generates the reference carrier signal used for modulation in synchronism with the multiplied signal.

The frequency mixing circuit 8302 modulates the reference carrier signal generated by the transmitting side local oscillator 8304 with a processed input signal from the waveform shaping section 8326. The frequency mixing circuit 8302 then supplies the modulated reference carrier signal to the amplifying section 8117. The phase and amplitude adjusting circuit 8306 sets the phase and amplitude of the reference carrier signal to be transmitted on the basis of phase and amplitude setting information from the controller section 8340.

The signal synthesizing circuit 8308 is provided to send the reference carrier signal to the receiving side together with a modulated signal modulated into the millimeter wave band when there is one antenna 8136 and there is one antenna 8236. The signal synthesizing circuit 8308 is not necessary when the modulated signal generated by the frequency mixing circuit 8302 and the reference carrier signal generated by the transmitting side local oscillator 8304 are transmitted by respective separate antennas.

When the reference carrier signal is sent out to the receiving side together with the signal modulated into the millimeter wave band, the signal synthesizing circuit 8308 subjects the modulated signal modulated into the millimeter wave band by the frequency mixing circuit 8302 and the reference carrier signal from the phase and amplitude adjusting circuit 8306 to a synthesizing process, and then sends the result to the amplifying section 8117. When only the modulated signal modulated into the millimeter wave band by the frequency mixing circuit 8302 is sent out to the receiving side, the signal synthesizing circuit 8308 does not perform the synthesizing process, but sends only the modulated signal modulated into the millimeter wave band by the frequency mixing circuit 8302 to the amplifying section 8117. The amplifying section 8117 adjusts the millimeter wave signal received from the signal synthesizing circuit 8308 in transmission output amplitude and frequency characteristic as required, and then supplies the millimeter wave signal to the antenna 8136 (the linearly polarized wave probe 1070 or the circularly polarized wave probe 1080 in the previous example). The antenna 8136 transmits the millimeter wave signal (the modulated signal and the reference carrier signal) to the receiving side via the waveguides 1012 and 1014.

As is understood from the above description, when the reference carrier signal is sent out to the receiving side together with the signal modulated into the millimeter wave band, whether the signal synthesizing circuit 8308 is made to function or not is related to the modulating system and the circuit configuration of the frequency mixing circuit 8302. Depending on the modulating system and the circuit configuration of the frequency mixing circuit 8302, the reference carrier signal can also be sent out together with the signal modulated into the millimeter wave band to the receiving side without the signal synthesizing circuit 8308 being made to function.

The frequency mixing circuit 8302 may be actively set as a modulating circuit of a carrier wave suppressing system in amplitude modulation or ASK, and the reference carrier signal generated by the transmitting side local oscillator 8304 may be sent together with the output of the modulating circuit. In this case, a harmonic of the carrier signal used for modulation can be used for the reference carrier signal, and the modulated signal and the reference carrier signal can be separately adjusted in amplitude. That is, the amplifying section 8117 makes gain adjustment directing attention to the amplitude of the modulated signal. At this time, the amplitude of the reference carrier signal is also adjusted simultaneously. Only the amplitude of the reference carrier signal can be adjusted in the phase and amplitude adjusting circuit 8306 so as to be a desirable amplitude in relation to injection locking.

[Injection Locking System: Example of Configuration of Receiving Side]

FIG. 13 is a diagram of assistance in explaining an example of configuration of the receiver side (receiving side signal generating portion 220) to which the injection locking system is applied.

The receiving side signal generating portion 220 includes a controller section 8440 for controlling each functional part. While it is not essential to have the controller section 8440, the functions of the controller section 8440 are often present on a CMOS chip or on a board in various recent systems, as with the controller section 8340. The controller section 8440 has functions of setting the gain and frequency characteristics of the amplifying section 8224, setting the phase and amplitude of a received reference carrier signal, setting an oscillation frequency, setting a modulation mode, setting a filter and equalization, and setting coding and multiplex, for example. Each piece of setting information is supplied to a corresponding functional part.

The demodulating functional portion 8400 includes a phase and amplitude adjusting circuit 8406, a direct-current component suppressing circuit 8407, and an injection locking detecting circuit 8408 in addition to the frequency mixing circuit 8402 (demodulating circuit) and the receiving side local oscillator 8404 (receiving side oscillator).

Incidentally, a circuit for extracting only a reference carrier signal component (a band-pass filter or the like) may be disposed on the side of an injection signal into the receiving side local oscillator 8404 (for example in a stage preceding the phase and amplitude adjusting circuit 8406). Thereby, a modulated signal component and the reference carrier signal component are separated from a received millimeter wave signal, only the reference carrier signal component is supplied to the receiving side local oscillator 8404, and thus injection locking is achieved easily.

The phase and amplitude adjusting circuit 8406 sets the phase and amplitude of the received reference carrier signal on the basis of phase and amplitude setting information from the controller section 8440. While FIG. 13 shows a configuration in which the phase and amplitude adjusting circuit 8406 is disposed on the side of a terminal for inputting the injection signal into the receiving side local oscillator 8404, the phase and amplitude adjusting circuit 8406 may be disposed on a signal path between the receiving side local oscillator 8404 and the frequency mixing circuit 8402, or both the phase and amplitude adjusting circuits 8406 may be used in combination with each other.

The direct-current component suppressing circuit 8407 suppresses an unnecessary direct-current component (direct-current offset component) included in the output of the frequency mixing circuit 8402. For example, when the reference carrier signal is transmitted together with a modulated signal from the transmitting side to the receiving side, a large direct-current offset component may occur depending on phase relation between the modulated signal and the reference carrier signal. The direct-current component suppressing circuit 8407 functions to remove the direct-current offset component.

The injection locking detecting circuit 8408 determines a state of injection locking on the basis of a baseband signal obtained by the frequency mixing circuit 8402, and notifies a result of the determination to the controller section 8440. While FIG. 13 shows a configuration in which the injection locking detecting circuit 8408 senses the output signal of the direct-current component suppressing circuit 8407, the injection locking detecting circuit 8408 may sense the input side of the direct-current component suppressing circuit 8407.

The "state of injection locking" is whether the reproduced reference carrier signal output from the receiving side local oscillator 8404 (which reference carrier signal will be referred to as the reproduced reference carrier signal) is synchronized with the reference carrier signal on the transmitting side (which reference carrier signal will be referred to as the transmitted reference carrier signal). A state in which the transmitted reference carrier signal is synchronized with the reproduced reference carrier signal will be referred to as a state in which "injection locking is achieved."

In order to achieve injection locking, the receiving side signal generating portion 120 controls at least one of the free-running oscillation frequency of the transmitting side local oscillator 8304 and the injection amplitude and injection phase of the received signal to the receiving side local oscillator 8404. Which of the elements to control depends on the circuit configuration of the receiving side local oscillator 8404. Not all the elements necessarily need to be controlled.

For example, to achieve injection locking, the controller section 8440 controls the free-running oscillation frequency of the receiving side local oscillator 8404 and controls the injection amplitude and injection phase of the received signal to the receiving side local oscillator 8404 via the phase and amplitude adjusting circuit 8406 in such a manner as to be interlocked with a result of detection of the injection locking detecting circuit 8408.

For example, first, a millimeter wave signal (a modulated signal and a reference carrier signal) sent from the transmitting side via the millimeter wave signal transmission line 9 (waveguides 1012 and 1014) is passed through the antenna 8236, and then amplified by the amplifying section 8224. A part of the amplified millimeter wave signal is adjusted in amplitude and phase in the phase and amplitude adjusting circuit 8406, and thereafter injected into the receiving side local oscillator 8404. The frequency mixing circuit 8402 frequency-converts the millimeter wave signal from the amplifying section 8224 into a baseband signal by an output signal (reproduced reference carrier signal) from the receiving side local oscillator 8404. A part of the converted baseband signal is input to the injection locking detecting circuit 8408. Information for determining whether the receiving side local oscillator 8404 is synchronized with the reference carrier signal on the transmitting side is obtained by the injection locking detecting circuit 8408, and notified to the controller section 8440.

The symbol time (T) of the input signal needs to be shorter by a margin than $1/(2\Delta fomax)$ when the modulating system is ASK to which OOK is applied, for example (the same is true for BPSK). $\Delta fomax$ is the maximum pull-in frequency range width of the receiving side local oscillator 8404. When the symbol time (T) is longer than $1/(2\Delta fomax)$, the receiving side local oscillator 8404 operates in an amplification mode, and cannot sufficiently output a reference carrier signal component necessary for demodulation. The fact that such a short symbol time is preferred is convenient in applications of the present embodiment aimed at high-speed data transfer.

The pull-in frequency range can be expressed as in Equation (A) from an injection voltage Vi into the receiving side local oscillator 8404, a free-running oscillation voltage Vo, a free-running oscillation frequency fo, and the Q-value of a tank circuit. Thus, $\Delta fomax$ can be controlled by controlling an input voltage Vi.

$$\Delta fomax = fo/(2*Q)*(Vi/Vo)*1/sqrt(1-(Vi/Vo)^2) \qquad (A)$$

The controller section 8440 determines whether synchronization is achieved by one of the following two methods or using the two methods in combination with each other on the basis of information on the "state of injection locking" from the injection locking detecting circuit 8408.

1) A correlation between a reconstructed waveform and a known signal waveform or a known data pattern is obtained on the receiving side, and it is determined that synchronization is achieved when a strong correlation is obtained.

2) The direct-current component of the baseband signal demodulated on the receiving side is monitored, and it is determined that synchronization is achieved when the direct-current component stabilizes.

While various methods are conceivable for the mechanisms of the above 1) and 2), description of details thereof will be omitted here.

When it is determined that synchronization is not achieved, the controller section 8440 changes oscillation frequency setting information for the receiving side local oscillator 8404 and amplitude and phase setting information for the phase and amplitude adjusting circuit 8406 so as to achieve synchronization between the carrier frequency signal used for modulation on the transmitting side and the oscillation output signal output from the receiving side local oscillator 8404 according to a predetermined procedure. The controller section 8440 thereafter repeats a procedure of determining the state of injection locking again until good synchronization is achieved. This system has drawbacks in terms of power consumption and interference resistance because injection locking cannot be achieved on the receiving side unless the millimeter wave signal (reference carrier signal component in particular) is transmitted at a certain strength, but has an advantage of being able to cope only on the receiving side.

In addition, without limitation to provisions on the receiving side, control information may be sent to the transmitting side to adjust the oscillation frequency of the transmitting side local oscillator 8304 on the transmitting side (that is, the frequency of the reference carrier signal), the transmission amplitude of the millimeter wave (the transmission amplitude of the reference carrier signal in particular), and the phase of the reference carrier signal. It is not essential to transmit the control information from the receiving side to the transmitting side by the millimeter wave, and an arbitrary system may be adopted regardless of wire or radio. The system that controls the transmitting side needs to transmit the control information from the receiving side to the transmitting side, but has advantages of being able to transmit the millimeter wave with a minimum power with which injection locking can be achieved on the receiving side, thus being able to reduce power consumption, and improving interference resistance, for example.

The injection locking of the receiving side local oscillator 8404 is performed properly, and the baseband signal frequency-converted by the frequency mixing circuit 8402 is supplied to the filter processing section 8410. The filter processing section 8410 includes an equalizer 8414 in addition to a low-pass filter 8412. The equalizer 8414 has an equalizer (that is, a waveform equalization) filter for adding a gain for an amount of decrease to the high-frequency band of the received signal to reduce intersymbol interference, for example.

The low-pass filter 8412 removes a high-frequency component of the baseband signal. The equalizer 8414 corrects the high-frequency component of the baseband signal.

The clock reproducing circuit 8420 has a symbol synchronizing circuit 8422, a decode section 8424, and a demultiplexer section 8426. The decode section 8424 corresponds to the encode section 8322. The demultiplexer section 8426 corresponds to the multiplexer section 8324. The decode section 8424 and the demultiplexer section 8426 each perform the reverse of the processes on the transmitting side.

After achieving symbol synchronization in the symbol synchronizing circuit 8422, the clock reproducing circuit 8420 reconstructs the original input signal on the basis of coding pattern setting information and multiplex settings from the controller section 8440.

CMOS miniaturization will progress further in the future, and the operating frequency of CMOS will increase further. It is desired that high carrier frequency be used to realize a small transmission system in a higher band. The injection locking system in the present example can relax required specifications for oscillation frequency stability, and thus makes it possible to use higher carrier frequency easily. The receiving side local oscillator 8404 on the injection-locked side needs to have a low Q so as to follow variation on the transmitting side, as is clear from Equation (A). This is advantageous when the receiving side local oscillator 8404 is formed on CMOS.

<Communication Processing System: First Example of Application>

Figure 14:
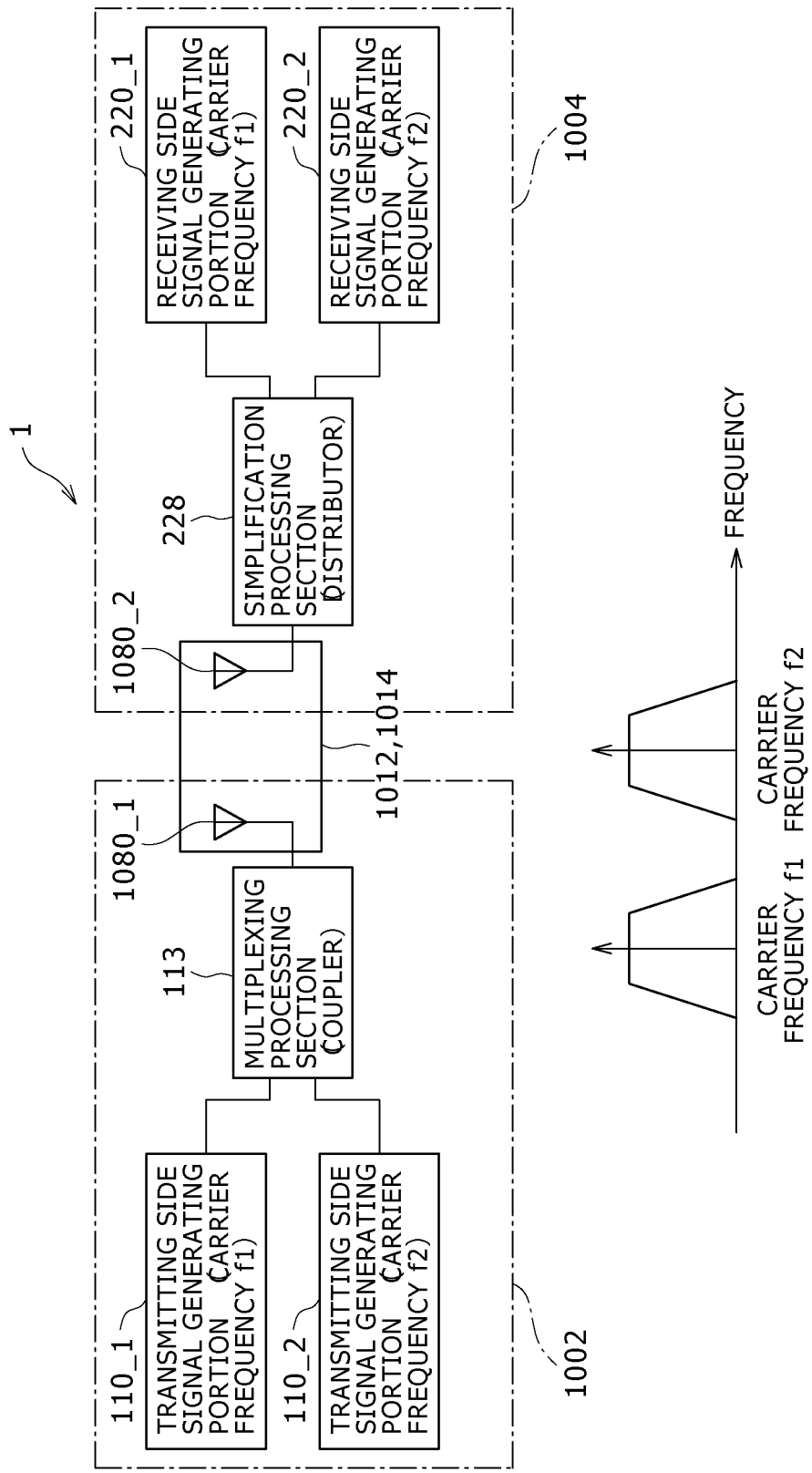
FIG. 14 is a diagram of assistance in explaining a first example of application of the radio transmission system according to the present embodiment.

FIG. 14 is a diagram of assistance in explaining a first example of application of the radio transmission system 1 according to the present embodiment. The first example of application of the radio transmission system 1 according to the present embodiment is a configuration in which when one of the fixed unit 1002 and the movable unit 1004 is set as a transmitting side and the other is set as a receiving side and transmission is performed in a same direction, transmitting units of N sets (N is a positive integer of two or more) are arranged on the transmitting side, receiving units of N sets are also arranged on the receiving side, and the sets of the transmitting units and the receiving units use respective separate carrier frequencies.

FIG. 14 shows a case where the fixed unit 1002 is set as the transmitting side, the movable unit 1004 is set as the receiving side, and N=2. The above-described injection locking system is applied to each of the transmitting unit and the receiving unit.

For example, the first communicating block 100 (first and second transmitting side signal generating portions 110_1 and 110_2) is disposed in the fixed unit 1002, and the second communicating block 200 (first and second receiving side signal generating portions 220_1 and 220_2) is disposed in the movable unit 1004. Suppose that the set of the first transmitting side signal generating portion 110_1 and the first receiving side signal generating portion 220_1 uses a first carrier frequency f1, and that the set of the second transmitting side signal generating portion 110_2 and the second receiving side signal generating portion 220_2 uses a second carrier frequency f2 (≠f1). Suppose that the circularly polarized wave probe 1080, for example, is used as antennas of the transmission line coupling sections 108 and 208.

Millimeter wave signals of the carrier frequencies f1 and f2 generated by the respective transmitting side signal generating portions 110_1 and 110_2 are integrated into one system by a coupler as an example of the multiplexing processing section 113, and then transmitted as a circularly polarized wave to the inside of the waveguides 1012 and 1014 via the circularly polarized wave probe 1080 of the transmission line coupling section 108. The circularly polarized wave probe 1080 on the receiving side receives the millimeter wave signal of the circularly polarized wave within the waveguides 1012 and 1014, separates the millimeter wave signal of the circularly polarized wave into two systems by a distributor as an example of the simplification processing section 228, and then supplies the signals to the respective receiving side signal generating portions 220_1 and 220_2. The receiving side signal generating portion 220_1 generates a reproduced carrier signal injection-locked at the carrier frequency f1 used for modulation by the transmitting side signal generating portion 110_1 and demodulates the received millimeter wave signal. The receiving side signal generating portion 220_2 generates a reproduced carrier signal injection-locked at the carrier frequency f2 used for modulation by the transmitting side signal generating portion 110_2 and demodulates the received millimeter wave signal.

In the first example of application, with such a mechanism, frequency division multiplexing transmission that transmits different signals in the same direction can be realized without causing interference problems, using the two sets of carrier frequency f1 and f2.

<Communication Processing System: Second Example of Application>

Figure 15:
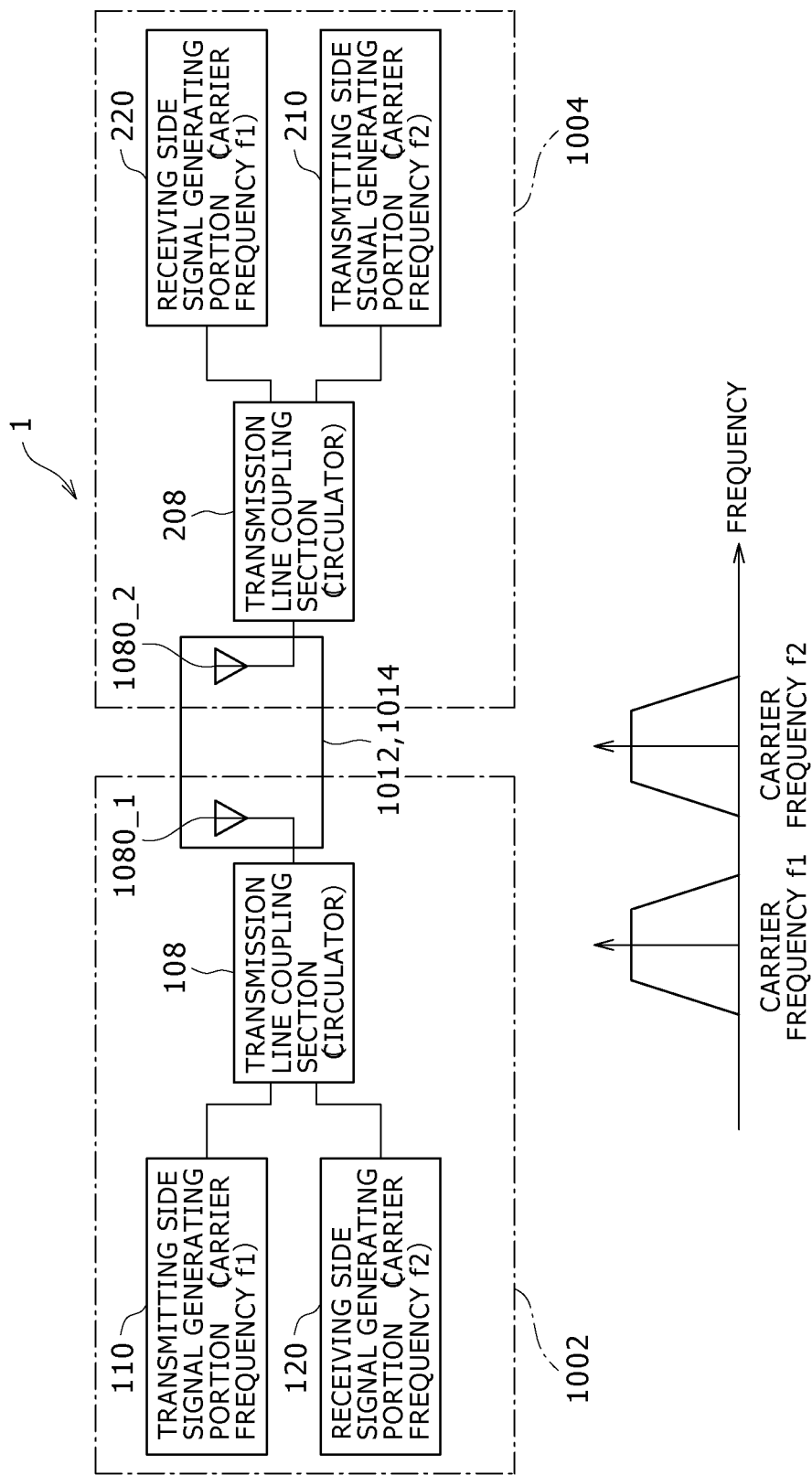
FIG. 15 is a diagram of assistance in explaining a second example of application of the radio transmission system according to the present embodiment.

FIG. 15 is a diagram of assistance in explaining a second example of application of the radio transmission system 1 according to the present embodiment. The second example of application of the radio transmission system 1 according to the present embodiment is a configuration in which a transmitting unit and a receiving unit are arranged in each of the fixed unit 1002 and the movable unit 1004, the sets of the transmitting units and the receiving units use respective separate carrier frequencies, and full-duplex bidirectional communication is performed.

FIG. 15 shows a case where one transmitting unit and one receiving unit are arranged in each of the fixed unit 1002 and the movable unit 1004. The above-described injection locking system is applied to each of the transmitting units and the receiving units.

For example, the first communicating block 100 (the transmitting side signal generating portion 110 and the receiving side signal generating portion 120) is disposed in the fixed unit 1002, and the second communicating block 200 (the transmitting side signal generating portion 210 and the receiving side signal generating portion 220) is disposed in the movable unit 1004. In order to enable full-duplex bidirectional communication, a different frequency is assigned as a reference carrier signal to each of the sets of the transmitting units performing signal transmission and the receiving units. For example, suppose that the set of the transmitting side signal generating portion 110 and the receiving side signal generating portion 220 uses a first carrier frequency f1, and that the set of the transmitting side signal generating portion 210 and the receiving side signal generating portion 120 uses a second carrier frequency f2 (≠f1). Suppose that the circularly polarized wave probe 1080, for example, is used as antennas of the transmission line coupling sections 108 and 208.

A millimeter wave signal of the carrier frequency f1 generated by the transmitting side signal generating portion 110 on the fixed unit 1002 side is transferred to a circularly polarized wave probe 1080_1 via a circulator as an example of the antenna switching section of the transmission line coupling section 108, and then transmitted as a circularly polarized wave to the inside of the waveguides 1012 and 1014. A circularly polarized wave probe 1080_2 on the movable unit 1004 side as the receiving side receives the millimeter wave signal of the circularly polarized wave within the waveguides 1012 and 1014, and then supplies the millimeter wave signal to the receiving side signal generating portion 220 via a circulator as an example of the antenna switching section of the transmission line coupling section 208. The receiving side signal generating portion 220 generates a reproduced carrier signal injection-locked at the carrier frequency f1 used for modulation by the transmitting side signal generating portion 110 and demodulates the received millimeter wave signal.

Conversely, a millimeter wave signal of the carrier frequency f2 generated by the transmitting side signal generating portion 210 on the movable unit 1004 side is transferred to the circularly polarized wave probe 1080_2 via the circulator as an example of the antenna switching section of the transmission line coupling section 208, and then transmitted as a circularly polarized wave to the inside of the waveguides 1012 and 1014. The circularly polarized wave probe 1080_1 on the fixed unit 1002 side as the receiving side receives the millimeter wave signal of the circularly polarized wave within the waveguides 1012 and 1014, and then supplies the millimeter wave signal to the receiving side signal generating portion 120 via the circulator as an example of the antenna switching section of the transmission line coupling section 108. The receiving side signal generating portion 120 generates a reproduced carrier signal injection-locked at the carrier frequency f2 used for modulation by the transmitting side signal generating portion 210 and demodulates the received millimeter wave signal.

In the second example of application, with such a mechanism, full-duplex bidirectional communication that transmits different signals in opposite directions from each other can be realized without causing interference problems, in application of frequency division multiplexing using the two sets of carrier frequency f1 and f2.

<Electronic Device to which Rotational Structure is Applied>

The radio communicating device 1000 applied to the rotational structure 1001 described above can be distributed as the rotational structure 1001 including the radio communicating device 1000 (a module form, which may include the rotation driving unit 1060), or may be distributed in a product form in which the radio communicating device 1000 is mounted in an electronic device including the rotational structure 1001. Description in the following will be made of some of product examples of such an electronic device.

[First Product Example]

Figure 16A:
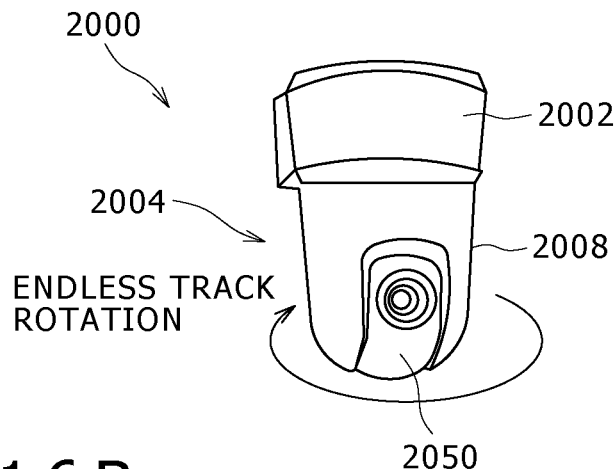
FIGS. 16A and 16B are diagrams of assistance in explaining a first product example (monitoring camera) of an electronic device to which a rotational structure is applied.
Figure 16B:
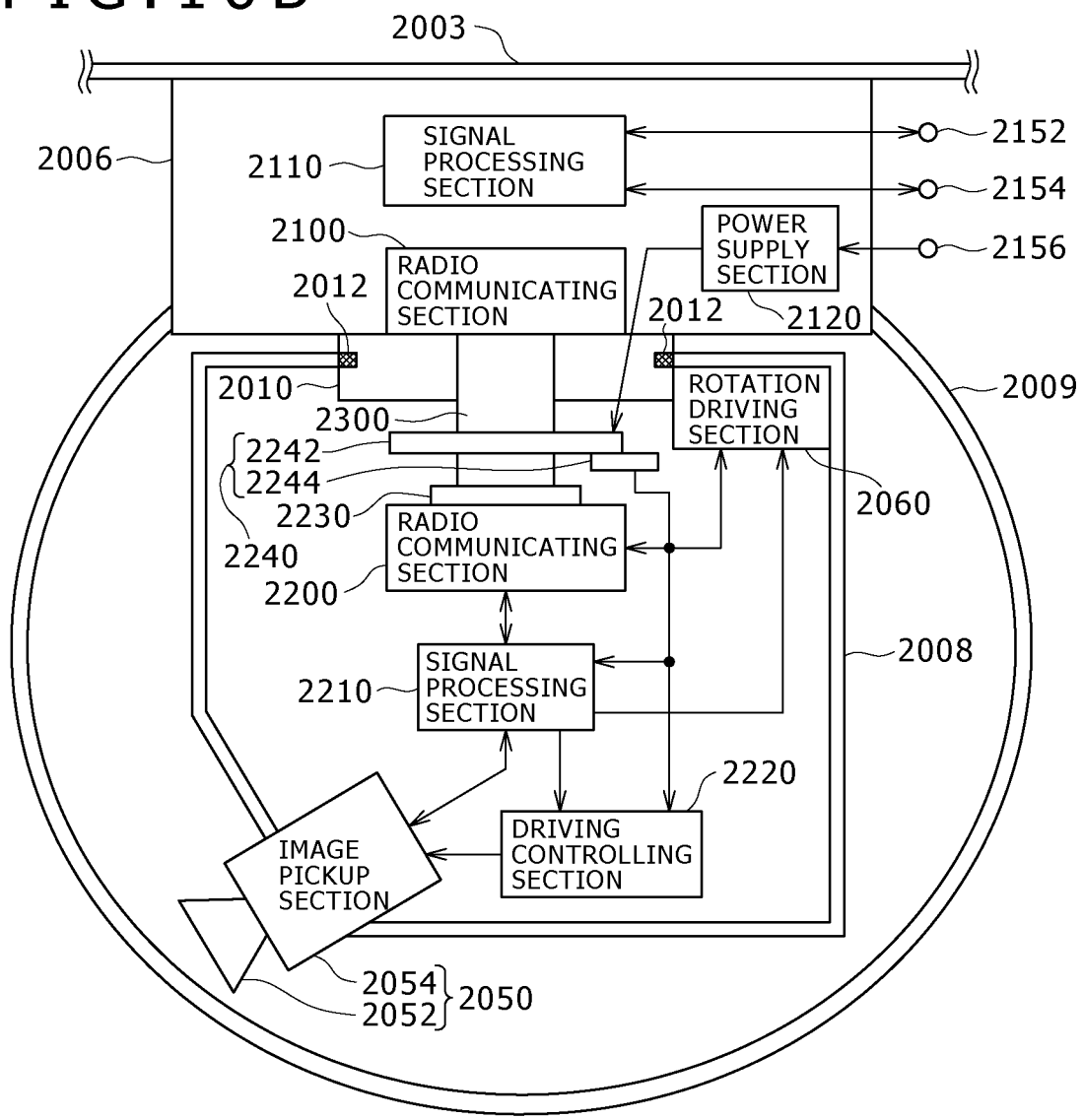

FIGS. 16A and 16B are diagrams of assistance in explaining a first product example of an electronic device to which the rotational structure 1001 is applied. The first product example is an example of application to a monitoring camera. As shown in FIG. 16A, the monitoring camera 2000 is of the rotational structure 1001 including a fixed unit 2002 (corresponding to the fixed unit 1002) and a movable unit 2004 (corresponding to the movable unit 1004). The fixed unit 2002 is for example fixed to a ceiling 2003 (or a wall). The movable unit 2004 has an image pickup module 2050 in an opening part provided in a part of a casing 2008.

As shown in FIG. 16B, the movable unit 2004 is used in a state of being covered by a dome-shaped protective cover 2009 formed of a transparent or semitransparent glass or resin, for example. The protective cover 2009 is fixed to the fixed unit 2002. The casing 2008 of the movable unit 2004 is rotatably coupled to the fixed unit 2002 by a coupling shaft 2010. Specifically, the casing 2008 is coupled to the coupling shaft 2010 via a bearing 2012, and is formed so as to be capable of endless rotation (endless track rotation) by a rotation driving section 2060 (corresponding to the rotation driving unit 1060).

The monitoring camera 2000 is for example provided with an objective of monitoring public buildings and places, hospitals, banks, and stores such as supermarkets and the like where many and unspecified people come and go, as well as trespassers or trespassing objects on off-limits areas such as dams, bases, airfields and the like. The monitoring camera 2000 is for example introduced into a remote monitoring system.

The monitoring camera 2000 drives the image pickup module 2050 in a pan direction (horizontal direction) and a tilt direction (direction of an angle of elevation) using the movable unit 2004 to change a range of a field of view of the monitoring camera 2000 to a wide range for a purpose of setting a wide monitoring range. In particular, in the present constitution, endless track rotation (endless rotation) is adopted in the pan direction so as to cover a wide monitoring range.

The image pickup module 2050 has an image pickup lens section 2052 and an image pickup section 2054 using a CCD (Charge Coupled Device), a CMOS or the like as an image pickup device. The image pickup lens section 2052 preferably has a zoom mechanism.

A radio communicating section 2100, a signal processing section 2110, and a power supply section 2120 are provided within the casing 2006 of the fixed unit 2002. In relation to FIG. 9, the radio communicating section 2100 corresponds to the signal generating part 107 and the transmission line coupling section 108, and the signal processing section 2110 corresponds to the LSI functional part 104. The signal processing section 2110 is connected to a control signal input-output terminal 2152 and a video signal input-output terminal 2154. The power supply section 2120 is connected to a power supply input terminal 2156.

Control signals supplied to the control signal input-output terminal 2152 are as follows. For example, input control signals include input control signals for making zoom adjustment of an optical system of the image pickup module 2050, adjustment in the pan direction and the tilt direction, and the like. Output control signals include information on a result of control by each input control signal, for example information on the value of a zoom magnification of the optical system, pan and tilt set angles, and the like.

A radio communicating section 2200, a signal processing section 2210, a driving controlling section 2220, a shielding pipe 2230, and a slip ring mechanism 2240 are provided within the casing 2008 of the movable unit 2004. In relation to FIG. 9, the radio communicating section 2200 corresponds to the signal generating part 207 and the transmission line coupling section 208, and the signal processing section 2210 and the driving controlling section 2220 correspond to the LSI functional part 204.

A waveguide 2300 corresponding to the waveguides 1012 and 1014 of the radio communicating device 1000 is disposed between the radio communicating section 2100 and the radio communicating section 2200. The waveguide 2300 is a circular waveguide. The waveguide 2300 is fixed to the fixed unit 2002. A radio wave propagates through the inside of the waveguide 2300. The slip ring mechanism 2240 has a fixed conductor 2242 and a rotating conductor 2244 (rotating brush). The slip ring mechanism 2240 allows electrical connection of signals not transmitted by radio wave and power by contact between the fixed conductor 2242 and the rotating conductor 2244.

The driving controlling section 2220 drives and controls the image pickup module 2050. In addition, the driving controlling section 2220 controls the pan direction and the tilt direction of the image pickup module 2050.

The signal processing section 2210 processes a video signal obtained by image pickup by the image pickup module 2050 as appropriate, and transmits the video signal to the radio communicating section 2200. The radio communicating section 2200 converts the video signal from the signal processing section 2210 into a modulated signal of carrier frequency in the microwave band or the millimeter wave band, and then supplies the modulated signal to the waveguide 2300. The shielding pipe 2230 is to prevent a leakage of the radio wave.

In the monitoring camera 2000 of such a configuration, power is supplied from the fixed unit 2002 to the movable unit 2004 via the slip ring mechanism 2240. On the other hand, high-volume data such as the video signal obtained by the image pickup module 2050, various control information that controls various parts on the movable unit 2004 side or which is obtained on the movable unit 2004 side, and the like is transmitted by radio in the microwave band or the millimeter wave band via the waveguide 2300. Radio transmission within the waveguide 2300 is performed by a circularly polarized wave, as described in relation to the radio communicating device 1000. Thereby, even when the movable unit 2004 is made to perform endless rotation (endless track rotation) with respect to the fixed unit 2002, an image signal of high resolution and high image quality and control information can be transmitted without any problem. High-speed radio data transmission can be achieved between the fixed unit 2002 and the movable unit 2004 performing 360-degree endless rotation.

For example, in the fixed unit 2002, power is supplied from the power supply section 2120 to the radio communicating section 2100 and the signal processing section 2110. In addition, power is supplied from the power supply section 2120 to the rotation driving section 2060, the image pickup module 2050, the radio communicating section 2200, the signal processing section 2210, and the driving controlling section 2220 via the fixed conductor 2242 and the rotating conductor 2244 of the slip ring mechanism 2240 in the movable unit 2004.

A video signal obtained by image pickup by the image pickup module 2050 is subjected to image pickup signal processing in the signal processing section 2210, and then supplied to the radio communicating section 2200. The radio communicating section 2200 modulates the video signal by a carrier wave frequency signal, and then transmits the modulated signal to the radio communicating section 2100 on the fixed unit 2002 side via the waveguide 2300. The radio communicating section 2100 converts the received modulated signal into a baseband signal, and then supplies the baseband signal to the signal processing section 2110. The signal processing section 2110 performs video signal processing, and thereafter sends out the signal from the video signal input-output terminal 2154 to a transmission line in the following stage or displays monitoring video on a display device (monitor) not shown in the figure.

When a control signal from a monitoring center, for example, is input to the control signal input-output terminal 2152, the control signal is processed by the signal processing section 2110 as appropriate, and then supplied to the radio communicating section 2100. The radio communicating section 2100 modulates control information corresponding to the control signal by a carrier wave frequency signal, and transmits the modulated signal to the radio communicating section 2200 on the movable unit 2004 side via the waveguide 2300. The radio communicating section 2200 converts the received modulated signal into a baseband signal, and then supplies the baseband signal to the signal processing section 2210. The signal processing section 2210 separates the control signal, and controls the image pickup module 2050 (the image pickup lens section 2052 and the image pickup section 2054). A part of the control signal is supplied to the driving controlling section 2220. The driving controlling section 2220 controls the pan direction and the tilt direction of the image pickup module 2050. Further, a part of the control signal is also supplied to the rotation driving section 2060. The rotation driving section 2060 controls the pan direction of the whole of the movable unit 2004.

[Second Product Example]

Figure 17:
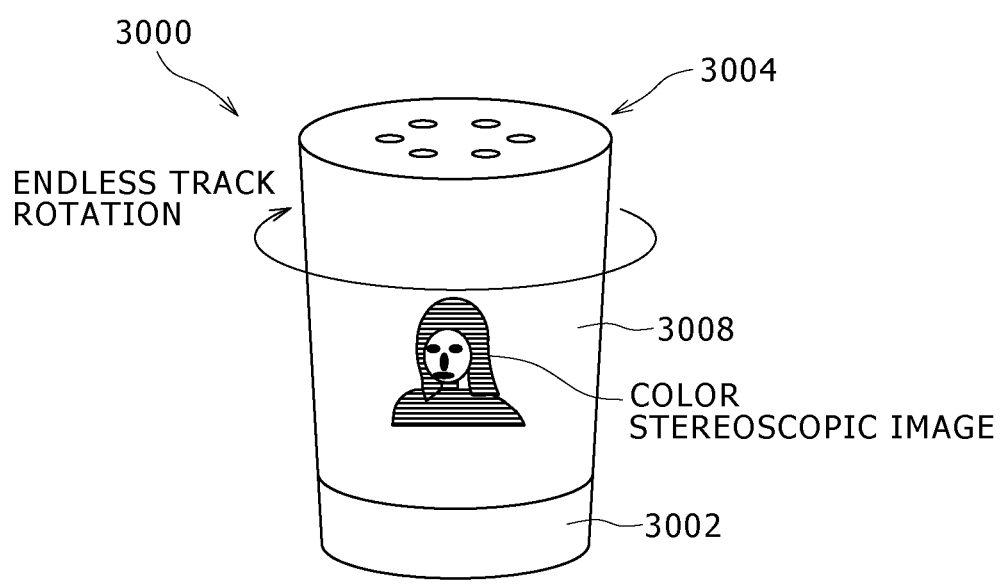
FIG. 17 is a diagram of assistance in explaining a second product example (three-dimensional image reproducing device) of the electronic device to which the rotational structure is applied.

FIG. 17 is a diagram of assistance in explaining a second product example of an electronic device to which the rotational structure 1001 is applied. The second product example is an example of application to a three-dimensional image reproducing device. As shown in FIG. 17, the three-dimensional image reproducing device 3000 is of the rotational structure 1001 including a fixed unit 3002 (corresponding to the fixed unit 1002) and a movable unit 3004 (corresponding to the movable unit 1004). The fixed unit 3002 is mounted and fixed on a stand not shown in the figure, for example. A casing 3008 of the movable unit 3004 is formed rotatably, and functions as a rotating screen. By performing endless rotation, the movable unit 3004 displays a color stereoscopic image (three-dimensional image) in a virtual space. The stereoscopic image can be observed by normal two-eye viewing (naked eye) without wearing special eyeglasses. Description of a concrete mechanism for displaying the stereoscopic image will be omitted here.

In the three-dimensional image reproducing device 3000, even when the movable unit 3004 is made to perform endless rotation (endless track rotation) with respect to the fixed unit 3002, an image signal and control information for stereoscopic image reproduction can be transmitted without any problem. High-speed radio data transmission can be achieved between the fixed unit 3002 and the movable unit 3004 performing 360-degree endless rotation.

It is to be noted that while the monitoring camera 2000 and the three-dimensional image reproducing device 3000 have been illustrated as product examples of the electronic device to which the rotational structure 1001 is applied, the electronic device to which the rotational structure 1001 is applied is not limited to these product examples. With any electronic device, by adopting the mechanism of the radio communicating device 1000 according to the present embodiment, high-speed radio data transmission can be achieved between a fixed unit and a movable unit performing 360-degree endless rotation.

The present application contains subject matter related to that disclosed in Japanese Priority Patent Application JP 2009-177563 filed in the Japan Patent Office on Jul. 30, 2009, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. A radio communicating device comprising:
a first communicating block;
a second communicating block rotatable about an axis of rotation relative to said first communicating block; and
a radio signal transmission line capable of information transmission by radio waves between said first communicating block and said second communicating block, wherein,
a signal to be transmitted between said first communicating block and said second communicating block is converted into a radio signal as a circularly polarized wave, and the radio signal as the circularly polarized wave is transmitted via said radio signal transmission line,
said radio signal transmission line is configured as a waveguide, said waveguide being disposed between said first communicating block and said second communicating block for connecting said first communicating block and said second communicating block
an inside of said waveguide is filled with a dielectric material, and
said waveguide is formed by performing a surface treatment that applies a coating of thin film of a metallic material so as to cover a periphery of said dielectric material.

2. The radio communicating device according to claim 1, wherein between said first communicating block and said second communicating block: the signal comprises a first signal and a second signal;
the first signal to be transmitted is converted into a first radio signal as a dextrorotatory circularly polarized wave, and the first radio signal as the dextrorotatory circularly polarized wave is transmitted via said radio signal transmission line, and
the second signal to be transmitted is converted into a second radio signal as a levorotatory circularly polarized wave, and the second radio signal as the levorotatory circularly polarized wave is transmitted via said radio signal transmission line.

3. The radio communicating device according to claim 1, wherein a respective transmission line coupling section having a circularly polarized wave probe for transmitting and receiving the radio signal as the circularly polarized wave to and from said radio signal transmission line is disposed at each of end parts of said radio signal transmission line.

4. The radio communicating device according to claim 1, wherein:
a first transmission line coupling section having a linearly polarized wave probe for transmitting and receiving the radio signal as a linearly polarized wave to and from said radio signal transmission line is disposed at one end part of said radio signal transmission line,
a polarized wave converting unit configured to convert the linearly polarized wave into the circularly polarized wave is disposed in said radio signal transmission line, and
a second transmission line coupling section having a circularly polarized wave probe for transmitting and receiving the radio signal as the circularly polarized wave to and from said radio signal transmission line is disposed at another end part of said radio signal transmission line.

5. The radio communicating device according to claim 1, wherein:
a respective transmission line coupling section having a linearly polarized wave probe for transmitting and receiving the radio signal as a linearly polarized wave to and from said radio signal transmission line is disposed at each of end parts of said radio signal transmission line, and
said radio signal transmission line has a first polarized wave converting unit configured to convert the linearly polarized wave into the circularly polarized wave and a second polarized wave converting unit configured to convert the circularly polarized wave obtained by said first polarized wave converting unit into the linearly polarized wave.

6. The radio communicating device according to claim 1, wherein, the signal to be transmitted between said first communicating block and said second communicating block is converted into the radio signal in a millimeter wave band as the circularly polarized wave, and the radio signal is transmitted via said radio signal transmission line.

7. The radio communicating device according to claim 1, wherein said second communicating block is configured such that the second communicating block is capable of endless track rotation relative to said first communicating block.

8. The radio communicating device according to claim 1, wherein said first communicating block and said second communicating block are configured to make a frequency of the radio signal for transmission and a frequency of the radio signal for reception different from each other, and to perform full-duplex bidirectional transmission using said radio signal transmission line.

9. The radio communicating device according to claim 1, wherein:
- a respective transmission line coupling section configured to transmit and receive the radio signal to and from said radio signal transmission line is disposed at each of end parts of said radio signal transmission line, and
- a terminating member for reflecting the radio signal to a side of said transmission line coupling section is disposed on at least one of said end parts.

10. A radio communicating device comprising:
a first communicating block;
a second communicating block rotatable about an axis of rotation relative to said first communicating block; and
a radio signal transmission line capable of information transmission by radio waves between said first communicating block and said second communicating block,
wherein,
- a signal to be transmitted between said first communicating block and said second communicating block is converted into a radio signal as a circularly polarized wave, and the radio signal as the circularly polarized wave is transmitted via said radio signal transmission line,
- said radio signal transmission line is configured as a waveguide, said waveguide being disposed between said first communicating block and said second communicating block for connecting said first communicating block and said second communicating block,
- a respective transmission line coupling section configured to transmit and receive the radio signal is disposed at each of end parts of said waveguide,
- each of the end parts of said waveguide is an open end, and
- an absorbing member for absorbing the radio signal transmitted from said transmission line coupling section and said waveguide is disposed in proximity to at least one of the open ends of said end parts.

11. A radio communicating device comprising:
a first communicating block;
a second communicating block rotatable about an axis of rotation relative to said first communicating block; and
a radio signal transmission line capable of information transmission by radio waves between said first communicating block and said second communicating block,
wherein,
- a signal to be transmitted between said first communicating block and said second communicating block is converted into a radio signal as a circularly polarized wave, and the radio signal as the circularly polarized wave is transmitted via said radio signal transmission line,
- each of said first communicating block and said second communicating block has a changing section configured to change transmission and reception timing on a time division basis, and
- half-duplex bidirectional transmission is performed using said radio signal transmission line.

12. An electronic device comprising:
a first communicating block;
a second communicating block rotatable about an axis of rotation relative to said first communicating block;
a radio signal transmission line capable of information transmission by radio between said first communicating block and said second communicating block;
a rotation driving unit configured to drive rotation of said second communicating block relative to said first communicating block; and
a signal processing section configured to process a signal to be transmitted by radio waves between said first communicating block and said second communicating block,
wherein,
- the signal to be transmitted between said first communicating block and said second communicating block is converted into a radio signal as a circularly polarized wave, and the radio signal as the circularly polarized wave is transmitted via said radio signal transmission line,
- said radio signal transmission line is configured as a waveguide, said waveguide being disposed between said first communicating block and said second communicating block for connecting said first communicating block and said second communicating block,
- an inside of said waveguide is filled with a dielectric material, and
- said waveguide is formed by performing a surface treatment that applies a coating of thin film of a metallic material so as to cover a periphery of said dielectric material.

13. A radio communicating device comprising:
a first communicating block;
a second communicating block rotatable about an axis of rotation relative to said first communicating block; and
a radio signal transmission line capable of information transmission by radio waves between said first communicating block and said second communicating block,
wherein,
- a signal to be transmitted between said first communicating block and said second communicating block is converted into a radio signal as a circularly polarized wave, and the radio signal as the circularly polarized wave is transmitted via said radio signal transmission line, and
- said first communicating block and said second communicating block have (i) a multiplexing processing section configured to integrate a plurality of signals to be transmitted into one system by time division multiplexing and to perform transmission of a radio signal of an integrated signal using time division multiplexing and to transmit the integrated signal as the radio signal and (ii) a simplification processing section configured to receive the radio signal and to divide the radio signal into each separate signal.

14. A radio communicating device comprising:
a first communicating block;
a second communicating block rotatable about an axis of rotation relative to said first communicating block; and
a radio signal transmission line capable of information transmission by radio waves between said first communicating block and said second communicating block,
wherein, a signal to be transmitted between said first communicating block and said second communicating block is converted into a radio signal as a circularly polarized wave, and the radio signal as the circularly polarized wave is transmitted via said radio signal transmission line, and said first communicating block and said second communicating block have (i) a multiplexing processing section configured to integrate a plurality of signals to be transmitted into an integrated signal using frequency division multiplexing and to transmit the integrated signal as the radio signal and (ii) a simplification processing section configured to receive the radio signal and to divide the radio signal into each separate signal.

15. A rotational structure comprising:

a first communicating block;

a second communicating block rotatable about an axis of rotation relative to said first communicating block;

a radio signal transmission line capable of information transmission by radio waves between said first communicating block and said second communicating block; and a rotation driving unit configured to drive rotation of said second communicating block relative to said first communicating block, wherein, a signal to be transmitted between said first communicating block and said second communicating block is converted into a radio signal as a circularly polarized wave, and the radio signal as the circularly polarized wave is transmitted via said radio signal transmission line, said radio signal transmission line is configured as a waveguide, said waveguide being disposed between said first communicating block and said second communicating block for connecting said first communicating block and said second communicating block, an inside of said waveguide is filled with a dielectric material, and said waveguide is formed by performing a surface treatment that applies a coating of thin film of a metallic material so as to cover a periphery of said dielectric material.

* * * * *